United States Patent
Nishiyama et al.

(10) Patent No.: US 9,528,553 B2
(45) Date of Patent: Dec. 27, 2016

(54) END CAP, AND LINEAR GUIDE DEVICE INCLUDING THE END CAP

(71) Applicant: NSK Ltd., Shinagawa-ku, Tokyo (JP)

(72) Inventors: Kazuhito Nishiyama, Kanagawa (JP); Takumi Nakagawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/423,855

(22) PCT Filed: Aug. 26, 2013

(86) PCT No.: PCT/JP2013/005028
§ 371 (c)(1),
(2) Date: Feb. 25, 2015

(87) PCT Pub. No.: WO2014/034083
PCT Pub. Date: Mar. 6, 2014

(65) Prior Publication Data
US 2015/0219160 A1    Aug. 6, 2015

(30) Foreign Application Priority Data

Aug. 27, 2012  (JP) ................................. 2012-186884
Aug. 27, 2012  (JP) ................................. 2012-186885

(51) Int. Cl.
*F16C 33/66* (2006.01)
*F16C 29/04* (2006.01)
(Continued)

(52) U.S. Cl.
CPC ........... *F16C 33/6659* (2013.01); *F16C 29/04* (2013.01); *F16C 29/065* (2013.01);
(Continued)

(58) Field of Classification Search
CPC ........... F16C 29/0609; F16C 29/0635–29/065; F16C 33/66–33/6696; F16C 29/04; F16C 29/0611; F16C 33/723
See application file for complete search history.

(56) References Cited

U.S. PATENT DOCUMENTS 5,380,096 A * 1/1995 Tanaka ................ F16C 29/0609
384/13
5,380,097 A * 1/1995 Tanaka ................ F16C 29/0609
384/13

(Continued)

FOREIGN PATENT DOCUMENTS

DE    195 38 450 A1    5/1996
DE    10121361 A1 * 12/2002 .......... F16C 29/0638
(Continued)

OTHER PUBLICATIONS

International Preliminary Report on Patentability (PCT/IB/338 & PCT/IB/373) dated Mar. 12, 2015, including English translation of document C2 (Japanese-language Written Opinion (PCT/ISA/237)) previously filed on Feb. 25, 2105 (10 pages).
(Continued)

*Primary Examiner* — Alan B Waits
(74) *Attorney, Agent, or Firm* — Crowell & Moring LLP

(57) ABSTRACT

An oil passage obstruction wall member (W) is configured to obstruct an oil passage having plural pathways configured to communicate plural oil supply openings (6) at plural locations on an outer circumference of an end cap (1) included in a linear guide device arranged such that a bottom face of a guide rail is arranged on a face slanted at an angle ranging from 0 degrees to 180 degrees with respect to a plane face, with a direction change passage (4) configured to communicate a rolling element rolling passage formed between the guide rail and the slider body with a rolling element return passage included in the slider body. The oil passage obstruction wall member (W) is selectively opened depending on the angle of the face on which the bottom face
(Continued)

of the guide rail is arranged to selectively communicate the direction change passage (4) and the oil supply openings (6).

20 Claims, 37 Drawing Sheets

(51) Int. Cl.
*F16C 29/06* (2006.01)
*F16C 33/72* (2006.01)

(52) U.S. Cl.
CPC ...... *F16C 29/0609* (2013.01); *F16C 29/0611* (2013.01); *F16C 29/0635* (2013.01); *F16C 29/0647* (2013.01); *F16C 33/6681* (2013.01); *F16C 33/723* (2013.01)

(56) References Cited

U.S. PATENT DOCUMENTS

| | | | |
|---|---|---|---|
| 5,582,486 A | | 12/1996 | Tsukada |
| 8,147,141 B2 * | | 4/2012 | Fumoto ............... F16C 29/0609 384/13 |
| 2006/0231335 A1 * | | 10/2006 | Lin ..................... F16C 29/0609 184/5 |
| 2008/0285899 A1 | | 11/2008 | Fumoto et al. |

FOREIGN PATENT DOCUMENTS

| | | |
|---|---|---|
| EP | 0 593 239 A2 | 4/1994 |
| JP | 1-73518 U | 5/1989 |
| JP | 8-114224 A | 5/1996 |
| JP | 2008-224014 A | 9/2008 |
| JP | 2008-291967 A | 12/2008 |
| JP | 2009-156376 A | 7/2009 |
| JP | 4816570 B2 * | 11/2011 .......... F16C 33/6659 |
| JP | 2012-140996 A | 7/2012 |

OTHER PUBLICATIONS

International Search Report (PCT/ISA/210) dated Oct. 8, 2013 with English translation (five pages).
Japanese-language Written Opinion (PCT/ISA/237) dated Oct. 8, 2013 (five pages).
Japanese-language Notice of Reasons for Rejection dated May 20, 2014 (four pages).
Japanese-language Decision of Rejection dated Dec. 16, 2014 (two pages).
Taiwanese Office Action issued in counterpart Taiwanese Application No. 102130609 dated Sep. 23, 2015, with English translation (fifteen (15) pages).
European Search Report issued in counterpart European Application No. 13833603.7 dated Feb. 10, 2016 (eight (8) pages).

* cited by examiner

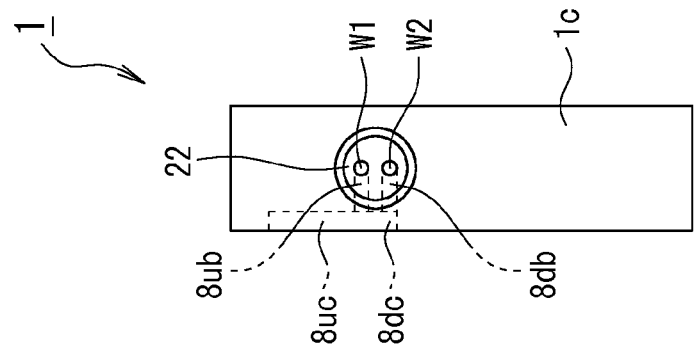
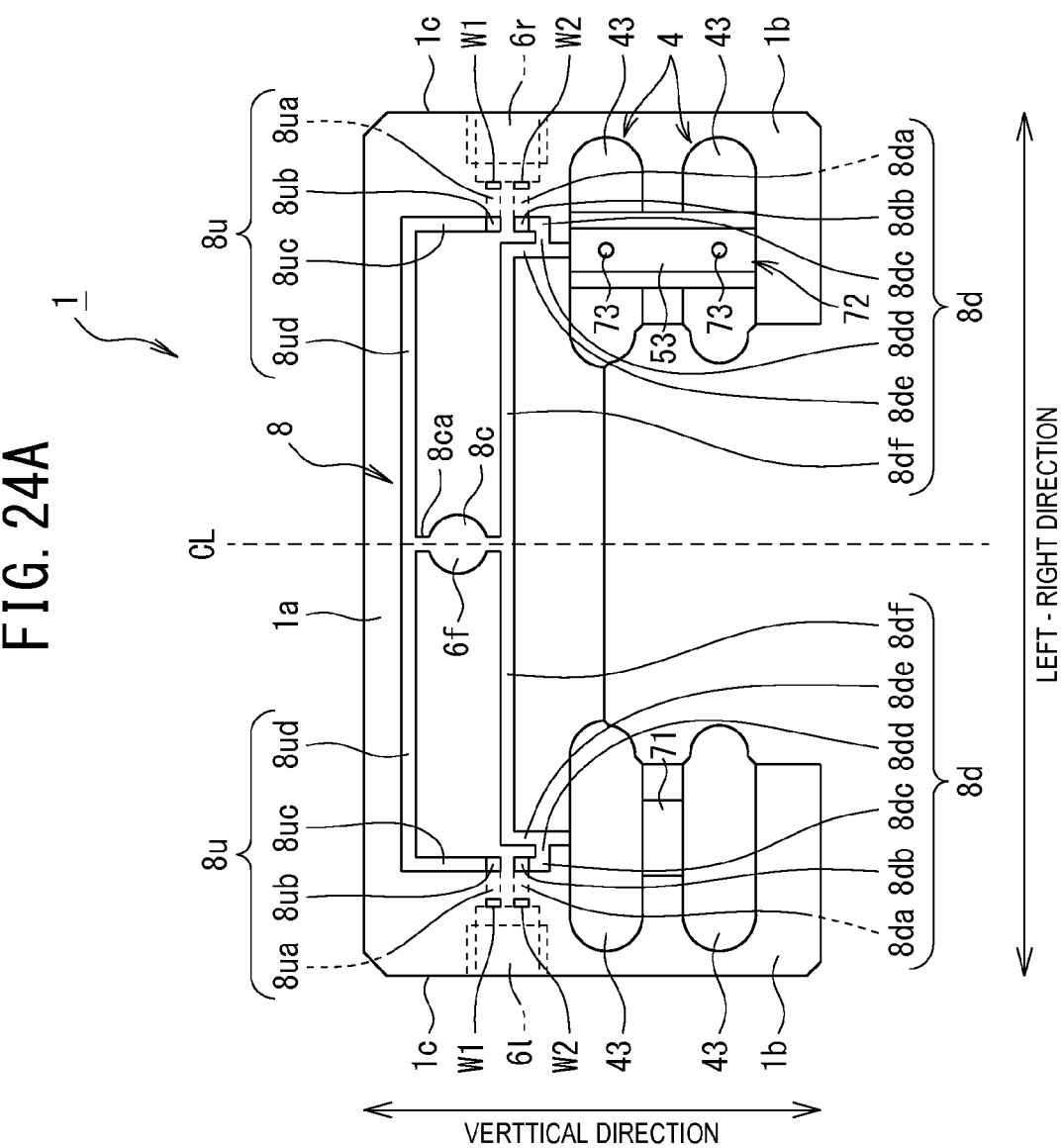

END CAP, AND LINEAR GUIDE DEVICE INCLUDING THE END CAP

TECHNICAL FIELD

The present disclosure relates to an end cap used, as a machine element part for guiding an object that linearly moves, in a machine tool, a semiconductor manufacturing device, a conveyer, or the like, and a linear guide device including the end cap.

BACKGROUND ART

In one technology, as a linear guide device used in a machine tool or the like, for example, the linear guide device illustrated in FIG. 45 can be mentioned. It is to be noted that FIG. 45 is a view illustrative of the linear guide device according to an example in one technology.

As illustrated in FIG. 45, a linear guide device 2 according to an example in one technology is a commonly used linear guide device, and includes a guide rail 14, a slider 20, and plural rolling elements 22.

The guide rail 14 has rail-side rolling element rolling grooves 24 that axially extends, on its outer face.

The slider 20 straddles over the guide rail 14 to be capable of moving relatively, and includes a slider body 16 and two end caps 1.

The slider body 16 is formed to have a substantially reversed letter C shaped cross section, slider-side rolling element rolling grooves 26 opposed to the rail-side rolling element rolling grooves 24, respectively, on both of the sleeve portions (a pair of sleeve portions), and rolling element return passages 12 that penetrate through a thick part of both of the sleeve portions in a moving direction of the slider body 16. Also, rolling element rolling passages 10 are formed between the rail-side rolling element rolling groove 24 and the slider-side rolling element rolling groove 26.

Two end caps 1 are each formed to have a substantially reversed letter C shaped cross section, like the slider body 16, and are jointed with end faces in the moving direction of the slider body 16, respectively. In addition, as a material of the end cap 1, for example, a hard resin material is used.

Further, the end cap 1 includes, as illustrated in FIG. 46, a direction change passage 4, an oil supply opening 6, and an oil passage 8. It is to be noted that FIG. 46 is a view illustrative of a configuration of the end cap 1 included in the linear guide device 2 in one technology, and is a view illustrative of a joint face of the end cap 1, with the slider body 16.

The direction change passages 4 are formed in both of the sleeves portions of the end cap 1, respectively, and communicate the rolling element rolling passages 10 formed between the guide rail 14 and the slider body 16 with the rolling element return passages 12 included in the slider body 16.

Plural oil supply openings 6 are formed on an outer circumferential surface except for the joint face of the end cap 1, with the slider body 16. Specifically, for one end cap 1, two oil supply openings 6 (two places on the left and right) are formed on a left side face (face on the left side in FIG. 46 of both side faces of the end cap 1) and a right side face (face on the right side in FIG. 46 of both side faces of the end cap 1).

The oil passage 8 communicates the oil supply opening 6 with the direction change passage 4.

Plural rolling elements 22 are rollably loaded in a rolling element circulation passage that is an endless circulation passage of the rolling elements 22 formed with the rolling element rolling passage 10, the rolling element return passage 12, and the direction change passage 4. It is to be noted that, for example, a cylindrical roller is used for the rolling element 22.

In the linear guide device 2 including the end cap 1 with the above configuration, for example, when the guide rail 14 is arranged on the horizontal plane to use the linear guide device 2 in a horizontal state, a lubricant supplied from the oil supply opening 6 formed on one of the both side faces of the end cap 1 might be hardly supplied to the direction change passage 4 on a farther side from the oil supply opening 6 from which the lubricant is supplied. In other words, in the linear guide device 2 including the end cap 1 with the above-described configuration, depending on the positional situation using the linear guide device 2, it might be difficult to supply the lubricant adequately into the rolling element circulation passage.

For the linear guide device to address such issues, for example, there are the linear guide devices described in PLT 1 to PLT 3.

In the linear guide device described in PLT 1, an oil passage that communicates the oil supply openings with each other formed in both side faces of the end cap moves the lubricant supplied from the oil supply opening to the upper side (on a far side from the direction change passage) of the end cap, and further moves the lubricant to the center of the end cap, then supplies the lubricant to the direction change passages formed in both of the sleeve portions of the end cap, respectively.

In the linear guide device described in PLT 2, the lubricant supplied from the oil supply opening is introduced through a tube provided in the oil passage to the direction change passages formed in both of the sleeve portions of the end cap, respectively.

In the linear guide device described in PLT 3, a rotary select valve having a three-pronged oil passage formed with a substantially letter Y shaped, depression shaped groove is provided on a lubricant supply path, so as to rotate the select valve depending on the positional situation of the linear guide device when in use and the location of the direction change passage to which the lubricant is to be supplied.

CITATION LIST

Patent Literature

PLT 1: JP H01-73518 U
PLT 2: JP 2008-224014 A
PLT 3: JP H08-114224 A

SUMMARY

Technical Problem

In the linear guide device described in PLT 1, however, for example, when the linear guide device is used in the state where the guide rail is provided on a vertical wall face, it might be difficult to supply the lubricant to the direction change passage located on the upper side in the vertical direction, out of the direction change passages formed in both of the sleeve portions of the end cap.

Besides, in the linear guide devices described in PLT 2 and PLT 3, the costs might be increased by the complexity of the structure and the increased number of the parts.

The present disclosure has been made in view of the above circumstances, and has an object to provide an end cap of a linear guide device capable of supplying the lubricant into all of rolling element circulation passages and capable of suppressing an increase in cost, regardless of the positional situation of the linear guide device when in use, and a linear guide device including the above-mentioned end cap.

Solution to Problem (First Aspect)

In order to address the above issues, according to a first aspect of the present disclosure, there is provided an end cap, wherein the end cap is configured to be included in a linear guide device in which a bottom face of a guide rail is arranged on a face having an angle ranging from 0 degrees to 180 degrees with respect to a plane face, and the end cap is configured to be jointed on an end face in a moving direction of a slider body that straddles the guide rail to be relatively movable, the end cap including: (a) a pair of sleeve portions arranged on both sides in a width direction of the guide rail and coupled by a trunk portion; (b) a pair of direction change passage formation depression portions provided on faces on slider body sides of the pair of sleeve portions, respectively, and configured to form a pair of direction change passages that communicate rolling element rolling passages formed between the guide rail and the slider body with rolling element return passages included in the slider body, respectively; (c) a plurality of oil supply openings at plurality of locations on an outer circumference of the end cap; (d) an oil passage having a plurality of pathways configured to communicate the plurality of oil supply openings with the pair of direction change passage formation depression portions, respectively; and (e) an oil passage obstruction wall member configured to obstruct each of the plurality of pathways of the oil passage, (f) wherein the pair of direction change passage formation depression portions are configured to be selectively communicated with the plurality of oil supply openings, by selectively opening the oil passage obstruction wall member configured to obstruct the each of the plurality of pathways of the oil passage depending on the angle of the face on which the bottom face of the guide rail is arranged.

In such a configuration, the oil passage obstruction wall member configured to obstruct each of the plurality of pathways of the oil passage is selectively opened depending on the angle of the face, on which the guide rail of the linear guide device is arranged, with respect to the plane face, so that the direction change passage is selectively communicated with the oil supply opening. Hence, regardless of the positional situation of the linear guide device when in use, the lubricant can be supplied to all of the direction change passages and supplied into the entire rolling element rolling passages. In addition, since the lubricant can be supplied into the entire rolling element rolling passages without adding a new part, complexity of the configuration and an increase in the number of the parts can be suppressed, and an increase in cost can be suppressed.

BRIEF DESCRIPTION OF DRAWINGS

FIG. 24A and FIG. 24B are a front view and a side view illustrative of the end cap in the fifth embodiment of the present disclosure;

DESCRIPTION OF EMBODIMENTS

First Embodiment

Hereinafter, a first embodiment (hereinafter, referred to as "the present embodiment") of the present disclosure will be described with reference to the drawings.
(Configuration)

Figure 45:
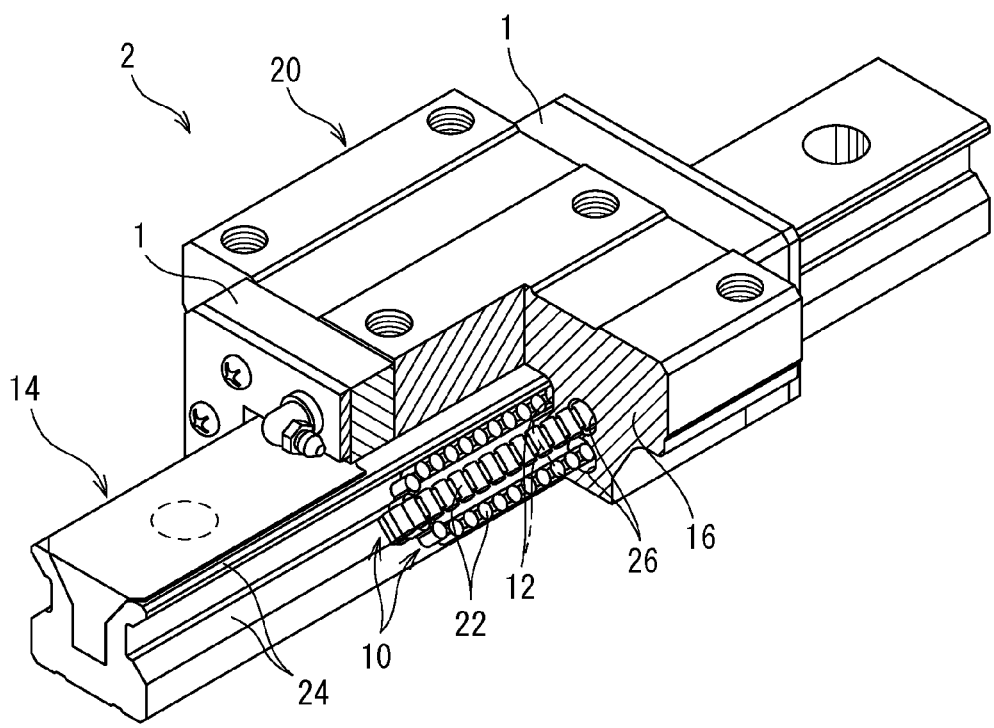
FIG. 45 is a view illustrative of the linear guide device in one technology.
Figure 46:
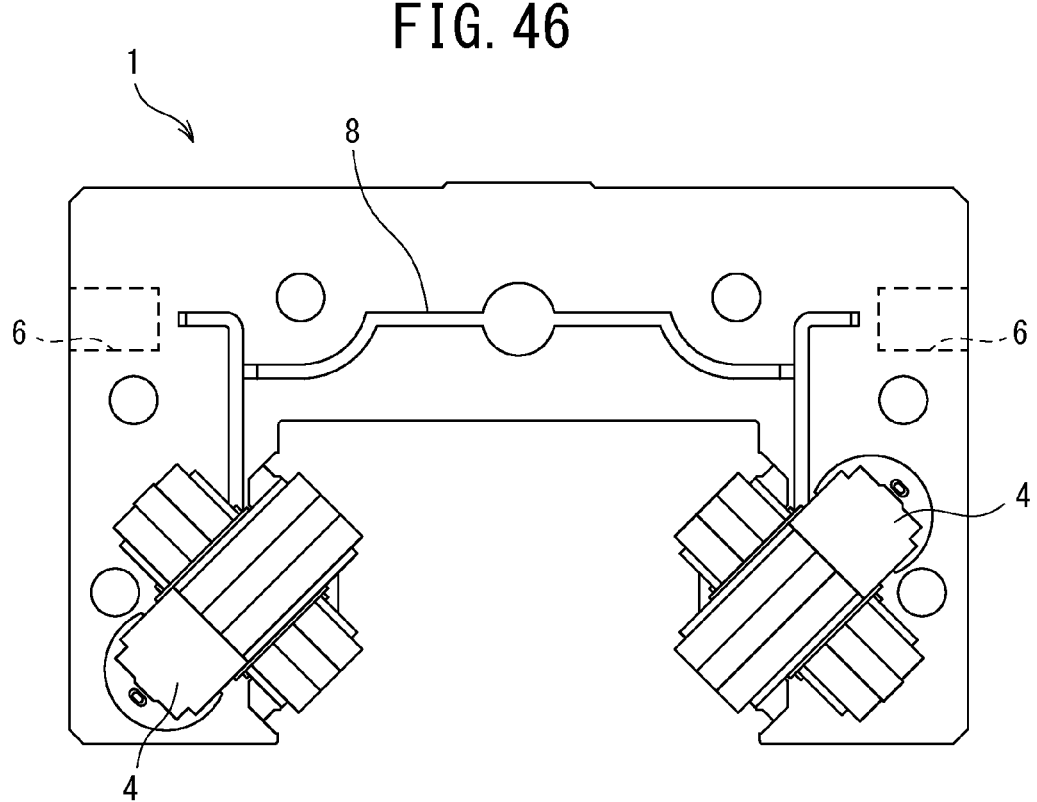
FIG. 46 is a view illustrative of a configuration of the end cap included in the linear guide device in one technology.

Firstly, with reference to FIG. 45 and FIG. 46, by use of FIG. 1, FIG. 2A and FIG. 2B, a configuration of an end cap included in a linear guide device in the present embodiment will be described.

Figure 1:
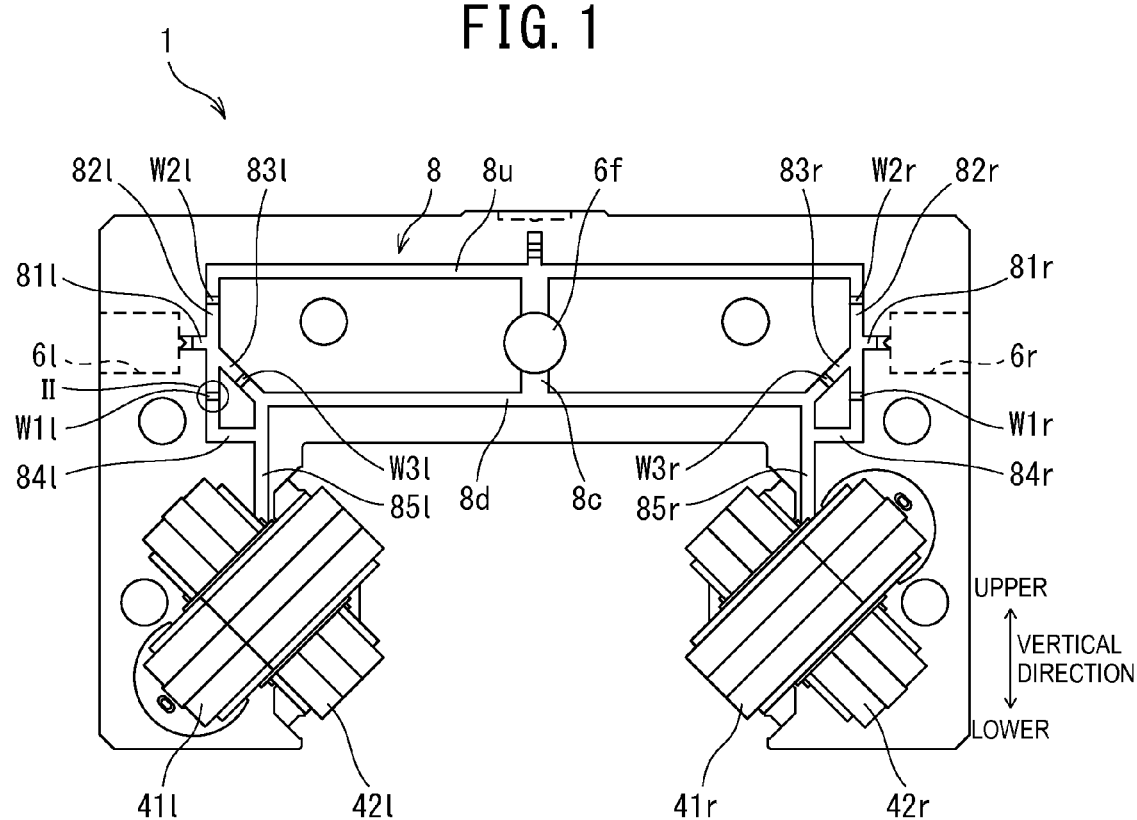
FIG. 1 is a view illustrative of a configuration of an end cap in a first embodiment of the present disclosure.
Figure 2A:
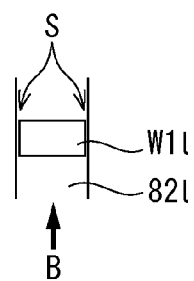
FIG. 2A and FIG. 2B are views illustrative of a configuration of a left side first oil passage obstruction wall member.
Figure 2B:
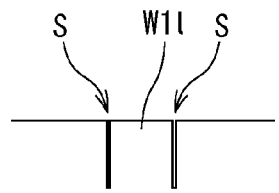

FIG. 1 is a view illustrative of the configuration of the end cap 1 in the present embodiment, and is a view illustrative of a joint face of the end cap 1, with a slider body. It is to be noted that the end cap 1 illustrated in FIG. 1 is the end cap 1 included in the above-described linear guide device 2 (see FIG. 45), for example. In the description below, the same components and configurations as those of the linear guide device 2 illustrated in FIG. 45 and the end cap 1 illustrated in FIG. 46 have the same reference numerals.

Also, the end cap 1 illustrated in FIG. 1 is the end cap 1 in the initial state. It is to be noted that "the initial state" means a state before the end cap 1 is processed depending on the positional situation of the linear guide device 2 when in use.

As illustrated in FIG. 1, the end cap 1 includes plural direction change passage formation first depression portions (direction change passage formation depression portions) 41, plural direction change passage formation second depression portions (direction change passage formation depression portions) 42, plural oil supply openings 6 at plural locations, and plural oil passages 8 of plural pathways. It is to be noted that, for example, as to the material of the end cap 1, a hard resin material is used.

In the present embodiment, as an example, a case where a hard resin material to be used as the material of the end cap 1 is polyacetal (polyacetal) will be described.

The direction change passage formation first depression portions 41 and the direction change passage formation second depression portions 42 are formed in both of the sleeve portions (a pair of sleeve portions) of the end cap 1, respectively.

The direction change passage formation first depression portion 41 is a groove continuous in the moving direction of rolling elements 22, and its bottom face is configured to form a first one of outer circumferential faces of two lines of the direction change passages 4 crossing in a mutually crossing state in the end cap 1.

The direction change passage formation second depression portion 42 is configured to cross the direction change passage formation first depression portion 41, when viewed from the slider body 16 side, and is a groove continuous in the moving direction of the rolling elements 22. Also, in the bottom face of the direction change passage formation second depression portion 42, a part crossing the direction change passage formation first depression portion 41, when viewed from the slider body side, is configured to form a cavity by the direction change passage formation first depression portion 41. Thus, the bottom face of the direction change passage formation second depression portion 42 is configured to form a part of a second one of the outer circumferential faces of the two lines of the direction change passages 4 crossing in a mutually crossing state in the end cap 1.

In addition, unlike the initial state, in the state where the end cap 1 has been processed depending on a positional situation of the linear guide device 2 when in use, a first crossing return guide is arranged in the direction change passage formation first depression portion 41, and a second crossing return guide is arranged in the direction change passage formation second depression portion 42. Thus, two lines of direction change passages 4 are formed to be communicated with each other by crossing the two lines of the rolling element rolling passages 10 and the rolling element return passages 12 in a mutually crossing state. It is to be noted that the first crossing return guide and the second crossing return guide will be described below.

It is to be noted that in the drawings and the following description, the direction change passage formation first depression portion 41 formed in a left side sleeve portion of the end cap 1 (sleeve portion on the left side in FIG. 1, out of both of the sleeve portions in the end cap 1) will be also referred to as "left side direction change passage formation first depression portion 41l". Similarly, in the drawings and the following description, the direction change passage formation first depression portion 41 formed in a right side sleeve portion of the end cap 1 (sleeve portion on the right side in FIG. 1, out of both of the sleeve portions in the end cap 1) will be also referred to as "right side direction change passage formation first depression portion 41r".

In addition, in the drawings and the following description, the direction change passage formation second depression portion 42 formed in a left side sleeve portion of the end cap 1 will be also referred to as "left side direction change passage formation second depression portion 42l". Similarly, in the drawings and the following description, the direction change passage formation second depression portion 42 formed in a right side sleeve portion of the end cap 1 will be also referred to as "right side direction change passage formation second depression portion 42r".

In other words, the left side direction change passage formation first depression portion (left side direction change passage formation depression portion) 41l and the right side direction change passage formation first depression portion (right side direction change passage formation groove) 41r are formed at opposing parts between which the guide rail 14 is interposed, in the end cap 1. Similarly, the left side direction change passage formation second depression portion (left side direction change passage formation depression portion) 42l and right side direction change passage formation second depression portion (right side direction change passage formation depression portion) 42r are formed at opposing parts between which the guide rail 14 is interposed, in the end cap 1.

The oil supply opening 6 is formed on a predefined face and a predefined position on the outer circumferential face side except for the joint face of the end cap 1, with the slider body 16. In the present embodiment, a case where three oil supply openings 6 are provided for one end cap 1 will be described.

It is to be noted that in the drawings and the following description, out of the three oil supply openings 6, a first oil supply opening 6 formed in a face on the opposite side of the joint face of the end cap 1, with the slider body 16 will be also referred to as "front face oil supply opening 6f". Similarly, in the drawings and the following description, out of the three oil supply openings 6, a second oil supply opening 6 formed in the left side face of the end cap 1 (left side face in FIG. 1, out of both side faces of the end cap 1) will be also referred to as "left side face oil supply opening 6l". Similarly, in the drawings and the following description, out of the three oil supply openings 6, a third oil supply opening 6 formed in the right side face of the end cap 1 (right side face in FIG. 1, out of both side faces of the end cap 1) will be also referred to as "right side face oil supply opening 6r".

It is to be noted that the front face oil supply opening 6f is closed with a lid member (such as a cap), not illustrated. The lid member is removed, when the front face oil supply opening 6f is used.

The oil passage 8 is, for example, a groove having a depressed cross-sectional shape formed in the joint face of the end cap 1, with the slider body 16, and communicates with each oil supply opening 6, the direction change passage formation first depression portion 41, and the direction change passage formation second depression portion 42, formed in both of the sleeve portions of the end cap 1, respectively.

The width of the oil passage 8 is set depending on the size or the like of the linear guide device 2, for example.

It is to be noted that the oil passage 8 is not limited to the groove having a depressed shape, and for example, a groove having a letter V shaped cross section or a groove having a semicircular shaped cross section may be applicable.

Also, the oil passage 8 includes a left side first oil passage formation portion 81l, a right side first oil passage formation portion 81r, a left side second oil passage formation portion 82l, a right side second oil passage formation portion 82r, a left side third oil passage formation portion 83l, and a right side third oil passage formation portion 83r. In addition, the oil passage 8 includes a left side fourth oil passage formation portion 84l, a right side fourth oil passage formation portion 84r, a left side fifth oil passage formation portion 85l, a right side fifth oil passage formation portion 85r, an upper oil passage formation portion 8u, a lower oil passage formation portion 8d, and a central oil passage formation portion 8c.

The left side first oil passage formation portion 81l originates from the left side face oil supply opening 6l and linearly extends toward the right side face oil supply opening 6r. In other words, the left side first oil passage formation portion 81l extends in the width direction of the end cap 1 (left-right direction of FIG. 1). Also, one end of the left side first oil passage formation portion 81l is continuous with the left side face oil supply opening 6l, whereas the other end of the left side first oil passage formation portion 81l extends toward the right side face oil supply opening 6r.

The right side first oil passage formation portion 81r originates from the right side face oil supply opening 6r and linearly extends toward the left side face oil supply opening 6l. In other words, the right side first oil passage formation portion 81r extends in the width direction of the end cap 1 (left-right direction of FIG. 1), like the left side first oil passage formation portion 81l. Also, one end of the right side first oil passage formation portion 81r is continuous with the right side face oil supply opening 6r, whereas the other end of the right side first oil passage formation portion 81r extends toward the left side face oil supply opening 6l.

The left side second oil passage formation portion 82l extends in a direction perpendicular to the left side first oil passage formation portion 81l (top and bottom direction in FIG. 1), and is continuous with an end on the right side face oil supply opening 6r side in the left side first oil passage formation portion 81l.

In addition, a left side first oil passage obstruction wall member W1l is provided at an inside of a part closer to the left side direction change passage formation first depression portion 41l and the left side direction change passage formation second depression portion 42l than to apart perpendicular to the left side first oil passage formation portion 81l, in the left side second oil passage formation portion 82l.

The left side first oil passage obstruction wall member W1l is formed to have a thin plate shape, and obstructs the part closer to the left side direction change passage formation first depression portion 41l and the left side direction change passage formation second depression portion 42l than to the part perpendicular to the left side first oil passage formation portion 81l, in the left side second oil passage formation portion 82l.

In addition, the left side first oil passage obstruction wall member W1l has, as illustrated in FIG. 2, two slits S between the left side first oil passage obstruction wall member W1l and a part configuring aside wall face of the left side second oil passage formation portion 82l, in the left side second oil passage formation portion 82l, which is formed to have a depression shaped groove. In other words, a slit S is formed in at least a part between the oil passage obstruction wall member (the left side first oil passage obstruction wall member W1l) and the oil passage (the left side second oil passage formation portion 82l).

Thus, the left side first oil passage obstruction wall member W1l is coupled only at a part configuring the bottom face of the left side second oil passage formation portion 82*l*, in the left side second oil passage formation portion 82*l* formed in a depression shaped groove. It is to be noted that FIG. 2A and FIG. 2B are views illustrative of a configuration of the left side first oil passage obstruction wall member W1*l*. FIG. 2A is an enlarged view of a range surrounded by a circle II in FIG. 1, and FIG. 2B is a view when viewed from arrow B of FIG. 2A.

Here, the thickness of the left side first oil passage obstruction wall member W1*l* and the shape of the slit S of the left side first oil passage obstruction wall member W1*l* are, for example, set to the thickness and shape such that an operator or the like can remove the left side first oil passage obstruction wall member W1*l* by hand work or with a hand tool.

It is to be noted that in the present embodiment, as an example, a description will be given of a case where the thickness of the left side first oil passage obstruction wall member W1*l* and the shape of the slit S of the left side first oil passage obstruction wall member W1*l* are, for example, set to the thickness and shape such that an operator or the like can remove the left side first oil passage obstruction wall member W1*l* by hand work or with a hand tool. Herein, the "hand work", for example, means a work that an operator or the like folds and removes the left side first oil passage obstruction wall member W1*l*.

In addition, the left side second oil passage obstruction wall member W2*l* is provided at an inside of a part of the left side second oil passage formation portion 82*l*, which is farther from the left side direction change passage formation first depression portion 41*l* and the left side direction change passage formation second depression portion 42*l* than from the part perpendicular to the left side first oil passage formation portion 81*l*. It is to be noted that since the configuration of the left side second oil passage obstruction wall member W2*l* is similar to the left side first oil passage obstruction wall member W1*l*, the description thereof will be omitted.

The right side second oil passage formation portion 82*r* extends in a direction perpendicular to the right side first oil passage formation portion 81*r* (top and bottom direction in FIG. 1), and is continuous with an end on the left side face oil supply opening 61 side, in the right side first oil passage formation portion 81*r*.

Further, a right side first oil passage obstruction wall member W1*r* is provided at an inside of a part of the right side second oil passage formation portion 82*r*, which is closer to the right side direction change passage formation first depression portion 41*r* and the right side direction change passage formation second depression portion 42*r* than to apart perpendicular to the right side first oil passage formation portion 81*r*. It is to be noted that since the configuration of the right side first oil passage obstruction wall member W1*r* is similar to the left side first oil passage obstruction wall member W1*l*, the description thereof will be omitted.

In addition, the right side second oil passage obstruction wall member W2*r* is provided at an inside of apart of the right side second oil passage formation portion 82*r*, which is farther from the right side direction change passage formation first depression portion 41*r* and the right side direction change passage formation second depression portion 42*r* than from the part perpendicular to the right side first oil passage formation portion 81*r*. It is to be noted that since the configuration of the right side second oil passage obstruction wall member W2*r* is similar to the left side first oil passage obstruction wall member W1*l*, the description thereof will be omitted.

The left side third oil passage formation portion 83*l* is continuous with a part between a part where the left side first oil passage obstruction wall member W1*l* is provided and a part where the left side second oil passage obstruction wall member W2*l* is provided, in the left side second oil passage formation portion 82*l*.

In addition, as the left side third oil passage formation portion 83*l* extends from the left side face oil supply opening 61 to the right side face oil supply opening 6*r* (from the left side to the right side in FIG. 1), the left side third oil passage formation portion 83*l* extends at a slant to get closer to the left side direction change passage formation first depression portion 41*l* and the left side direction change passage formation second depression portion 42*l*. It is to be noted that in the present embodiment, as an example, the case where 45 degrees is the slanted angle of the left side third oil passage formation portion 83*l* with respect to the extending direction of the left side second oil passage formation portion 82*l* will be described.

Also, the left side third oil passage obstruction wall member W3*l* is provided in the left side third oil passage formation portion 83*l*. It is to be noted that since the configuration of the left side third oil passage obstruction wall member W3*l* is similar to the left side first oil passage obstruction wall member W1*l*, the description thereof will be omitted.

The right side third oil passage formation portion 83*r* is continuous with a part between the part where the right side first oil passage obstruction wall member W1*r* is provided and the part where the right side second passage obstruction wall member W2*r* is provided, in the right side second oil passage formation portion 82*r*.

In addition, as the right side third oil passage formation portion 83*r* extends from the right side face oil supply opening 6*r* to the left side face oil supply opening 61 (from the right side to the left side in FIG. 1), the right side third oil passage formation portion 83*r* extends at a slant to get closer to the right side direction change passage formation first depression portion 41*r* and the right side direction change passage formation second depression portion 42*r*. It is to be noted that in the present embodiment, as an example, the case where 45 degrees is the slanted angle of the right side third oil passage formation portion 83*r* with respect to the extending direction of the right side second oil passage formation portion 82*r* will be described.

Also, a right side third oil passage obstruction wall member W3*r* is provided in the right side third oil passage formation portion 83*r*. It is to be noted that since the configuration of the right side third oil passage obstruction wall member W3*r* is similar to the left side first oil passage obstruction wall member W1*l*, the description thereof will be omitted.

The left side fourth oil passage formation portion 84*l* is continuous with a closest part (hereinafter, referred to as "lower end of the left side second oil passage formation portion 82*l*" in some cases) to the left side direction change passage formation first depression portion 41*l* and the left side direction change passage formation second depression portion 42*l*, in the left side second oil passage formation portion 82*l*.

Further, the left side fourth oil passage formation portion 84*l* linearly extends from the lower end of the left side second oil passage formation portion 82*l* to the right side face oil supply opening 6*r*.

The right side fourth oil passage formation portion 84r is continuous with a closest part (hereinafter, referred to as "lower end of the right side second oil passage formation portion 82r" in some cases) to the right side direction change passage formation first depression portion 41r and the right side direction change passage formation second depression portion 42r, in the right side second oil passage formation portion 82r.

Further, the right side fourth oil passage formation portion 84r linearly extends from the lower end of the right side second oil passage formation portion 82r to the left side face oil supply opening 61.

The left side fifth oil passage formation portion 85l extends in parallel with the left side second oil passage formation portion 82l. In other words, the left side fifth oil passage formation portion 85l extends in the direction (top and bottom direction in FIG. 1) perpendicular to the left side first oil passage formation portion 81l, like the left side second oil passage formation portion 82l.

In addition, one end of the left side fifth oil passage formation portion 85l is continuous with the left side third oil passage formation portion 83l. On the other hand, the other end of the left side fifth oil passage formation portion 85l is continuous with the left side direction change passage formation first depression portion 41l and the left side direction change passage formation second depression portion 42l.

Further, an end on the right side face oil supply opening 6r side of the left side fourth oil passage formation portion 84l is continuous with a part between both ends of the left side fifth oil passage formation portion 85l.

The right side fifth oil passage formation portion 85r extends in parallel with the right side second oil passage formation portion 82r. In other words, the right side fifth oil passage formation portion 85r extends in the direction perpendicular to the right side first oil passage formation portion 81r (top and bottom direction in FIG. 1), like the right side second oil passage formation portion 82r.

In addition, one end of the right side fifth oil passage formation portion 85r is continuous with the right side third oil passage formation portion 83r. On the other hand, the other end of the right side fifth oil passage formation portion 85r is continuous with the right side direction change passage formation first depression portion 41r and the right side direction change passage formation second depression portion 42r.

Further, an end on the left side face oil supply opening 61 side of the right side fourth oil passage formation portion 84r is continuous with a part between both ends of the right side fifth oil passage formation portion 85r.

The upper oil passage formation portion 8u extends in the width direction of the end cap 1 (left-right direction of FIG. 1), like the left side first oil passage formation portion 81l and the right side first oil passage formation portion 81r. In other words, the upper oil passage formation portion 8u extends in parallel with the left side first oil passage formation portion 81l and the right side first oil passage formation portion 81r.

Furthermore, one end of the upper oil passage formation portion 8u is continuous with a farthermost part from the left side direction change passage formation first depression portion 41l and the left side direction change passage formation second depression portion 42l, in the left side second oil passage formation portion 82l. On the other hand, the other end of the upper oil passage formation portion 8u is continuous with a farthermost part from the right side direction change passage formation first depression portion 41r and right side direction change passage formation second depression portion 42r, in the right side second oil passage formation portion 82r.

The lower oil passage formation portion 8d extends in the width direction (left-right direction of FIG. 1) of the end cap 1, like the upper oil passage formation portion 8u.

Moreover, one end of the lower oil passage formation portion 8d is continuous with the left side third oil passage formation portion 83l and the left side fifth oil passage formation portion 85l. In other words, the left side third oil passage formation portion 83l, the left side fifth oil passage formation portion 85l, and the lower oil passage formation portion 8d are configured to form a three-pronged oil passage with a substantially letter Y shaped depression shaped groove.

On the other hand, the other end of the lower oil passage formation portion 8d is continuous with the right side third oil passage formation portion 83r and the right side fifth oil passage formation portion 85r. In other words, the right side third oil passage formation portion 83r, the right side fifth oil passage formation portion 85r, and the lower oil passage formation portion 8d are configured to form a three-pronged oil passage formed with a substantially letter Y shaped depression shaped groove.

The central oil passage formation portion 8c extends in the direction perpendicular to the left side first oil passage formation portion 81l and the right side first oil passage formation portion 81r (top and bottom direction in FIG. 1), and communicates a part between both ends of the upper oil passage formation portion 8u with a part between both ends of the lower oil passage formation portion 8d.

Specifically, one end (an end on the upper side) of the central oil passage formation portion 8c is continuous with the upper oil passage formation portion 8u, at a midpoint between both ends of the upper oil passage formation portion 8u. On the other hand, the other end (an end on the lower side) of the central oil passage formation portion 8c is continuous with the lower oil passage formation portion 8d, at a midpoint between both ends of the lower oil passage formation portion 8d.

In addition, the central oil passage formation portion 8c is continuous with the front face oil supply opening 6f in a part between both ends thereof.

Next, with reference to FIG. 45, FIG. 46, FIG. 1, and FIG. 2, by use of FIG. 3 and FIG. 4, a configuration of the linear guide device 2 including the end cap 1 will be described.

Figure 3:
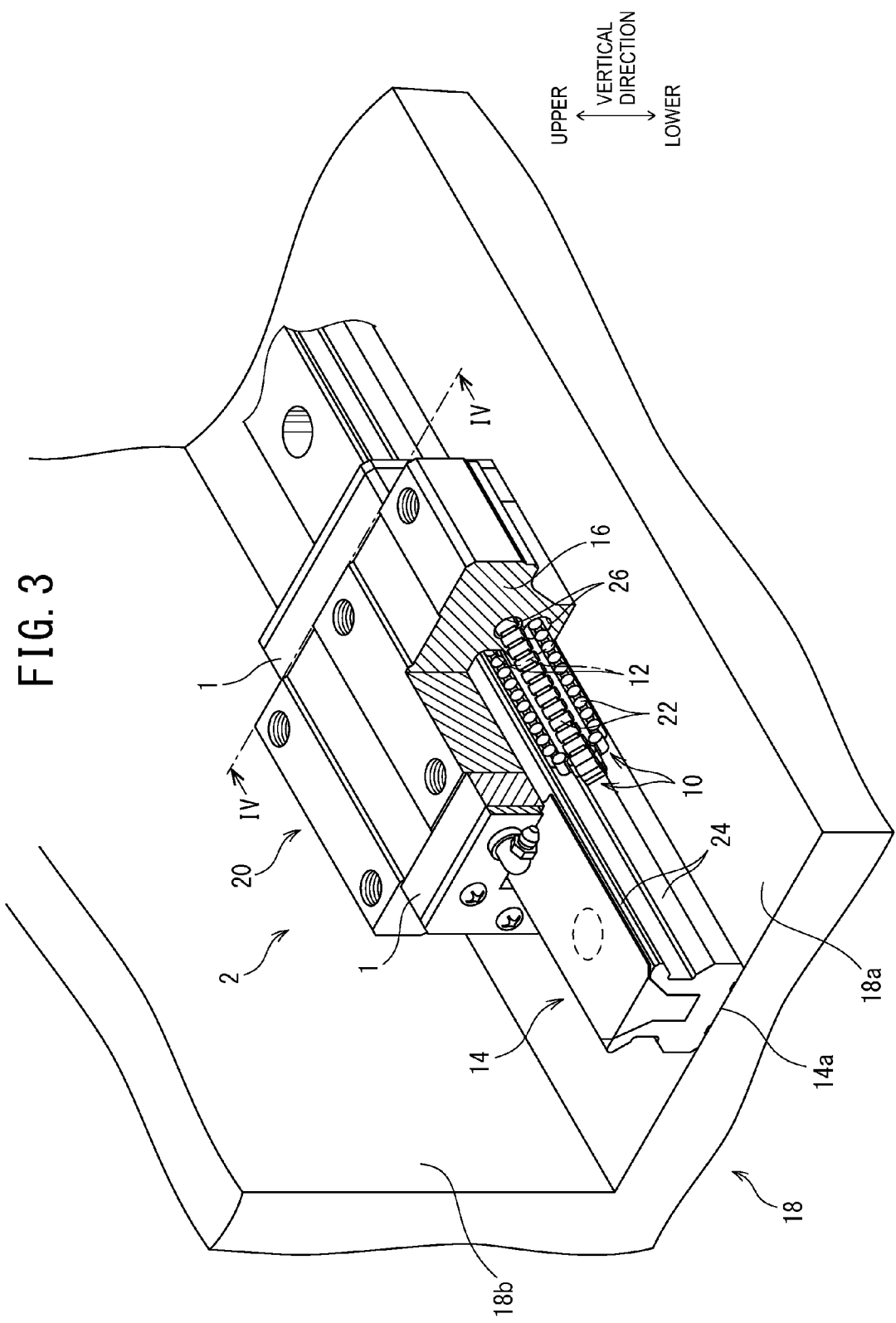
FIG. 3 is a view illustrative of a configuration of the linear guide device including the end cap in the first embodiment of the present disclosure.

FIG. 3 is a view illustrative of a configuration of the linear guide device 2 including the end cap 1, and is a perspective view of the linear guide device 2 provided in a guide rail arrangement face 18a of a base 18.

The linear guide device 2 in the present embodiment is configured such that a bottom face 14a of a guide rail 14 is arranged on a plane slanted at an angle within a range equal to or larger than 0 degrees to equal to or smaller than 90 degrees, with a horizontal plane being used as a reference. It is to be noted that, in the linear guide device 2 in the present embodiment, a slanted angle with respect to the horizontal plane is 0 degrees.

Specifically, as illustrated in FIG. 3, the linear guide device 2 in the present embodiment is configured such that the bottom face 14a of the guide rail 14 is arranged on the guide rail arrangement face 18a formed in a horizontal plane. In other words, the positional situation where the linear guide device 2 in the present embodiment is used is horizontal.

In addition, the base 18 includes a base side face 18b that extends upward in the vertical direction from the guide rail arrangement face 18a, and the base side face 18b faces the left side face oil supply opening 61 in the linear guide device 2. In other words, the linear guide device 2 in the present embodiment has a configuration that makes the lubricant easier to be supplied from the right side face oil supply opening 6r than from the left side face oil supply opening 61.

Herein, as the lubricant to be supplied to the linear guide device 2, grease which is a semi-solid lubricant or lubricating oil which is a liquid-state lubricant can be used. Also, as the grease, for example, calcium soap grease, lithium soap grease, aluminum complex grease, lithium complex grease, urea grease, organic bentonite grease (bentonite), or the like can be used. On the other hand, as the lubricating oil, for example, mineral oil, diester oil, polyvalent ester oil, silicone oil, synthetic oil, or the like can be used.

Figure 4:
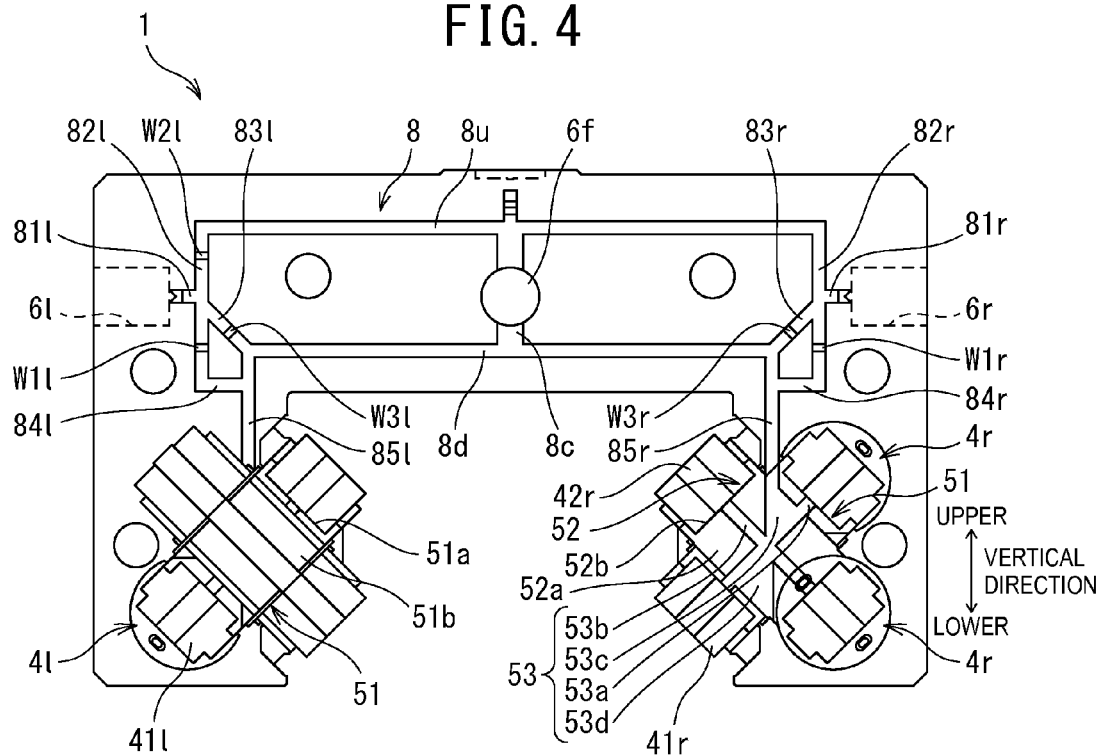
FIG. 4 is a view illustrative of a configuration of the end cap on which processing is carried out depending on a positional situation of the linear guide device when in use.

Accordingly, the processing depending on the positional situation of the linear guide device 2 when in use from the above-described initial state (see FIG. 1 and FIG. 2) is performed on the end cap 1 included in the linear guide device 2 in the present embodiment, as illustrated in FIG. 4. It is to be noted that FIG. 4 is a view illustrative of a configuration of the end cap 1 on which the processing depending on the positional situation of the linear guide device 2 when in use has been performed. Specifically, FIG. 4 is a view illustrative of a joint face of the end cap 1, with the slider body 16, and is a cross-sectional view taken along line IV-IV of the end cap 1 in FIG. 3. Thus, the end cap 1 illustrated in FIG. 4 is an end cap arranged on the right side from the slider body 16 in FIG. 3, out of two end caps 1 included in the linear guide device 2 illustrated in FIG. 3.

As illustrated in FIG. 4, as to the end cap 1 included in the linear guide device 2 used in a positional situation that is horizontal, a first crossing return guide 51 is provided in the direction change passage formation first depression portion 41, and in addition, a second crossing return guide 52 is provided in the direction change passage formation second depression portion 42. It is to be noted that for the purpose of description, FIG. 4 illustrates a state where the first crossing return guide 51 is arranged in the left side direction change passage formation first depression portion 41l and the right side direction change passage formation first depression portion 41r, and the second crossing return guide 52 is arranged only in the right side direction change passage formation second depression portion 42r. Furthermore, such an arrangement state will be also illustrated in the following drawings.

The first crossing return guide 51 is formed to have a shape where a plate material is curved in a letter U shape, and includes a first outer circumference side guide groove portion 51a and a first inner circumference side guide groove portion 51b.

The first outer circumference side guide groove portion 51a opposes the bottom face of the direction change passage formation first depression portion 41, in a state where the first crossing return guide 51 is provided in the direction change passage formation first depression portion 41. In addition, a gap for the rolling elements to be movable therein is provided between the first outer circumference side guide groove portion 51a and the bottom face of the direction change passage formation first depression portion 41. Thus, the provision of the first crossing return guide 51 in the direction change passage formation first depression portion 41 leads to a formation of one of the two lines of the direction change passages 4 that cross in a mutually crossing state in the end cap 1.

A first inner circumference side guide groove portion 51b is continuous with a part to be a gap portion by crossing the direction change passage formation first depression portion 41, in the bottom face of the direction change passage formation second depression portion 42, and, in the state where the first crossing return guide 51 is provided in the direction change passage formation first depression portion 41. Thus, the provision of the first crossing return guide 51 in the direction change passage formation first depression portion 41 leads to a formation of the other of the two lines of the direction change passages 4 that cross in a mutually crossing state in the end cap 1.

The second crossing return guide 52 includes a flat portion 52a, a second inner circumference side guide groove portion 52b, and a return guide side oil passage 53.

The flat portion 52a is a plane parallel with the joint face of the end cap 1, with the slider body 16, with the first crossing return guide 51 being provided in the direction change passage formation first depression portion 41, and additionally with the second crossing return guide 52 being provided in the direction change passage formation second depression portion 42.

The second inner circumference side guide groove portion 52b opposes an outer circumferential face of the other of the two lines of the direction change passages 4 that cross in a mutually crossing state in the end cap 1, with the first crossing return guide 51 being provided in the direction change passage formation first depression portion 41, and additionally with the second crossing return guide 52 being provided in the direction change passage formation second depression portion 42. Also, a gap for the rolling elements 22 to be movable therein is provided between the second outer circumference side guide groove portion 52b and an outer circumferential face of the other of the two lines of the direction change passages 4 that cross in a mutually crossing state in the end cap 1.

Thus, the first crossing return guide 51 is arranged in the direction change passage formation first depression portion 41, and in addition, the second crossing return guide 52 is arranged in the direction change passage formation second depression portion 42, so that the other of the two lines of the direction change passages 4 that cross in a mutually crossing state in the end cap 1 is formed.

The return guide side oil passage 53 is a depression portion formed in the flat portion 52a, and includes a first branch groove portion 53a, a second branch groove portion 53b, a first branch reservoir portion 53c, and a second branch reservoir portion 53d.

In the first branch groove portion 53a, both ends thereof are configured to communicate with both ends of one of the two lines of the direction change passages 4 that cross in a mutually crossing state in the end cap 1, respectively. Specifically, the both ends of the first branch groove portion 53a is configured to communicate with both ends of the direction change passage 4 which is formed by providing the first crossing return guide 51 in the direction change passage formation first depression portion 41, respectively.

The second branch groove portion 53b is configured to cross and communicate with the first branch groove portion 53a, and both ends thereof are configured to communicate with the other of the two lines of the direction change passages 4 that cross in a mutually crossing state in the end cap 1, respectively. Specifically, both ends of the second branch groove portion 53b communicate with both ends of the direction change passage 4 which is formed by providing the first crossing return guide 51 in the direction change passage formation first depression portion 41, and in addition, the second crossing return guide 52 in the direction change passage formation second depression portion 42.

It is to be noted that in the present embodiment, as an example, a description will be given of a case where distances from a cross point of the first branch groove portion 53a and the second branch groove portion 53b to respective ends (four ends) of the direction change passage 4 are configured to be same.

The first branch reservoir portion 53c is configured to communicate with the first branch groove portion 53a and the second branch groove portion 53b, on an upper side (on the oil supply opening 6 side) of the cross point of the first branch groove portion 53a and the second branch groove portion 53b, and in addition, communicates with the fifth oil passage formation portion 85. Also, a wall face continuous between the first branch groove portion 53a and the second branch groove portion 53b, out of wall faces configuring the first branch reservoir portion 53c, when viewed from the slider body 16 side, is slanted toward the guide rail arrangement face 18a side from the oil supply opening 6 side, as extending toward the side face of the end cap 1.

The second branch reservoir portion 53d is configured to communicate with the first branch groove portion 53a and the second branch groove portion 53b, on a lower side of the cross point of the first branch groove portion 53a and the second branch groove portion 53b (on the guide rail arrangement face 18a side). Also, a wall face continuous between the first branch groove portion 53a and the second branch groove portion 53b, out of wall faces configuring the second branch reservoir portion 53d, when viewed from the slider body 16 side, is slanted toward the guide rail arrangement face 18a side from the oil supply opening 6 side, as extending toward the side face of the end cap 1.

As described heretofore, the first crossing return guide 51 is arranged in the direction change passage formation first depression portion 41, and in addition, the second crossing return guide 52 is arranged in the direction change passage formation second depression portion 42, so that so that the other of the two lines of the direction change passages 4 that cross mutually in a mutually crossing state in the end cap 1 is formed. It is to be noted that in the drawings and the following description, the direction change passage 4 formed in the sleeve portion on the left side of the end cap 1, out of the direction change passages 4, will be also referred to as "left side direction change passage 41". Similarly, in the drawings and the following description, the direction change passage 4 formed in the sleeve portion on the right side of the end cap 1, out of the direction change passages 4, will be also referred to as "right side direction change passage 4r".

Also, as illustrated in FIG. 4, the processing to remove the right side second oil passage obstruction wall member W2r from the inside of the right side second oil passage formation portion 82r is performed on the end cap 1 included in the linear guide device 2 used in the positional situation that is horizontal.

As mentioned above, the right side second oil passage obstruction wall member W2r is configured such that its thickness and shape of the slit S are set for an operator or the like to be able to remove the right side oil passage obstruction wall member W2r by hand work or with a hand tool. Accordingly, when the processing of removing the right side second oil passage obstruction wall member W2r from the inside of the right side second oil passage formation portion 82r is performed, an operator or the like removes the right side second oil passage obstruction wall member W2r by hand work or with a hand tool, so as to perform the processing of removing the right side second oil passage obstruction wall member W2r on the end cap 1 before the slider body 16 is jointed.

Thus, in the end cap 1 that is jointed with an end face in the moving direction of the slider body 16, out of the oil passage obstruction wall members W for obstructing plural pathways of the oil passages 8, except for the oil passage obstruction wall member W for obstructing the oil passage 8 of a pathway communicating for a liquid to be movable according to the gravity between an oil supply opening (the right side face oil supply opening 6r) located on the upper side of the left side direction change passage 41 and the right side direction change passage 4r in the vertical direction, and the left side direction change passage 41 and the right side direction change passage 4r, the other oil passage obstruction wall members W are removed.

By performing the above processing, the oil passages 8 included in the end cap 1 are configured to form moving pathways of the lubricant so that the lubricant supplied into the oil passage 8 from the right side face oil supply opening 6r can be moved to the left side direction change passage 41 and the right side direction change passage 4r. Also, by performing the above processing, the oil passages 8 included in the end cap 1 are configured to form moving pathways of the lubricant so that the lubricant supplied into the oil passage 8 from the right side face oil supply opening 6r does not always move to only one of the left side direction change passage 41 or the right side direction change passage 4r.

Further, by performing the above processing, out of the oil passages 8 of plural pathways included in the end cap 1, except for the oil passage of a pathway communicating for a liquid to be movable according to the gravity between the oil supply opening (the right side face oil supply opening 6r) located on the upper side of the left side direction change passage 41 and the right side direction change passage 4r in the vertical direction, and the left side direction change passage 41 and the right side direction change passage 4r, the other oil passage obstruction wall members W are removed.

As described heretofore, in the end cap 1 included in the linear guide device 2 in the present embodiment that is jointed with an end face in the moving direction of the slider body 16, at least one of the upper oil passage formation portion 8u or the lower oil passage formation portion 8d is configured to be selectively communicated with the oil supply opening 6, by selectively removing and opening the oil passage obstruction wall member W for obstructing the respective oil passages.

(Operations, Functions, and the Like)

Next, referring to FIG. 1 to FIG. 4, by using FIG. 5, operations, functions, and the like of the linear guide device 2 having the above configuration will be described.

In the operation (use) of the linear guide device 2, when the slider 20 and the guide rail 14 relatively move in the axial direction of the guide rail 14, the plural rolling elements 22 move while rotating in the rolling element circulation passage that is an endless circulation passage, of the rolling element 22, configured with the rolling element rolling passage 10, the rolling element return passage 12, and the direction change passage 4.

When the operation (use) of the above-described linear guide device 2 continues, the lubricant supplied in the rolling element circulation passage decreases, and deteriorates. Besides, the linear guide device 2 is operated (used), in a state where the lubricant has not been newly supplied for a certain period of time, the lubricant that is supplied in the rolling element circulation passage decreases and deteriorates.

Thus, when the lubricant that is supplied in the rolling element circulation passage decreases and deteriorates, in order to suppress the degradation in the operation performance of the linear guide device 2, the lubricant needs to be newly supplied (oil supply) into the rolling element circulation passage.

As described above, the linear guide device 2 in the present embodiment is configured such that the lubricant can be supplied from the right side face oil supply opening 6r more easily than the left side face oil supply opening 6l. For this reason, when the lubricant is newly supplied to the rolling element circulation passage, the lubricant is to be supplied into the oil passages 8 from the right side face oil supply opening 6r by using a member (such as grease gun, or pump) with which the lubricant can be supplied.

Then, the lubricant that has been supplied from the right side face oil supply opening 6r into the oil passage 8 moves from the right side first oil passage formation portion 81r to the right side second oil passage formation portion 82r. The right side first oil passage obstruction wall member W1r suppresses the movement of the lubricant into the right side fourth oil passage formation portion 84r, and thus, permits the supply of the lubricant into the right side second oil passage formation portion 82r continuously.

It is to be noted that since the right side first oil passage obstruction wall member W1r has the slit S, the lubricant to be suppressed by the right side first oil passage obstruction wall member W1r from moving into the right side fourth oil passage formation portion 84r might move through the slit S. However, a large part thereof is suppressed by the right side first oil passage obstruction wall member W1r from moving into the right side fourth oil passage formation portion 84r. Therefore, in the following description, it is assumed that the entire lubricant that has moved into the right side second oil passage formation portion 82r is suppressed by the right side first oil passage obstruction wall member W1r from moving into the right side fourth oil passage formation portion 84r.

When the supply of the lubricant into the right side second oil passage formation portion 82r continues, the lubricant partially moves into the right side third oil passage formation portion 83r. The movement of the lubricant to the right side fifth oil passage formation portion 85r is suppressed by the right side third oil passage obstruction wall member W3r, and the supply of the lubricant into the right side third oil passage formation portion 83r continues.

It is to be noted that since the right side third oil passage obstruction wall member W3r has the slit S, like the right side first oil passage obstruction wall member W1r. The lubricant, while its movement into the right side fifth oil passage formation portion 85r is suppressed by the right side third oil passage obstruction wall member W3r, may move through the slit S. However, according to the same reason as that of the right side first oil passage obstruction wall member W1r, in the following description, it is assumed that the entire lubricant that has moved to the right side third oil passage formation portion 83r is suppressed by the right side third oil passage obstruction wall member W3r from moving to the right side fifth oil passage formation portion 85r.

As described above, in the state where the movement of the lubricant to the right side fourth oil passage formation portion 84r and the right side fifth oil passage formation portion 85r is suppressed, when the supply of the lubricant from the right side face oil supply opening 6r to the oil passage 8 continues, the lubricant that is being supplied into the right side second oil passage formation portion 82r continuously has an increase in the reserved amount in the right side second oil passage formation portion 82r. Then, the lubricant that is reserved in the right side second oil passage formation portion 82r moves upward as compared to the location perpendicular to the right side first oil passage formation portion 81r.

Herein, in the end cap 1 included in the linear guide device 2 in the present embodiment, the right side second oil passage obstruction wall member W2r is removed from the inside of the right side second oil passage formation portion 82r (see FIG. 4).

Therefore, when the supply of lubricant from the right side face oil supply opening 6r into the oil passage 8 continues, the lubricant that has moved upward in the right side second oil passage formation portion 82r, as compared to the location perpendicular to the right side first oil passage formation portion 81r, moves into the upper oil passage formation portion 8u from the inside of the right side second oil passage formation portion 82r.

Then, the lubricant that has moved to the upper oil passage formation portion 8u from the inside of the right side second oil passage formation portion 82r moves to the left side second oil passage formation portion 82l side. The lubricant moves into the central oil passage formation portion 8c at the midpoint of the upper oil passage formation portion 8u, flows down in the central oil passage formation portion 8c, and reaches the lower oil passage formation portion 8d.

Herein, the positional situation of the linear guide device 2 when in use in the present embodiment is horizontal, and the lower oil passage formation portion 8d extends in the width direction of the end cap 1. Accordingly, the lubricant that has flown in the central oil passage formation portion 8c and that has reached the lower oil passage formation portion 8d moves to one end side and the other end side of the lower oil passage formation portion 8d.

Then, the lubricant that has moved to one end side of the lower oil passage formation portion 8d moves through the left side fifth oil passage formation portion 85l into the return guide side oil passage 53, and is reserved in the first branch reservoir portion 53c and the second branch reservoir portion 53d. Subsequently, the lubricant, the reserved amounts of which are increased in the first branch reservoir portion 53c and the second branch reservoir portion 53d, moves through the first branch groove portion 53a and the second branch groove portion 53b into the left side direction change passage 41. On the other hand, the lubricant that has moved to the other end side of the lower oil passage formation portion 8d, moves through the right side fifth oil passage formation portion 85r into the return guide side oil passage 53, and is reserved in the first branch reservoir portion 53c and the second branch reservoir portion 53d. Subsequently, the lubricant, the reserved amounts of which are increased in the first branch reservoir portion 53c and the second branch reservoir portion 53d, moves through the first branch groove portion 53a and the second branch groove portion 53b into the right side direction change passage 4r.

As described above, in the linear guide device 2 in the present embodiment, the lubricant that has been supplied from the right side face oil supply opening 6r into the oil passage 8 moves to the left side direction change passage 4l and the right side direction change passage 4r, and is supplied into the rolling element circulation passage. Specifically, the lubricant that has been supplied to the oil passage 8 from the right side face oil supply opening 6r sequentially moves through the right side first oil passage formation portion 81r, the right side second oil passage formation portion 82r, the upper oil passage formation portion 8u, the central oil passage formation portion 8c, and the lower oil passage formation portion 8d, and moves to one end side and the other end side of the lower oil passage formation portion 8d.

Then, the lubricant that has moved to one end side of the lower oil passage formation portion 8d moves through the left side fifth oil passage formation portion 85l into the return guide side oil passage 53, and is reserved in the first branch reservoir portion 53c and the second branch reservoir portion 53d. Further, the lubricant, the reserved amounts of which are increased in the first branch reservoir portion 53c and the second branch reservoir portion 53d, moves through the first branch groove portion 53a and the second branch groove portion 53b into the left side direction change passage 41.

On the other hand, the lubricant that has moved to the other end side of the lower oil passage formation portion 8d moves through the right side fifth oil passage formation portion 85r into the return guide side oil passage 53, and is reserved in the first branch reservoir portion 53c and the second branch reservoir portion 53d. Further, the lubricant, the reserved amounts of which are increased in the first branch reservoir portion 53c and the second branch reservoir portion 53d, moves through the first branch groove portion 53a and the second branch groove portion 53b into the right side direction change passage 4r.

Then, the lubricants that have moved into the left side direction change passage 41 and the right side direction change passage 4r are supplied to the rolling element circulation passages, respectively. It is to be noted that FIG. 5 is a view illustrative of a moving pathway of the lubricant in the linear guide device 2 in the present embodiment. In addition, in FIG. 5, the moving pathway of the lubricant is indicated by arrows. Further, in FIG. 5, the moving pathway of the lubricant in the return guide side oil passage 53 is omitted. This also applies to the following drawings.

Figure 5:
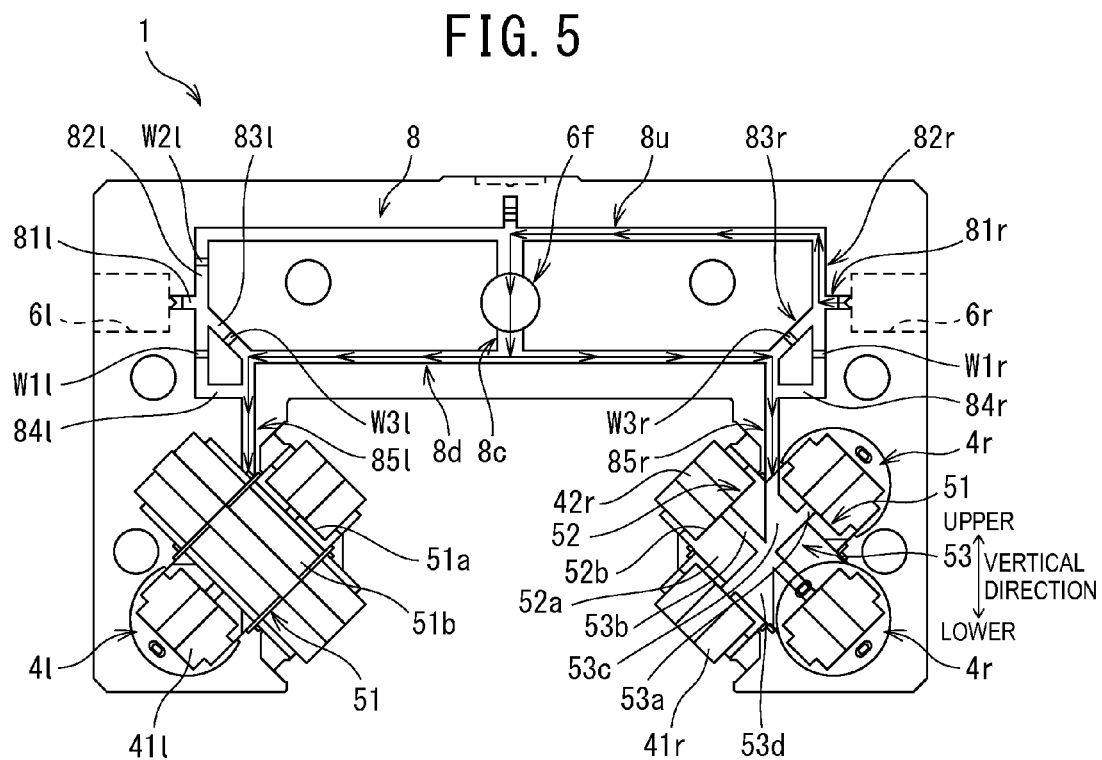
FIG. 5 is a view illustrative of a moving pathway of a lubricant in the linear guide device in the first embodiment of the present disclosure.

It is to be noted that the right side first oil passage formation portion 81r, the right side second oil passage formation portion 82r, the upper oil passage formation portion 8u, the central oil passage formation portion 8c, and the lower oil passage formation portion 8d, to be specific, the moving pathway indicated by arrows in FIG. 5 conforms with a first pathway of the oil passage configured to communicate the right side face oil supply opening 6r with the left side direction change passage 41 and the right side direction change passage 4r, with the linear guide device 2 being arranged on a plane face. In addition, the first pathway of the oil passage, when viewed from the moving direction of the slider body 16, is a moving pathway originating from the right side face oil supply opening 6r that is an oil supply opening located on the upper side of the direction change passage 4 in the vertical direction, out of the plural oil supply openings 6 at plural locations, branching at a part between the left side direction change passage 41 and the right side direction change passage 4r, and reaching the left side direction change passage 41 and the right side direction change passage 4r.

(Advantageous Effects in the First Embodiment)

Advantageous effects in the present embodiment will be enumerated as follows.

(1) According to the end cap 1 included in the linear guide device 2 in the present embodiment, out of the plural oil passages 8 of plural pathways, except for the oil passage 8 of the pathway configured to communicate the oil supply opening 6 located on the upper side of the direction change passage 4 in the vertical direction, out of the plural oil supply openings 6 of plural locations, so that the liquid can be moved by the gravity, the other oil passages 8 are obstructed. Accordingly, in the end cap 1 included in the linear guide device 2 in the present embodiment, in the state where the end cap 1 is jointed with an end face in the moving direction of the slider body 16, at least one of the upper oil passage formation portion 8u or the lower oil passage formation portion 8d is configured to be selectively communicated with the oil supply opening 6, by selectively removing the oil passage obstruction wall member W for obstructing each of the oil passages 8, for opening the pathway.

Therefore, it is made possible to move the liquid lubricant which has been supplied from the oil supply opening 6 located on the upper side of the direction change passage 4 in the vertical direction by gravity, and to introduce the lubricant into all of the direction change passages 4.

As a result, regardless of the positional situation of the linear guide device 2 when in use, it becomes possible to supply the lubricant into all of the rolling element circulation passages. Hence, it is possible to suppress the degradation in the operation performance and in the durability of the linear guide device 2.

(2) According to the end cap 1 included in the linear guide device 2 in the present embodiment, out of the oil passage obstruction wall members W for obstructing the plural oil passages 8 of plural pathways, except for the oil passage obstruction wall member W for obstructing the oil passage 8 of the pathway configured to communicate the oil supply opening 6 located on the upper side of the direction change passage 4 in the vertical direction, out of the plural oil supply openings 6 of plural locations, so that the liquid can be moved by the gravity, the other oil passage obstruction wall members are obstructed.

Therefore, it is made possible to move by gravity the liquid lubricant which has been supplied from the oil supply opening 6 located on the upper side of the direction change passage 4 in the vertical direction, and to introduce the lubricant into all of the direction change passages 4.

As a result, without adding a new part to the end cap 1, complexity of the configuration and an increase in the number of the parts can be suppressed, and an increase in cost can be suppressed. In addition, regardless of the positional situation of the linear guide device 2 when in use, the lubricant can be supplied into the rolling element circulation passages.

(3) In the end cap 1 included in the linear guide device 2 in the present embodiment, the oil passage obstruction wall member W is formed to have a plate shape, and the slit S is formed in at least a part between the oil passage obstruction wall member W and the oil passage 8.

Therefore, since the coupling force of the oil passage 8 and the oil passage obstruction wall member W can be reduced by the slit S, it is made easier for an operator or the like to remove the oil passage obstruction wall member W for obstructing the oil passages 8 except for the oil passage 8 communicating the oil supply opening 6 located on the upper side of the direction change passage 4 in the vertical direction with the direction change passage 4 so that the liquid can be moved by gravity.

As a result, the processing of the end cap 1 to be carried out depending on the positional situation of the linear guide device 2 when in use becomes easy, and the formation of the linear guide device 2 included in the end cap 1 becomes easy, so that the production efficiency of the linear guide device 2 can be improved.

(4) In the end cap 1 included in the linear guide device 2 in the present embodiment, in a state where the linear guide device 2 is arranged on a horizontal plane, the first pathway of the oil passage configured to communicate the right side face oil supply opening 6r with the left side direction change passage 41 and the right side direction change passage 4r, when viewed from the moving direction of the slider body 16, is configured with a pathway originating from the right side face oil supply opening 6r that is an oil supply opening 6r located on the upper side of the direction change passage 4 in the vertical direction, out of the plural oil supply openings 6 of plural locations, branching at a part between the left side direction change passage 41 and the right side direction change passage 4r, and reaching the left side direction change passage 41 and the right side direction change passage 4r.

Accordingly, when the linear guide device 2 is used in the positional situation that is horizontal, the liquid lubricant that has been supplied from the oil supply opening 6 located on the upper side of the direction change passage 4 in the vertical direction can be moved into the first oil passage and introduced into the direction change passage 4.

As a result, when the linear guide device 2 is used in the positional situation that is horizontal, it is possible to supply the lubricant into the left side direction change passage 41 and the right side direction change passage 4r, and it is thus possible to suppress a degradation in the operation performance and in the durability of the linear guide device 2.

(Modifications)

Modifications in the present embodiment will be enumerated as follows.

Figure 6:
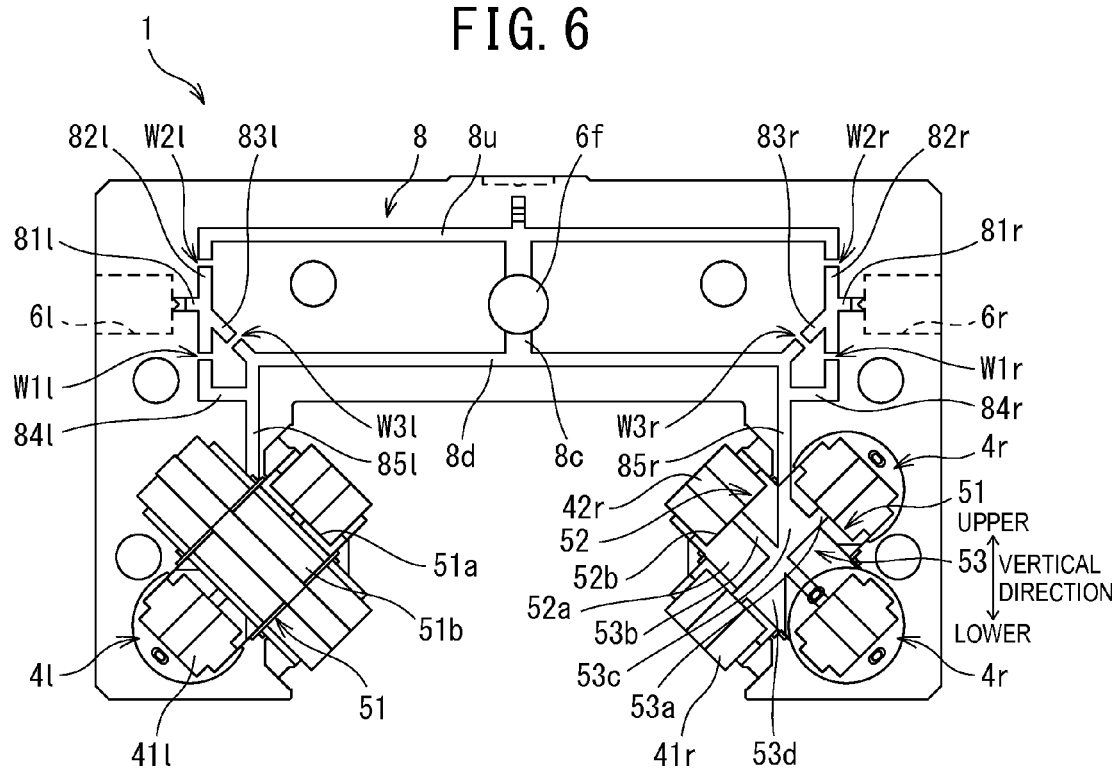
FIG. 6 is a view illustrative of a configuration in a modification in the first embodiment of the present disclosure.

(1) In the end cap 1 included in the linear guide device 2 in the present embodiment, each oil passage obstruction wall member W (the left side first oil passage obstruction wall member W1l or the like) is configured to have the slit S. However, the present embodiment is not limited to this. In other words, instead of the provision of a gap portion such as a slit, each oil passage obstruction wall member W may be configured, for example, as illustrated in FIG. 6, to be coupled to a part included in the bottom face or the side face of each oil passage formation portion (the left side second oil passage formation portion 82l or the like) formed in a depression shaped groove. It is to be noted that FIG. 6 is a view illustrative of a configuration in a modification of the present embodiment, and is a view illustrative of a joint face of the end cap 1, with the slider body.

In this case, when compared with the case where each oil passage obstruction wall member W is configured to have the slit S, the lubricant, while its movement into the oil passage formation portion is suppressed by the oil passage obstruction wall member W, will not move through the slit S. For this reason, the oil passage obstruction wall member W enables the prevention of the movement of the lubricant into the oil passage formation portion.

However, when compared with the case where each oil passage obstruction wall member W is configured to have the slit S, it becomes difficult for an operator or the like to remove each oil passage obstruction wall member W by hand work. For this reason, in removing each oil passage obstruction wall member W from the oil passage formation portion, for example, it should be removed by machine processing by using a drill or the like.

Figure 7:
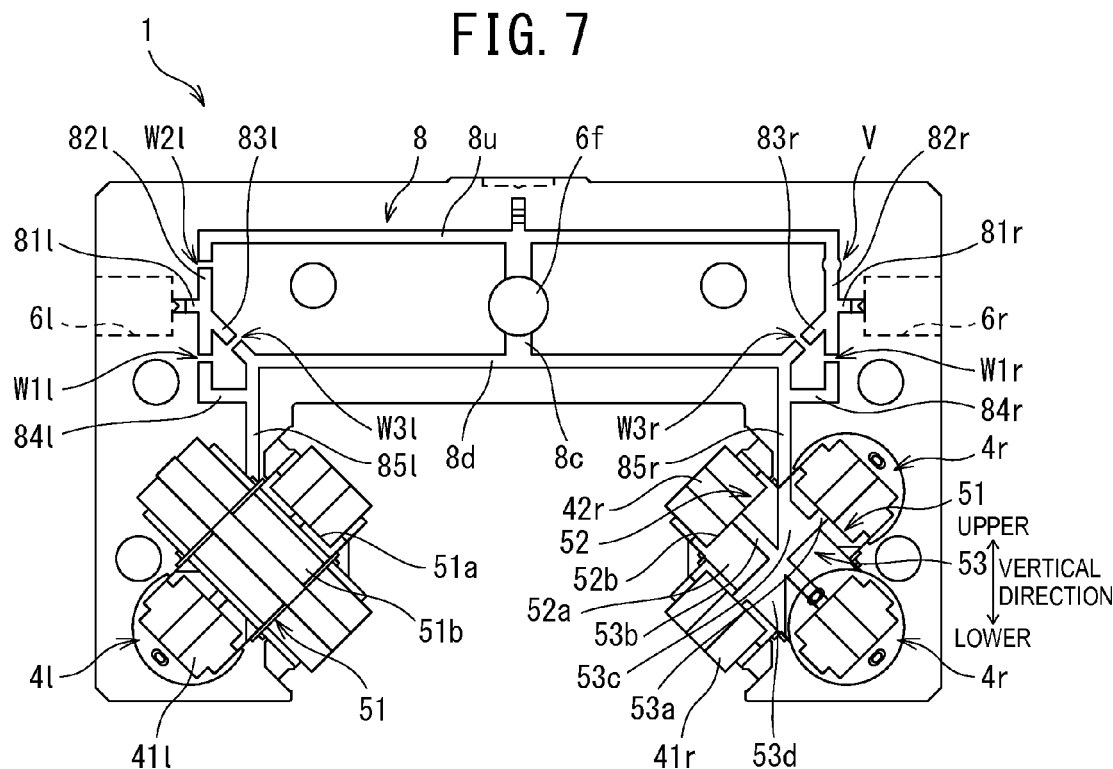
FIG. 7 is a view illustrative of a configuration in a modification in the first embodiment of the present disclosure.

Accordingly, when each oil passage obstruction wall member W is configured without the provision of a gap portion, for example, as illustrated in FIG. 7, when the right side second oil passage obstruction wall member W2r is removed from the inside of the right side second oil passage formation portion 82r by using a cutting tool such as a drill, as compared to the present embodiment, the oil passage formation portion of the part from which the oil passage obstruction wall member W is removed forms a large space V, in some cases. It is to be noted that FIG. 7 is a view illustrative of a configuration in a modification in the present embodiment, and is a view illustrative of the state where the oil passage obstruction wall member W is removed from the oil passage formation portion by machine processing.

Herein, as described above, a hard resin material such as polyacetal or the like may be used as a material of the end cap 1. Also, since polyacetal has a small coefficient of friction, its processing with a drill or the like is easy.

Further, since polyacetal has a small coefficient of friction, when polyacetal is used as a material of the end cap 1, the coefficient of friction of the oil passage 8 is also small, thereby making the lubricant easy to move in the oil passage 8.

Thus, when polyacetal is used as a material of the end cap 1, and in addition, the width of the part of the oil passage 8 that is opened by selectively removing the oil passage obstruction wall member W, that is the width of the large space V is made larger than those of other oil passages 8, the lubricant supplied to the oil passage 8 is stored in the space V. Moreover, since the coefficient of friction of the oil passage 8 is small, the lubricant stored in the space V will be supplied gradually from the space V to the direction change passage 4.

(2) The linear guide device 2 in the present embodiment is configured to use the cylindrical roller as the rolling element 22. However, the present embodiment is not limited to this, and a steel ball may be used as the rolling element 22. In addition, as the rolling element 22, a needle-shaped roller or the like may be used, other than the cylindrical roller.

(3) In the end cap 1 included in the linear guide device 2 in the present embodiment, one end of the upper oil passage formation portion 8u is made to be continuous with a part of the left side second oil passage formation portion 82l, which is the farthermost from the left side direction change passage 41, whereas the other end of the upper oil passage formation portion 8u is made to be continuous with a part of the right side second oil passage formation portion 82r, which is the farthermost from the right side direction change passage 4r. However, the configuration of the upper oil passage formation portion 8u is not limited to this. In other words, both ends of the upper oil passage formation portion 8u may be located to connect the left side first oil passage formation portion 81l and the right side first oil passage formation portion 81r at a shortest distance. In this case, for example, in the upper oil passage formation portion 8u, the left side second oil passage obstruction wall member W21 is arranged at the part on the left side first oil passage formation portion 81l side as compared to the central oil passage formation portion 8c, and a right side second oil passage obstruction wall member W2r is arranged at the part on the right side first oil passage formation portion 81r side as compared to the central oil passage formation portion 8c.

Figure 8:
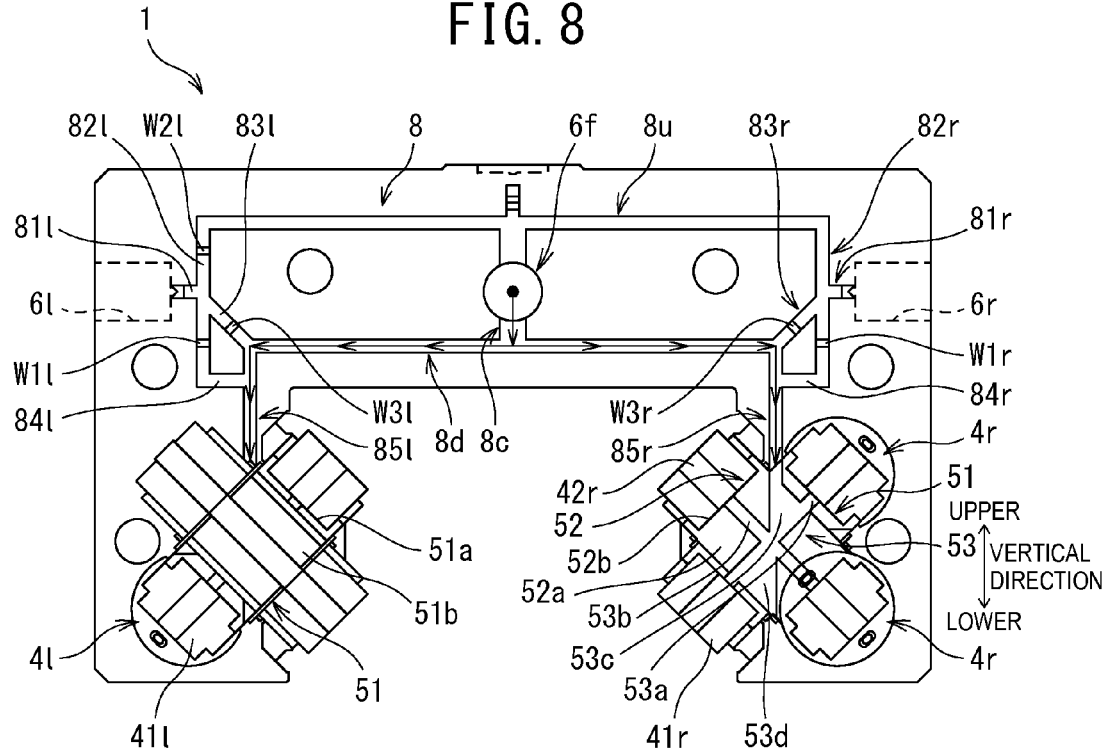
FIG. 8 is a view illustrative of a configuration in a modification in the first embodiment of the present disclosure.

(4) In the present embodiment, the lubricant is configured to be supplied from the right side face oil supply opening 6r into the oil passage 8. However, the present embodiment is not limited to this. In other words, for example, as illustrated in FIG. 8, the lubricant may be supplied from the front face oil supply opening 6f into the oil passage 8. It is to be noted that FIG. 8 is a view illustrative of a configuration in a modification in the present embodiment, and is a view illustrative of a joint face of the end cap 1, with the slider body. Also, in FIG. 8, the moving pathway of the lubricant is indicated by arrows.

In this case, the lubricant supplied from the front face oil supply opening 6f into the oil passage 8 flows down in the central oil passage formation portion 8c, reaches the lower oil passage formation portion 8d, and moves one end side of the lower oil passage formation portion 8d and the other end side of the lower oil passage formation portion 8d.

Then, the lubricant that has moved to one end side of the lower oil passage formation portion 8d moves through the left side fifth oil passage formation portion 85l into the return guide side oil passage 53, and is reserved in the first branch reservoir portion 53c and the second branch reservoir portion 53d. Moreover, the lubricant, the reserved amounts of which are increased in the first branch reservoir portion 53c and the second branch reservoir portion 53d, moves through the first branch groove portion 53a and the second branch groove portion 53b into the left side direction change passage 41.

On the other hand, the lubricant that has moved to the other end side of the lower oil passage formation portion 8d moves through the right side fifth oil passage formation portion 85r into the return guide side oil passage 53, and is reserved in the first branch reservoir portion 53c and the second branch reservoir portion 53d. Then, the lubricant, the reserved amounts of which are increased in the second branch reservoir portion 53d and the second branch reservoir portion 53d, moves through the first branch groove portion 53a and the second branch groove portion 53b into the right side direction change passage 4r.

Second Embodiment

Hereinafter, a second embodiment in the present disclosure (hereinafter, referred to as "the present embodiment") will be described with reference to the drawings.
(Configuration)
Firstly, referring to FIG. 1 and FIG. 2, by using FIG. 9, the configuration of the linear guide device and the end cap included in the linear guide device in the present embodiment will be described. It is to be noted that, in the drawings and the following description, the same components and configurations as those of the first embodiment described above have the same reference numerals.

In the linear guide device 2 in the present embodiment, the bottom face of the guide rail 14 is arranged on a guide rail arrangement face configured with a vertical wall face (not illustrated). In other words, the positional situation of the linear guide device 2 when in use in the present embodiment is vertical, and a slanted angle with respect to the horizontal plane is 90 degrees. It is to be noted that in the present embodiment, a description will be given of a case where the bottom face of the guide rail 14 is arranged on the guide rail arrangement face, so that the right side direction change passage 4r is located on the upper side of the left side direction change passage 41 in the vertical direction.

Figure 9:
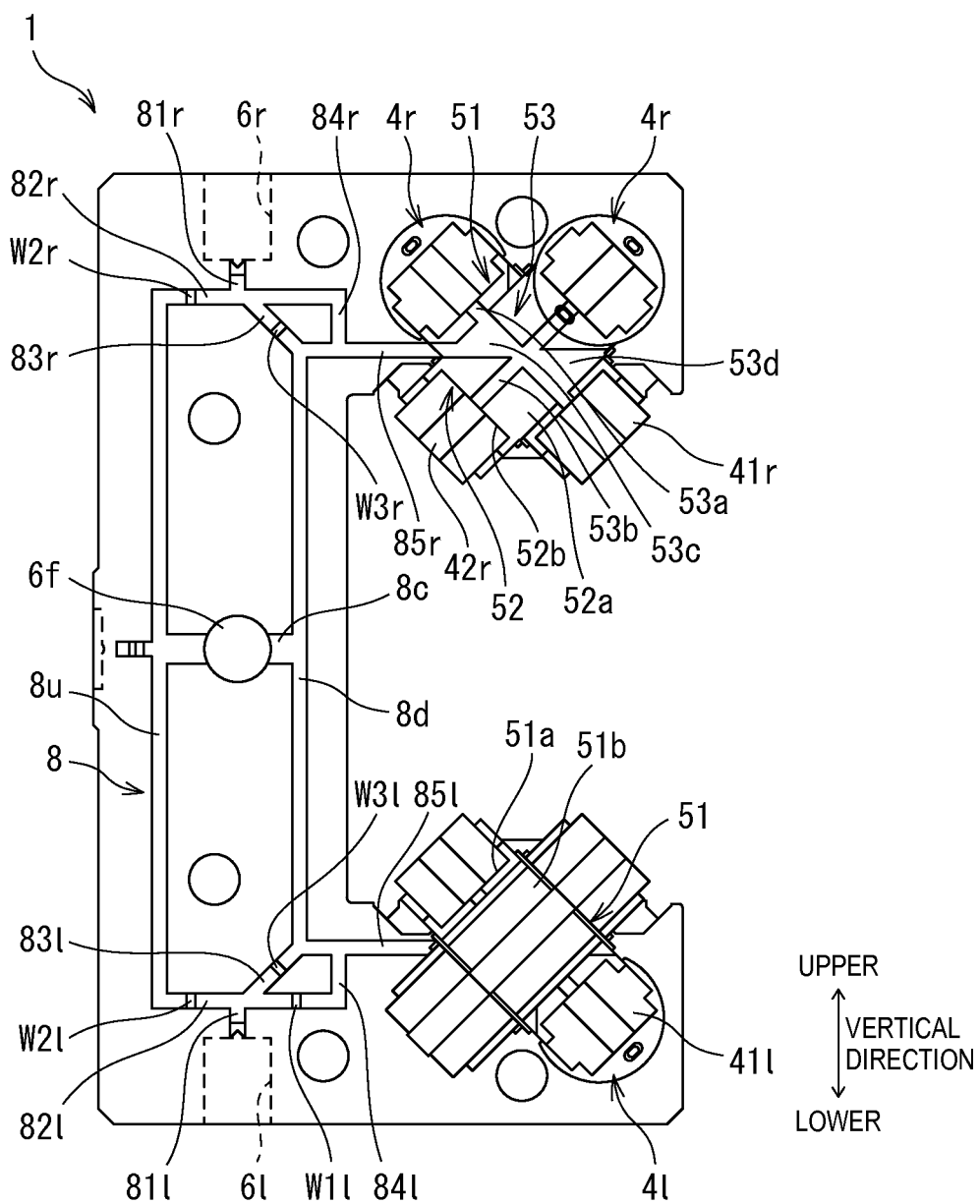
FIG. 9 is a view illustrative of a configuration of the end cap on which processing is carried out depending on the positional situation of the linear guide device in a second embodiment of the present disclosure.

Thus, in other words, as illustrated in FIG. 9, on the end cap 1 included in the linear guide device 2 in the present embodiment, processing is carried out depending on the positional situation of the linear guide device 2 when in use from the above-described initial state (see FIG. 1 and FIG. 2), that is the positional situation that is vertical. It is to be noted that FIG. 9 is a view illustrative of a configuration of the end cap 1 on which the processing is carried out depending on the positional situation of the linear guide device 2 when in use. Specifically, FIG. 9 is a view illustrative of a joint face of the end cap 1, with the slider body 16, like FIG. 4.

As illustrated in FIG. 9, processing of removing the right side first oil passage obstruction wall member W1r from the inside of the right side second oil passage formation portion 82r, in the end cap 1 included in the linear guide device 2 when in use in the positional situation that is horizontal.
(Operations, Functions, and the Like)
Next, referring to FIG. 1, FIG. 2 and FIG. 9, by using FIG. 10, operations, functions, and the like of the linear guide device 2 having the above configuration will be described. It is to be noted that the descriptions of the same operations, functions, and the like as those of the above-described first embodiment will be omitted in some cases.

When the linear guide device 2 is operated (used), in newly supplying the lubricant (supplying oil) to the rolling element circulation passage, the lubricant is supplied into the oil passage 8 from the right side face oil supply opening 6r by use of a member with which the lubricant can be supplied (such as a grease gun).

Then, the lubricant that has been supplied from the right side face oil supply opening 6r into the oil passage 8 moves from the right side first oil passage formation portion 81r to the right side second oil passage formation portion 82r, and the movement of the lubricant to the right side fifth oil passage formation portion 85r is suppressed by the right side third oil passage obstruction wall member W3r, and is supplied into the right side second oil passage formation portion 82r continuously.

As described above, when the supply of the lubricant into the oil passage 8 from the right side face oil supply opening 6r continues, with the movement of the lubricant into the right side fourth oil passage formation portion 84r being suppressed. The lubricant, which is continuously supplied into the right side third oil passage formation portion 83r, has an increase in the reserved amount in the right side third oil passage formation portion 83r. Then, the lubricant reserved in the right side third oil passage formation portion 83r moves on the upper side than the location perpendicular to the right side second oil passage formation portion 82r.

Subsequently, when the supply of the lubricant into the oil passage 8 from the right side face oil supply opening 6r continues, the lubricant that has moved on the upper side in the right side first oil passage formation portion 81r than the location perpendicular to the right side first oil passage formation portion 81r moves to the upper oil passage formation portion 8u side and the right side fourth oil passage formation portion 84r side from the inside of the right side second oil passage formation portion 82r.

The lubricant that moves to the upper oil passage formation portion 8u side from the inside of the right side second oil passage formation portion 82r is suppressed by the right side second oil passage obstruction wall member W2r from moving to the upper oil passage formation portion 8u.

In this situation, in the end cap 1 included in the linear guide device 2 in the present embodiment, the right side first oil passage obstruction wall member W1r is removed from the inside of the right side second oil passage formation portion 82r (see FIG. 9).

Accordingly, the lubricant that has moved to the right side fourth oil passage formation portion 84r side from the inside of the right side second oil passage formation portion 82r moves into the right side fourth oil passage formation portion 84r, flows down in the right side fourth oil passage formation portion 84r, and reaches the right side fifth oil passage formation portion 85r.

Herein, the positional situation of the linear guide device 2 when in use in the present embodiment is vertical, and the right side fifth oil passage formation portion 85r extends in the direction perpendicular to the width direction of the end cap 1. For this reason, the lubricant that has flown down in the right side fourth oil passage formation portion 84r and that has reached the right side fifth oil passage formation portion 85r moves to one end side (lower end side) of the right side fifth oil passage formation portion 85r and the other end side (upper end side) of the right side fifth oil passage formation portion 85r in the location where the right side fourth oil passage formation portion 84r and the right side fifth oil passage formation portion 85r are continuous to each other.

Then, the lubricant that has moved to one end side of the right side fifth oil passage formation portion 85r moves into the right side direction change passage 4r.

On the other hand, the lubricant that has moved to the other end side of the right side fifth oil passage formation portion 85r moves into the lower oil passage formation portion 8d and flows down in the lower oil passage formation portion 8d. Subsequently, the movement of the lubricant into the left side second oil passage formation portion 82l is suppressed by the left side third oil passage obstruction wall member W3l, and is continuously supplied into the left side third oil passage formation portion 83l.

As described above, when the lubricant is continuously supplied into the passage 8 from the right side face oil supply opening 6r with the movement of the lubricant into the left side second oil passage formation portion 82l being suppressed, the lubricant, which is continuously supplied into the left side third oil passage formation portion 83l, has an increase in the reserved amount in the left side third oil passage formation portion 83l.

Then, the lubricant that is reserved in the left side third oil passage formation portion 83l moves on the upper side than the location perpendicular to the left side fifth oil passage formation portion 85l. When the supply of the lubricant from the right side face oil supply opening 6r into the oil passage 8 continues, the lubricant that has moved to the upper side than the location perpendicular to the left side fifth oil passage formation portion 85l in the left side third oil passage formation portion 83l moves to the left side fourth oil passage formation portion 84l side from the inside of the left side fifth oil passage formation portion 85l, flows down in the left side fourth oil passage formation portion 84l, and reaches the left side second oil passage formation portion 82l.

The movement of the lubricant, which has moved into the left side second oil passage formation portion 82l, is suppressed by the left side first oil passage obstruction wall member W1l. For this reason, when the supply of the lubricant into the oil passage 8 from the right side face oil supply opening 6r continues, the lubricant, which is continuously supplied into the left side second oil passage formation portion 82l and the left side fourth oil passage formation portion 84l, has been increased in the reserved amount, and moves to the upper side than the location perpendicular to the left side fifth oil passage formation portion 85l.

Then, when the supply of the right side face oil supply opening 6r into the oil passage 8 continues, the lubricant that has moved to the upper side of the location perpendicular to the left side fifth oil passage formation portion 85l in the left side second oil passage formation portion 82l and the left side fourth oil passage formation portion 84l moves through the left side fifth oil passage formation portion 85l into the left side direction change passage 41.

Figure 10:
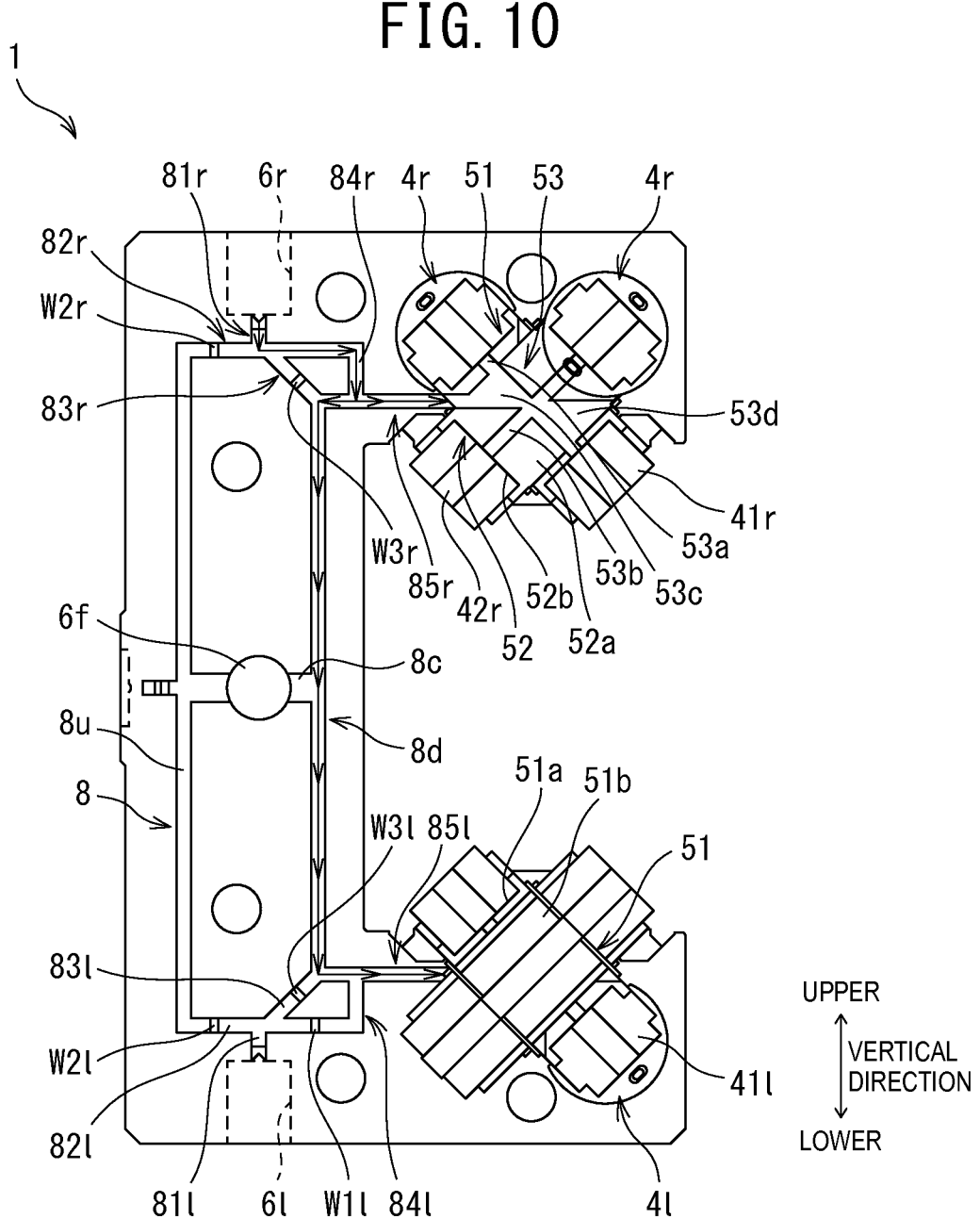
FIG. 10 is a view illustrative of a moving pathway of the lubricant in the linear guide device in the second embodiment of the present disclosure.

As described above, in the linear guide device 2 in the present embodiment, as illustrated in FIG. 10, the lubricant that has been supplied from the right side face oil supply opening 6r into the oil passage 8 moves to the left side direction change passage 41 and the right side direction change passage 4r, and is supplied into the rolling element circulation passages. It is to be noted that FIG. 10 is a view illustrative of a moving pathway of the lubricant in the linear guide device 2 in the present embodiment.

Specifically, the lubricant which is supplied from the right side face oil supply opening 6r into the oil passage 8 sequentially moves through the right side first oil passage formation portion 81r, the right side second oil passage formation portion 82r, the right side fourth oil passage formation portion 84r, and the right side fifth oil passage formation portion 85r, and moves into the right side direction change passage 4r. Also, the lubricant which has moved to the right side fourth oil passage formation portion 84r sequentially moves through the right side fifth oil passage formation portion 85r, the lower oil passage formation portion 8d, and the left side fifth oil passage formation portion 85l, and moves into the left side direction change passage 41. Thus, the lubricant supplied from the right side face oil supply opening 6r into the oil passage 8 is supplied into the two rolling element circulation passages. It is to be noted that, in FIG. 10, a moving pathway of the lubricant is indicated by arrows.

It is to be noted that the right side first oil passage formation portion 81r, the right side second oil passage formation portion 82r, the right side fourth oil passage formation portion 84r, the right side fifth oil passage formation portion 85r, the lower oil passage formation portion 8d, and the left side fifth oil passage formation portion 85l, to be specific, that is a moving pathway indicated by arrows in FIG. 10 conforms to a second pathway of the oil passage configured to communicate the right side face oil supply opening 6r with and the left side direction change passage 41 and the right side direction change passage 4r, with the linear guide device 2 being arranged on a vertical plane. In addition, the second pathway of the oil passage is a moving pathway configured to originate from the right side face oil supply opening 6r that is one of the plural oil supply openings at plural locations located on the upper side of the direction change passage 4 in the vertical direction, when viewed from the moving direction of the slider body 16, to branch at a part closer to the right side face oil supply opening 6r in either the left side direction change passage 41 or the right side direction change passage 4r, and to reach the left side direction change passage 41 and the right side direction change passage 4r.

(Advantageous Effects in the Second Embodiment)

Advantageous effects in the present embodiment will be described as follows.

In addition to the advantageous effects (1) to (3) described in the first embodiment, the following effects are achievable.

(1) In the end cap 1 included in the linear guide device 2 in the present embodiment, with the linear guide device 2 being arranged on a vertical plane, the second pathway of the oil passage configured to communicate the right side face oil supply opening 6r with the left side direction change passage 41 and the right side direction change passage 4r is a pathway configured to originate from the right side face oil supply opening 6r that is one of the plural oil supply openings 6 at plural locations located on the upper side than the direction change passage 4 in the vertical direction, when viewed from the moving direction of the slider body 16, to branch at a part closer to the right side face oil supply opening 6r in either the left side direction change passage 41 or the right side direction change passage 4r, and to reach the left side direction change passage 41 and the right side direction change passage 4r.

Accordingly, when the linear guide device 2 is used in the positional situation that is vertical, the liquid lubricant that has been supplied from the oil supply opening 6 located on the upper side than the direction change passage 4 in the vertical direction can be moved by gravity in the second oil passage and introduced into the direction change passage 4.

As a result, when the linear guide device 2 is used in the positional situation that is vertical, it is made possible to supply the lubricant into the left side direction change passage 41 and the right side direction change passage 4r, and it is thus possible to suppress a degradation in the operation performance and in the durability of the linear guide device 2.

(Modifications)

Modifications in the present embodiment will be described as follows.

Figure 11:
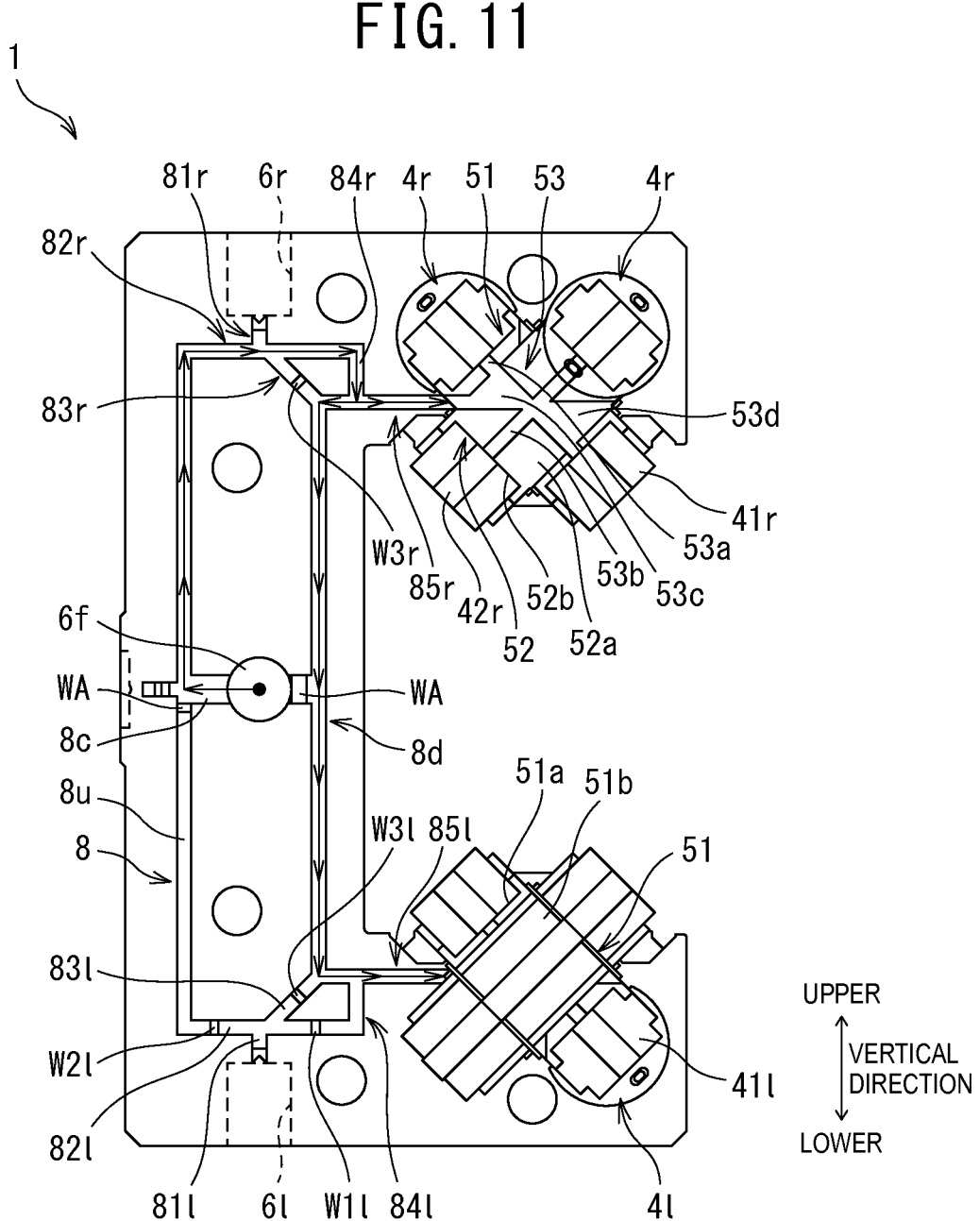
FIG. 11 is a view illustrative of a configuration in a modification in the second embodiment of the present disclosure.

(1) In the present embodiment, the lubricant is configured to be supplied from the right side face oil supply opening 6r into the oil passage 8. However, the present embodiment is not limited to this. In other words, as illustrated in FIG. 11, for example, the lubricant may be supplied from the front face oil supply opening 6f into the oil passage 8. It is to be noted that FIG. 11 is a view illustrative of a configuration in a modification in the present embodiment, and is a view illustrative of a joint face of the end cap 1, with the slider body. Also, in FIG. 11, a moving pathway of the lubricant is indicated by arrows.

In this case, for example, in the upper oil passage formation portion 8u, an additional oil passage obstruction wall member WA is arranged at a location on the lower side than the central oil passage formation portion 8c in the vertical direction with the linear guide device 2 being arranged on a vertical plane. In addition, in the central oil passage formation portion 8c, an additional oil passage obstruction wall member WA is arranged at a location between the front face oil supply opening 6f and the lower oil passage formation portion 8d. It is to be noted that such an additional oil passage obstruction wall member WA is added to the end cap 1 in the initial state, is a member for obstructing the part in the oil passage 8 where the additional oil passage obstruction wall member WA is located, and is configured with for example, a felt paper or the like located in the oil passage 8 (the upper oil passage formation portion 8u, the central oil passage formation portion 8c).

As described above, in the configuration illustrated in FIG. 11, the additional oil passage obstruction wall member WA obstructs apart in the upper oil passage formation portion 8u on the lower side than the central oil passage formation portion 8c in the vertical direction, with the linear guide device 2 being arranged on the vertical plane, and a part between the front face oil supply opening 6f and the lower oil passage formation portion 8d in the central oil passage formation portion 8c. For this reason, the lubricant that has been supplied from the front face oil supply opening 6f into the oil passage 8 moves, from the central oil passage formation portion 8c, upward on the upper side than the part in the upper oil passage formation portion 8u where the additional oil passage obstruction wall member WA is located, moves through the right side second oil passage formation portion 82r, and reaches the right side fourth oil passage formation portion 84r.

Then, the lubricant that has moved to the right side fourth oil passage formation portion 84r branches into two directions. In one of the two directions, the lubricant moves through the right side fifth oil passage formation portion 85r into the return guide side oil passage 53, and is reserved in the first branch reservoir portion 53c and the second branch reservoir portion 53d. Further, the lubricant, which has been increased in the reserved amounts in the first branch reservoir portion 53c and the second branch reservoir portion 53d, move through the first branch groove portion 53a and the second branch groove portion 53b into the right side direction change passage 4r.

Also, in the other of the two directions, the lubricant, which has moved into the right side fourth oil passage formation portion 84r and branched into the two directions, moves to the lower oil passage formation portion 8d, flows down in the lower oil passage formation portion 8d, moves through the left side fifth oil passage formation portion 85l, moves into the return guide side oil passage 53, and is reserved in the first branch reservoir portion 53c and the second branch reservoir portion 53d. Subsequently, the lubricant, which has been increased in the reserved amounts in the first branch groove portion 53a and the second branch reservoir portion 53d, moves through the first branch groove portion 53a and the second branch groove portion 53b into the left side direction change passage 41.

Third Embodiment

Hereinafter, a third embodiment of the present disclosure (hereinafter, referred to as "the present embodiment") will be described with reference to the drawings.

(Configuration)

Firstly, referring to FIG. 1 and FIG. 2, by using FIG. 12, the configuration of the linear guide device and the end cap included in the linear guide device in the present embodiment will be described. It is to be noted that, in the drawings and the following description, the same components and configurations as those of the first embodiment and the second embodiment described above have the same reference numerals.

In the linear guide device 2 in the present embodiment, the bottom face of the guide rail 14 is arranged on a guide rail arrangement face configured with a slanted face (not illustrated). In other words, in the present embodiment, the linear guide device 2 is used in positional situation that is slanted.

It is to be noted that in the present embodiment, a description will be given of a case where the slanted angle of the guide rail arrangement face is 45 degrees with respect to the plane face used as a reference. In other words, the linear guide device 2 in the present embodiment has a slanted face of 45 degrees with respect to the plane face. In addition, in the present embodiment, a description will be given of a case where the bottom face of the guide rail 14 is arranged on the guide rail arrangement face, so that the right side direction change passage 4r is located on the upper side than the left side direction change passage 41 in the vertical direction.

Figure 12:
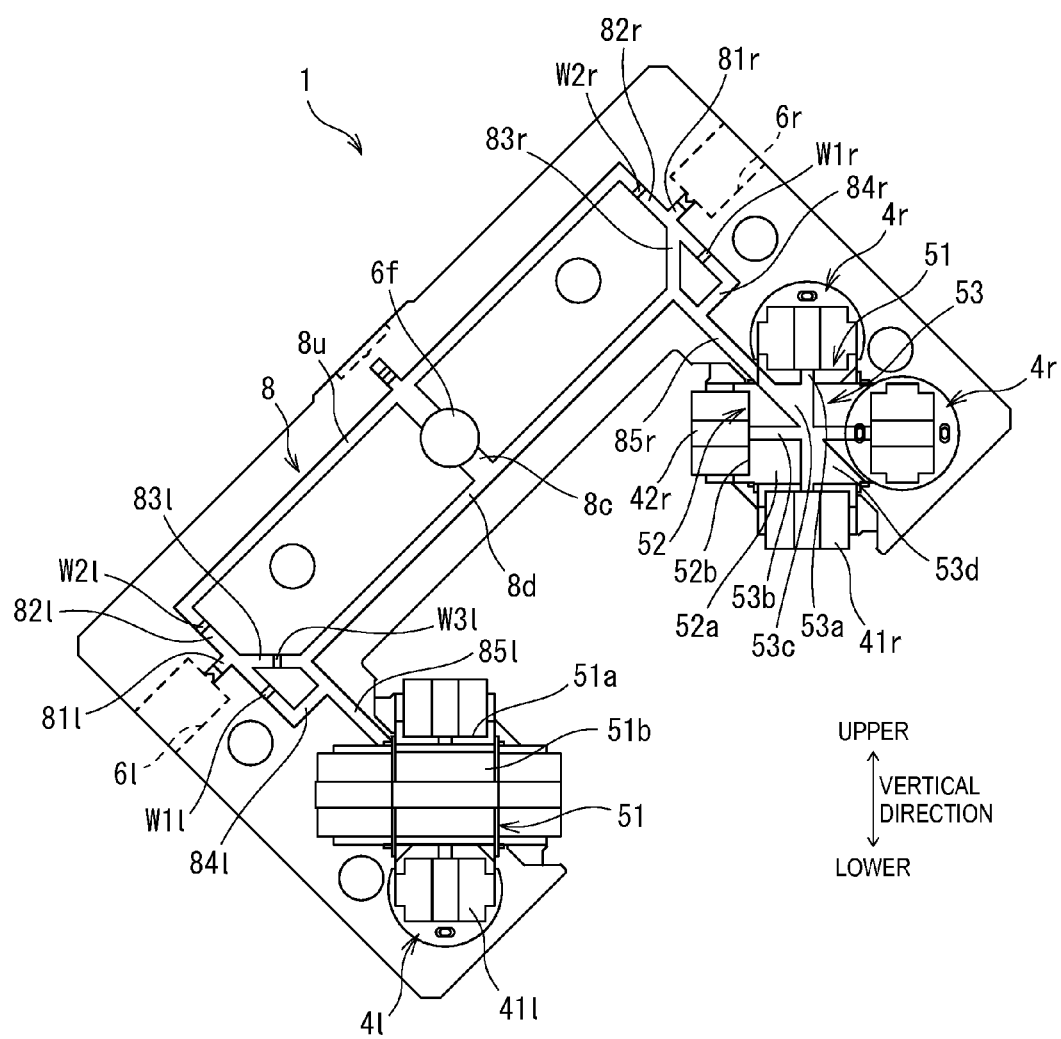
FIG. 12 is a view illustrative of a configuration of the end cap on which processing is carried out depending on the positional situation of the linear guide device in a third embodiment of the present disclosure.

Thus, in other words, on the end cap 1 included in the linear guide device 2 in the present embodiment, processing is carried out depending on the positional situation of the linear guide device 2 when in use from the above-described initial state (see FIG. 1 and FIG. 2), that is the positional situation that is slanted at 45 degrees with respect to the plane face used as a reference, as illustrated in FIG. 12. It is to be noted that FIG. 12 is a view illustrative of a configuration of the end cap 1 on which the processing is carried out depending on the positional situation of the linear guide device 2 when in use. Specifically, FIG. 12 is a view illustrative of a joint face of the end cap 1, with the slider body 16, like FIG. 4.

As illustrated in FIG. 12, processing of removing the right side third oil passage obstruction wall member W3r from the inside of the right side third oil passage formation portion 83r, in the end cap 1 included in the linear guide device 2 when in use in the positional situation that is slanted.
(Operations, Functions, and the Like)

Next, referring to FIG. 1, FIG. 2 and FIG. 12, by using FIG. 13, operations, functions, and the like of the linear guide device 2 having the above configuration will be described. It is to be noted that the descriptions of the same operations, functions, and the like as those of the above-described first embodiment and second embodiment will be omitted in some cases.

When the linear guide device 2 is operated (used), in newly supplying the lubricant (supplying oil) to the rolling element circulation passages, the lubricant is supplied into the oil passage 8 from the right side face oil supply opening 6r by use of a member with which the lubricant can be supplied (such as a grease gun).

Then, the lubricant that has been supplied into the oil passage 8 from the right side face oil supply opening 6r moves to the right side second oil passage formation portion 82r from the right side first oil passage formation portion 81r, and further moves to the right side third oil passage formation portion 83r.

It is to be noted that even if the lubricant moves to the right side fourth oil passage formation portion 84r from the right side second oil passage formation portion 82r, such moved lubricant is suppressed by the right side first oil passage obstruction wall member W1r from moving to the right side fourth oil passage formation portion 84r.

In this situation, in the end cap 1 included in the linear guide device 2 in the present embodiment, the right side third oil passage obstruction wall member W3r is removed from the inside of the right side third oil passage formation portion 83r (see FIG. 12).

Accordingly, the lubricant that has moved to the right side third oil passage formation portion 83r flows down in the right side third oil passage formation portion 83r.

Herein, the linear guide device 2 in the present embodiment is used in the positional situation that is slanted at 45 degrees with respect to the plane face used as a reference, and 45 degrees is the slanted angle of the right side third oil passage formation portion 83r with respect to the extending direction of the right side second oil passage formation portion 82r. In other words, the right side third oil passage formation portion 83r extends in a vertical direction to be slanted at 90 degrees with respect to the plane face used as a reference.

Accordingly, with respect to the right side third oil passage formation portion 83r extending in the vertical direction, the right side fifth oil passage formation portion 85r and the lower oil passage formation portion 8d are slanted at an identical degree (45 degrees) with respect to the vertical direction used as a reference. The lubricant that has flown down in the right side third oil passage formation portion 83r moves to the right side fifth oil passage formation portion 85r side and the lower oil passage formation portion 8d side at a location where the right side fifth oil passage formation portion 85r and the lower oil passage formation portion 8d are continuous with each other.

Then, the lubricant that has moved to the right side fifth oil passage formation portion 85r side moves into the right side direction change passage 4r.

On the other hand, the lubricant that has moved to the lower oil passage formation portion 8d side flows down in the lower oil passage formation portion 8d and moves into the left side fifth oil passage formation portion 85l.

Here, the lubricant that has moved on the left side fourth oil passage formation portion 84l side from the inside of the left side fifth oil passage formation portion 85l, that has flown down in the left side fourth oil passage formation portion 84l, and that has moved into the left side second oil passage formation portion 82l is suppressed by the left side first oil passage obstruction wall member W1l from moving. Therefore, when the supply of the lubricant from the right side face oil supply opening 6r into the oil passage 8 continues, the lubricant, which is continuously supplied into the left side second oil passage formation portion 82l and the left side fourth oil passage formation portion 84l, is increased in the reserved amounts, and moves on the upper side than the location perpendicular to the left side fifth oil passage formation portion 85l.

Then, when the supply of the lubricant from the right side face oil supply opening 6r into the oil passage 8 continues, in the left side second oil passage formation portion 82l and the left side fourth oil passage formation portion 84l, the lubricant that has moved on the upper side than the location perpendicular to the left side fifth oil passage formation portion 85l moves through the left side fifth oil passage formation portion 85l into the left side direction change passage 41.

Figure 13:
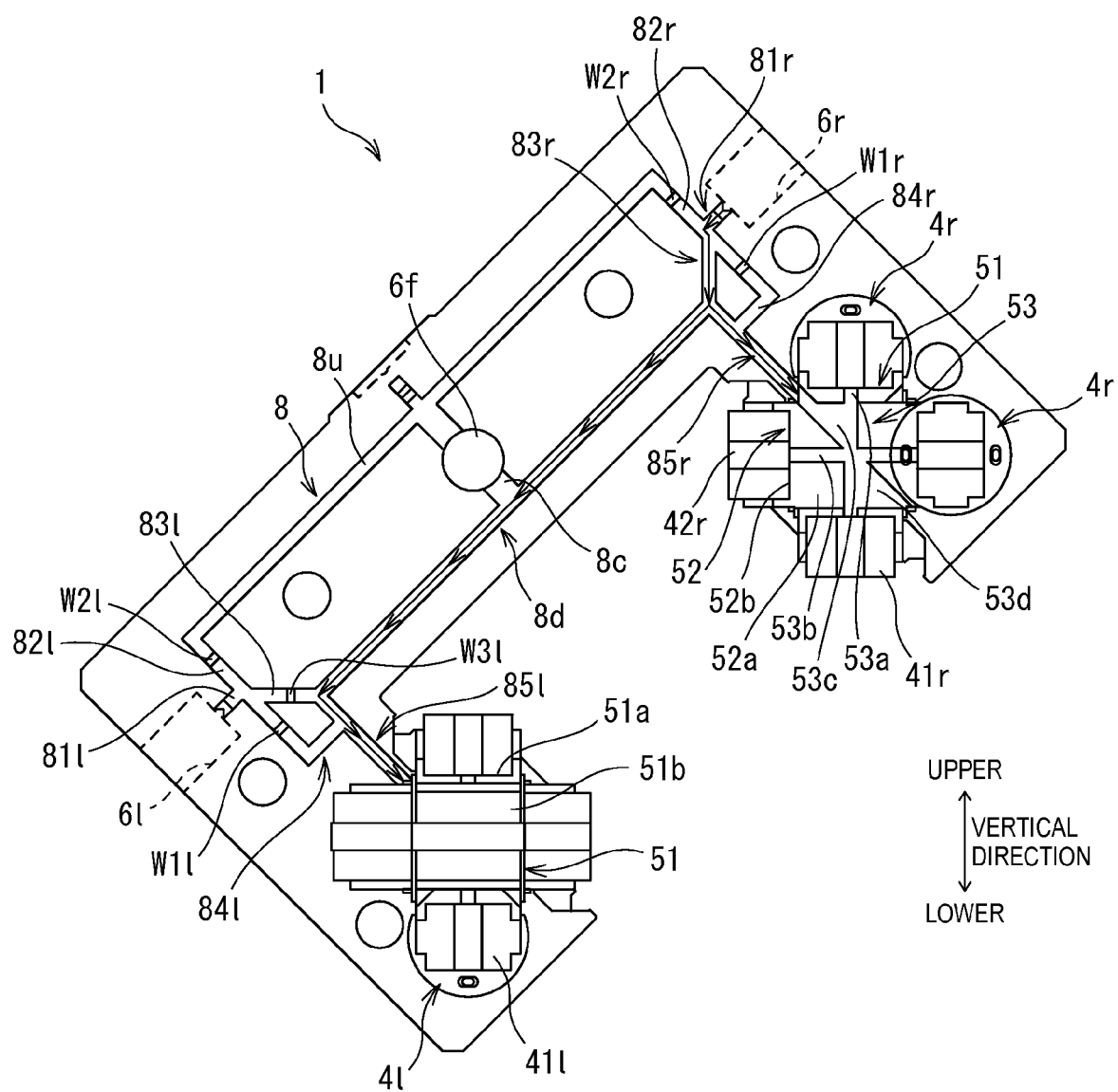
FIG. 13 is a view illustrative of a moving pathway of the lubricant in the linear guide device in the third embodiment of the present disclosure.

As described above, in the linear guide device 2 in the present embodiment, as illustrated in FIG. 13, the lubricant that has been supplied from the right side face oil supply opening 6r into the oil passage 8 moves to the left side direction change passage 41 and the right side direction change passage 4r, and is supplied into the rolling element circulation passage. It is to be noted that FIG. 13 is a view illustrative of a moving pathway of the lubricant in the linear guide device 2 in the present embodiment.

Specifically, the lubricant that has been supplied from the right side face oil supply opening 6r into the oil passage 8 sequentially moves through the right side first oil passage formation portion 81r, the right side second oil passage formation portion 82r, the right side third oil passage formation portion 83r, and the right side fifth oil passage formation portion 85r into the right side direction change passage 4r. In addition, the lubricant that has moved to the right side third oil passage formation portion 83r sequentially moves through the lower oil passage formation portion 8d and the left side fifth oil passage formation portion 85l into the left side direction change passage 41. Accordingly, the lubricant that has been supplied from the right side face oil supply opening 6r into the oil passage 8 is supplied to the two rolling element circulation passages. It is to be noted that, in FIG. 13, a moving pathway of the lubricant is indicated by arrows.

It is to be noted that the right side first oil passage formation portion 81r, the right side second oil passage formation portion 82r, the right side third oil passage formation portion 83r, the right side fifth oil passage formation portion 85r, the lower oil passage formation portion 8d, and the left side fifth oil passage formation portion 85l, to be specific, that is a moving pathway indicated by arrows in FIG. 13 conforms to a third pathway of the oil passage configured to communicate the right side face oil supply opening 6r with and the left side direction change passage 41 and the right side direction change passage 4r, with the linear guide device 2 being arranged on a slanted plane. In addition, the pathway of the third oil passage is a moving pathway configured to originate from the right side face oil supply opening 6r that is one of the plural oil supply openings 6 at plural locations located on the upper side than the direction change passage 4 in the vertical direction, when viewed from the moving direction of the slider body 16, to extend in the vertical direction depending on the positional situation that is slanted of the liner guide device 2 when in use, to branch at a part closer to the right side face oil supply opening 6r in either the left side direction change passage 41 or the right side direction change passage 4r, and to reach the left side direction change passage 41 and the right side direction change passage 4r.

(Advantageous Effects in the Third Embodiment)

Advantageous effects in the present embodiment will be described as follows.

In addition to the advantageous effects (1) to (3) described in the first embodiment, the following effects are achievable.

(1) In the end cap 1 included in the linear guide device 2 in the present embodiment, with the linear guide device 2 being arranged on a vertical plane, the pathway of the third oil passage configured to communicate the right side face oil supply opening 6r with the left side direction change passage 41 and the right side direction change passage 4r is configured with a pathway configured to originate from the right side face oil supply opening 6r that is one of the plural oil supply openings 6 at plural locations, which is located on the upper side than the direction change passage 4 in the vertical direction, when viewed from the moving direction of the slider body 16, to extend in the vertical direction depending on the positional situation that is slanted of the liner guide device 2 when in use, to branch at a part closer to the right side face oil supply opening 6r in either the left side direction change passage 41 or the right side direction change passage 4r, and to reach the left side direction change passage 41 and the right side direction change passage 4r.

Accordingly, when the linear guide device 2 is used in the positional situation that is slanted, the liquid lubricant that has been supplied into the oil passage 8 from the oil supply opening 6 located on the upper side than the direction change passage 4 in the vertical direction can be moved by gravity into the third oil passage and introduced into the direction change passage 4.

As a result, when the linear guide device 2 is used in the positional situation that is vertical, it is made possible to supply the lubricant into the left side direction change passage 41 and the right side direction change passage 4r, and it is thus possible to suppress a degradation in the operation performance and in the durability of the linear guide device 2.

(Modifications)

Modifications in the present embodiment will be described as follows.

Figure 14:
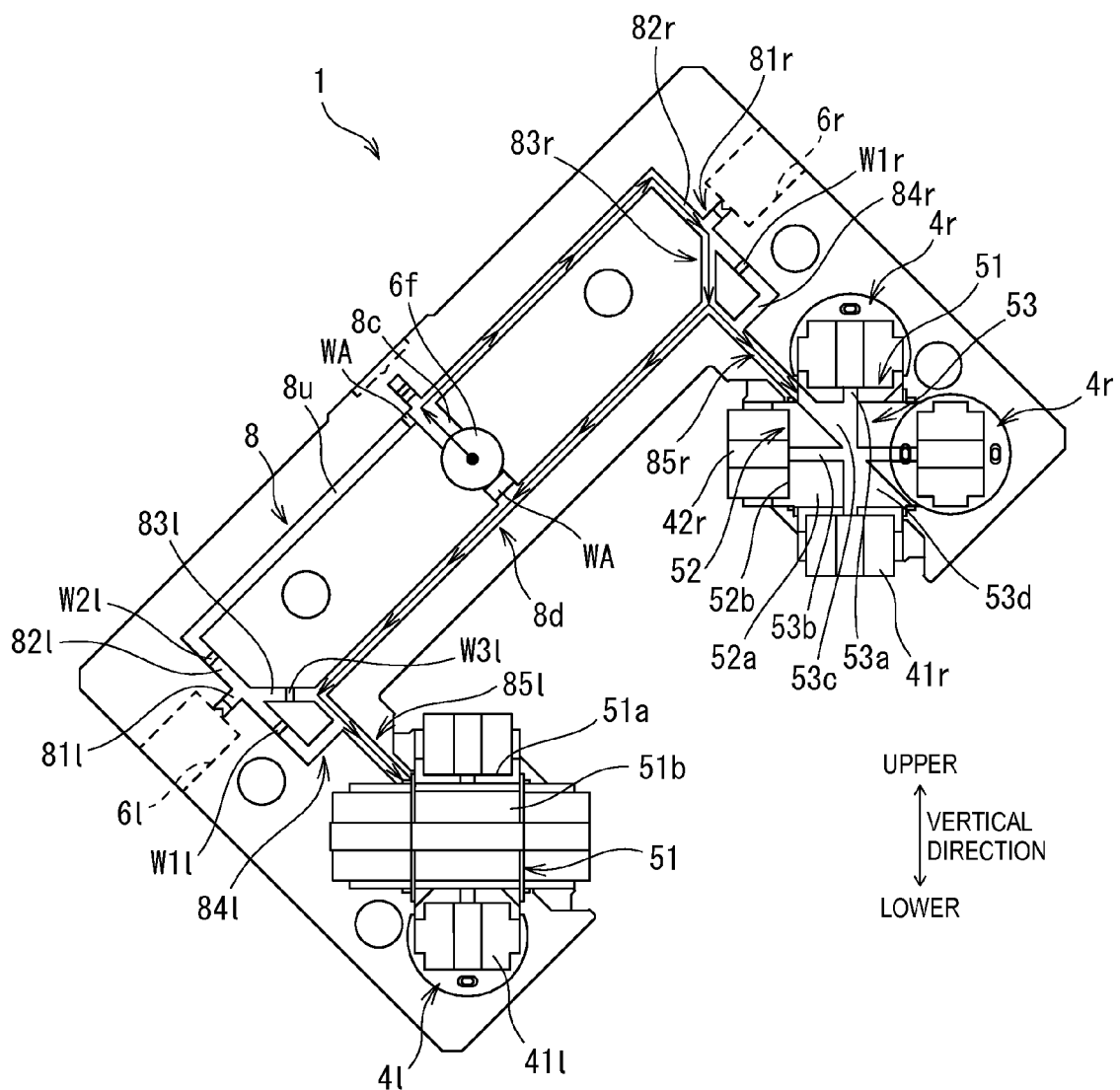
FIG. 14 is a view illustrative of a configuration in a modification in the third embodiment of the present disclosure.

(1) In the present embodiment, the lubricant is configured to be supplied from the right side face oil supply opening 6r into the oil passage 8. However, the present embodiment is not limited to this. In other words, as illustrated in FIG. 14, for example, the lubricant may be supplied from the front face oil supply opening 6f into the oil passage 8. It is to be noted that FIG. 14 is a view illustrative of a configuration of a modification in the present embodiment, and is a view illustrative of a joint face of the end cap 1, with the slider body. Also, in FIG. 14, a moving pathway of the lubricant is indicated by arrows.

In this case, for example, an additional oil passage obstruction wall member WA is arranged at a location in the upper oil passage formation portion 8u, which is located on the lower side than the central oil passage formation portion 8c in the vertical direction with the bottom face of the guide rail 14 being arranged on the guide rail arrangement face that is a slanted face. In addition, an additional oil passage obstruction wall member WA is arranged at a location in the central oil passage formation portion 8c, which is located between the front face oil supply opening 6f and the lower oil passage formation portion 8d.

As described above, in the configuration illustrated in FIG. 14, the additional oil passage obstruction wall member WA obstructs a location in the vertical direction in the upper oil passage formation portion 8u, which is located on the lower side than the central oil passage formation portion 8c, with the bottom face of the guide rail 14 being arranged on the guide rail arrangement face, and a location, in the central oil passage formation portion 8c, which is located between the front face oil supply opening 6f and the lower oil passage formation portion 8d. For this reason, the lubricant that has been supplied from the front face oil supply opening 6f into the oil passage 8 moves, from the central oil passage formation portion 8c, upward on the upper side than the part in the upper oil passage formation portion 8u where the additional oil passage obstruction wall member WA is located, moves through the right side second oil passage formation portion 82r, and reaches the right side third oil passage formation portion 83r.

Then, the lubricant that has moved to the right side third oil passage formation portion 83r branches into two directions. In one of the two directions, the lubricant moves through the right side fifth oil passage formation portion 85r into the return guide side oil passage 53, and is reserved in the first branch reservoir portion 53c and the second branch reservoir portion 53d. Further, the lubricant, which has been increased in the reserved amounts in the first branch reservoir portion 53c and the second branch reservoir portion 53d, move through the first branch groove portion 53a and the second branch groove portion 53b into the right side direction change passage 4r.

Also, in the other of the two directions, the lubricant that has moved to the right side third oil passage formation portion 83r and that has branched into the two directions moves to the lower oil passage formation portion 8d, flows down in the lower oil passage formation portion 8d, moves through the left side fifth oil passage formation portion 85l, moves into the return guide side oil passage 53, and is reserved in the first branch reservoir portion 53c and the second branch reservoir portion 53d. Subsequently, the lubricant, which has been increased in the reserved amounts in the first branch groove portion 53a and the second branch reservoir portion 53d, moves through the first branch groove portion 53a and the second branch groove portion 53b, and moves into the left side direction change passage 41.

Figure 15:
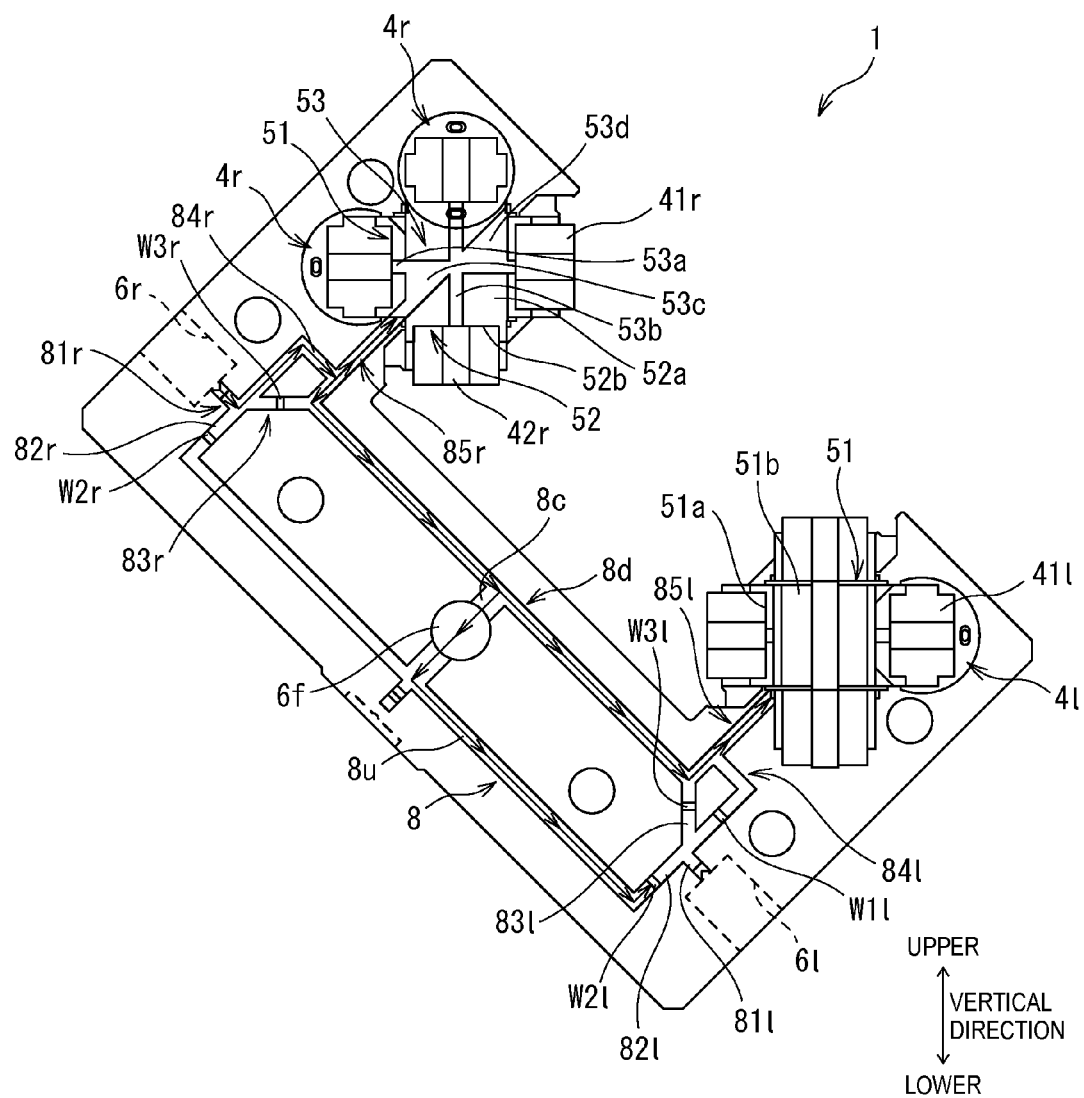
FIG. 15 is a view illustrative of a configuration in a modification in the third embodiment of the present disclosure.

(2) In the present embodiment, the slanted angle of the guide rail arrangement face is configured to be 45 degrees with respect to the plane face used as a reference. However, the present embodiment is not limited to this. In other words, as illustrated in FIG. 15, the slanted angle of the guide rail arrangement face may be 135 degrees with respect to the plane face used as a reference. It is to be noted that FIG. 15 is a view illustrative of a configuration in a modification in the present embodiment, and is a view illustrative of a joint face of the end cap 1, with the slider body. Also, in FIG. 15, a moving pathway of the lubricant is indicated by arrows.

In this case, the lubricant that has been supplied from the right side face oil supply opening 6r into the oil passage 8 sequentially moves to the right side first oil passage formation portion 81r, the right side second oil passage formation portion 82r, and the right side fourth oil passage formation portion 84r.

Then, the lubricant that has moved to the right side fourth oil passage formation portion 84r branches into two directions. In one of the two directions, the lubricant moves through the right side fifth oil passage formation portion 85r into the return guide side oil passage 53, and is reserved in the first branch reservoir portion 53c and the second branch reservoir portion 53d. Further, the lubricant, which has been increased in the reserved amounts in the first branch reservoir portion 53c and the second branch reservoir portion 53d, move through the first branch groove portion 53a and the second branch groove portion 53b into the right side direction change passage 4r.

Also, in the other of the two directions, the lubricant that has moved into the right side fourth oil passage formation portion 84r and that has branched into the two directions moves to the lower oil passage formation portion 8d, flows down in the lower oil passage formation portion 8d, moves through the left side fifth oil passage formation portion 85l, moves into the return guide side oil passage 53, and is reserved in the first branch reservoir portion 53c and the second branch reservoir portion 53d. Then, the lubricant, which has been increased in the reserved amounts in the first branch groove portion 53a and the second branch reservoir portion 53d, moves through the first branch groove portion 53a and the second branch groove portion 53b, and moves into the left side direction change passage 41.

It is to be noted that the other side of the lubricant, which has moved into the right side fourth oil passage formation portion 84r and which has branched into the two directions, partially moves to the central oil passage formation portion 8c, and flows down in the upper oil passage formation portion 8u. However, its movement is suppressed at a location in the left side second oil passage formation portion 82l, where the left side second oil passage obstruction wall member W21 is arranged.

Figure 16:
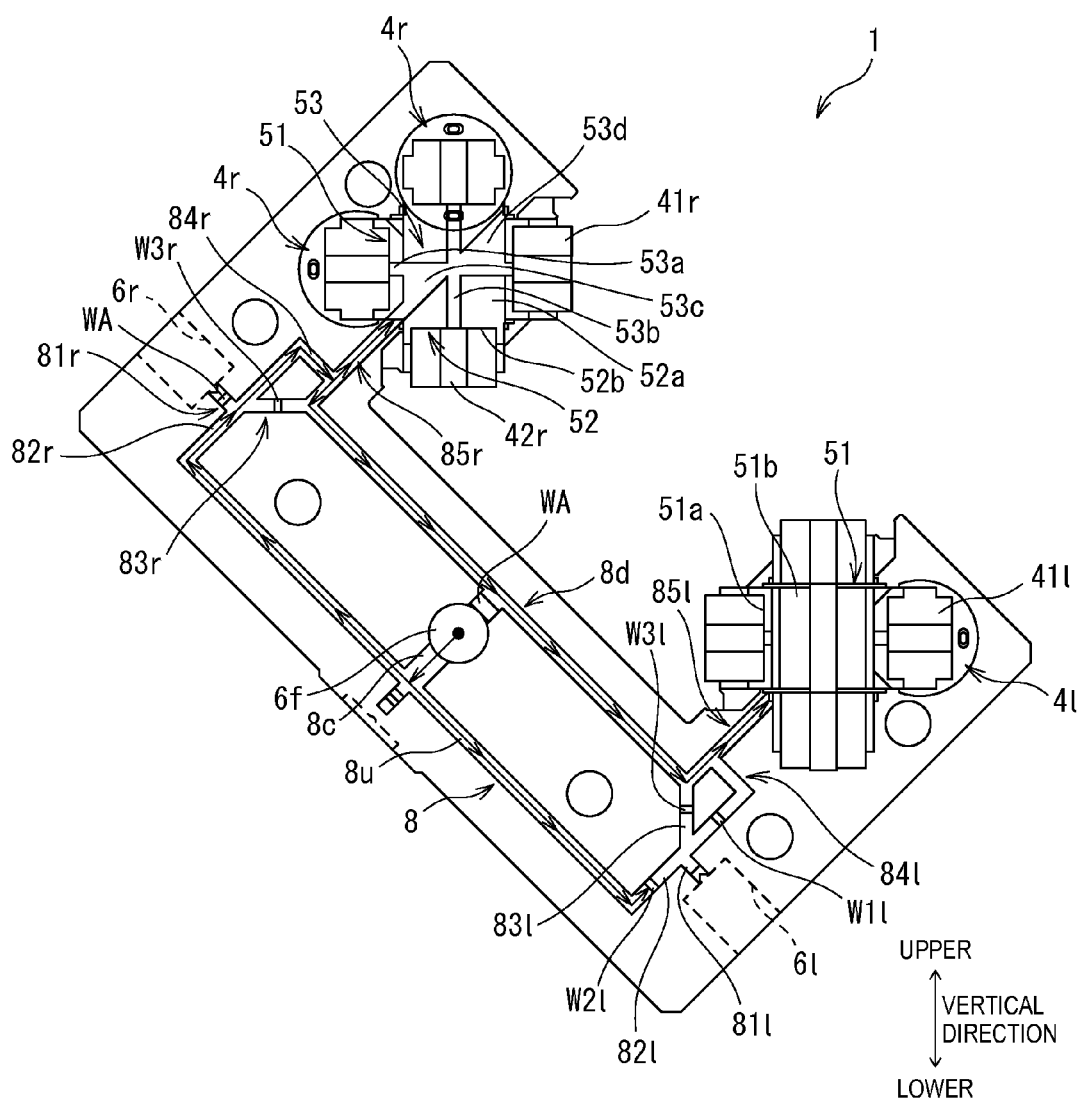
FIG. 16 is a view illustrative of a configuration in a modification in the third embodiment of the present disclosure.

In addition, as described above, in the case where the guide rail arrangement face has a slanted angle of 135 degrees with respect to the plane face used as a reference, the present embodiment is not limited to the configuration in which the lubricant is supplied from the right side face oil supply opening 6r into the oil passage 8. For example, as illustrated in FIG. 16, the lubricant may be supplied from the front face oil supply opening 6f into the oil passage 8. It is to be noted that FIG. 16 is a view illustrative of a configuration in a modification in the present embodiment, and is a view illustrative of a joint face of the end cap 1, with the slider body. Further, in FIG. 16, a moving pathway of the lubricant is indicated by arrows.

In this case, for example, the additional oil passage obstruction wall member WA is provided in the right side face oil supply opening 6r and at a location between the front face oil supply opening 6f and the lower oil passage formation portion 8d, in the central oil passage formation portion 8c.

As described above, in the configuration illustrated in FIG. 16, the additional oil passage obstruction wall member WA obstructs the inside of the right side face oil supply opening 6r, and the location between the front face oil supply opening 6f and the lower oil passage formation portion 8d, in the central oil passage formation portion 8c. Therefore, the lubricant that has been supplied from the front face oil supply opening 6f into the oil passage 8 moves from the central oil passage formation portion 8c to the upper oil passage formation portion 8u, and branches at the upper oil passage formation portion 8u into two directions.

In one of the two directions, the lubricant that has been branched into two directions at the upper oil passage formation portion 8u moves upward in the upper oil passage formation portion 8u through the right side second oil passage formation portion 82r, and reaches the right side fourth oil passage formation portion 84r. The lubricant that has moved to the right side fourth oil passage formation portion 84r branches into two directions. In one of the two directions, the lubricant moves through the right side fifth oil passage formation portion 85r into the return guide side oil passage 53, and is reserved in the first branch reservoir portion 53c and the second branch reservoir portion 53d. Then, the lubricant, the reserved amounts of which have been increased in the first branch reservoir portion 53c and the second branch reservoir portion 53d, moves through the first branch groove portion 53a and the second branch groove portion 53b into the right side direction change passage 4r.

In addition, In the other of the two directions, the lubricant that has moved to the right side fourth oil passage formation portion 84r and has branched into two directions moves to the lower oil passage formation portion 8d, flown down in the lower oil passage formation portion 8d, moves through the left side fifth oil passage formation portion 85l into the return guide side oil passage 53, and is reserved in the first branch reservoir portion 53c and the second branch reservoir portion 53d. Then, the lubricant, the reserved amounts of which have been increased in the first branch reservoir portion 53c and the second branch reservoir portion 53d, moves through the first branch groove portion 53a and the second branch groove portion 53b into the left side direction change passage 41.

It is to be noted that the other of the lubricant that has branched into two directions at the upper oil passage formation portion 8u flows down in the upper oil passage formation portion 8u. However, its movement is suppressed at a location in the left side second oil passage formation portion 82l, where the left side second oil passage obstruction wall member W21 is arranged.

Figure 17:
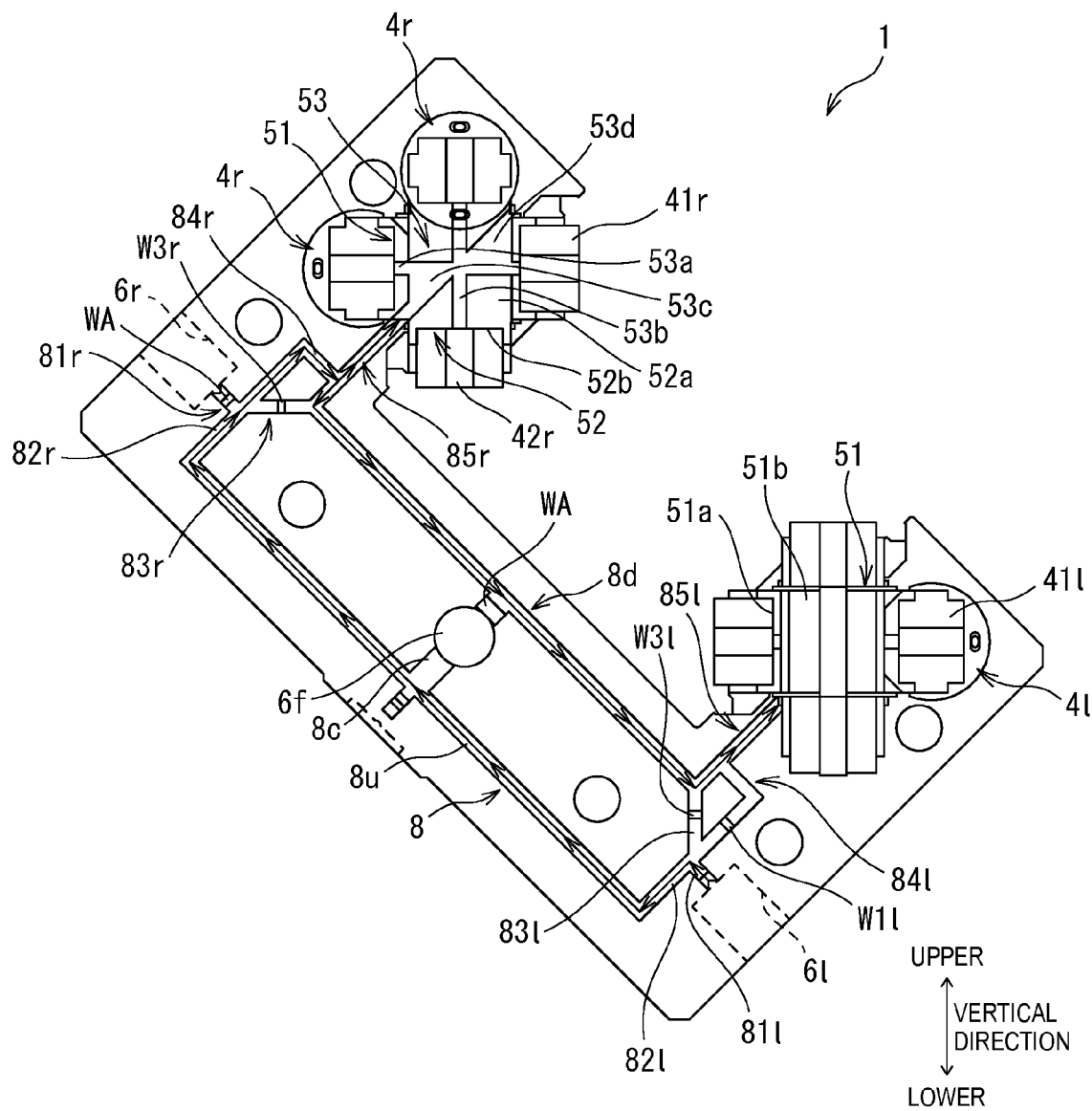
FIG. 17 is a view illustrative of a configuration in a modification in the third embodiment of the present disclosure.

Furthermore, as described above, in the case where the guide rail arrangement face has a slanted angle of 135 degrees with respect to the plane face used as a reference, the present embodiment is not limited to the configuration in which the lubricant is supplied from the right side face oil supply opening 6r into the oil passage 8. For example, as illustrated in FIG. 17, the lubricant may be supplied from the left side face oil supply opening 61 into the oil passage 8. It is to be noted that FIG. 17 is a view illustrative of a configuration in a modification in the present embodiment, and is a view illustrative of a joint face of the end cap 1, with the slider body. Further, in FIG. 17, a moving pathway of the lubricant is indicated by arrows.

In this case, for example, the left side second oil passage obstruction wall member W21 is removed to communicate the left side face oil supply opening 61 with the left side second oil passage formation portion 82l. In addition to this, for example, the additional oil passage obstruction wall member WA is provided in the right side face oil supply opening 6r and at a location of the central oil passage formation portion 8c between the front face oil supply opening 6f and the lower oil passage formation portion 8d.

As described above, in the configuration illustrated in FIG. 17, the left side face oil supply opening 61 and the left side second oil passage formation portion 82*l* are configured to be communicated with each other, and the additional oil passage obstruction wall member WA obstructs the inside of the right side face oil supply opening 6*r* and the location of the central oil passage formation portion 8*c* between the front face oil supply opening 6*f* and the lower oil passage formation portion 8*d*. For this reason, the lubricant that has been supplied from the left side face oil supply opening 6l into the oil passage 8 moves from the left side second oil passage formation portion 82*l* to the upper oil passage formation portion 8*u*, moves upward in the upper oil passage formation portion 8*u*, moves through the right side second oil passage formation portion 82*r*, and reaches the right side fourth oil passage formation portion 84*r*.

The lubricant that has moved to the right side fourth oil passage formation portion 84*r* branches into two directions. In one of the two directions, the lubricant moves through the right side fifth oil passage formation portion 85*r* into the return guide side oil passage 53, and is reserved in the first branch reservoir portion 53*c* and the second branch reservoir portion 53*d*. Further, the lubricant, the reserved amounts of which have been increased in the first branch reservoir portion 53*c* and the second branch reservoir portion 53*d*, move through the first branch groove portion 53*a* and the second branch groove portion 53*b* into the right side direction change passage 4*r*.

Also, in the other of the two directions, the lubricant that has moved to the right side fourth oil passage formation portion 84*r* and that has branched into the two directions moves to the lower oil passage formation portion 8*d*, flows down in the lower oil passage formation portion 8*d*, moves through the left side fifth oil passage formation portion 85*l*, moves into the return guide side oil passage 53, and is reserved in the first branch reservoir portion 53*c* and the second branch reservoir portion 53*d*. Subsequently, the lubricant, the reserved amounts of which have been increased in the first branch groove portion 53*a* and the second branch reservoir portion 53*d*, moves through the first branch groove portion 53*a* and the second branch groove portion 53*b* into the left side direction change passage 41.

Figure 18:
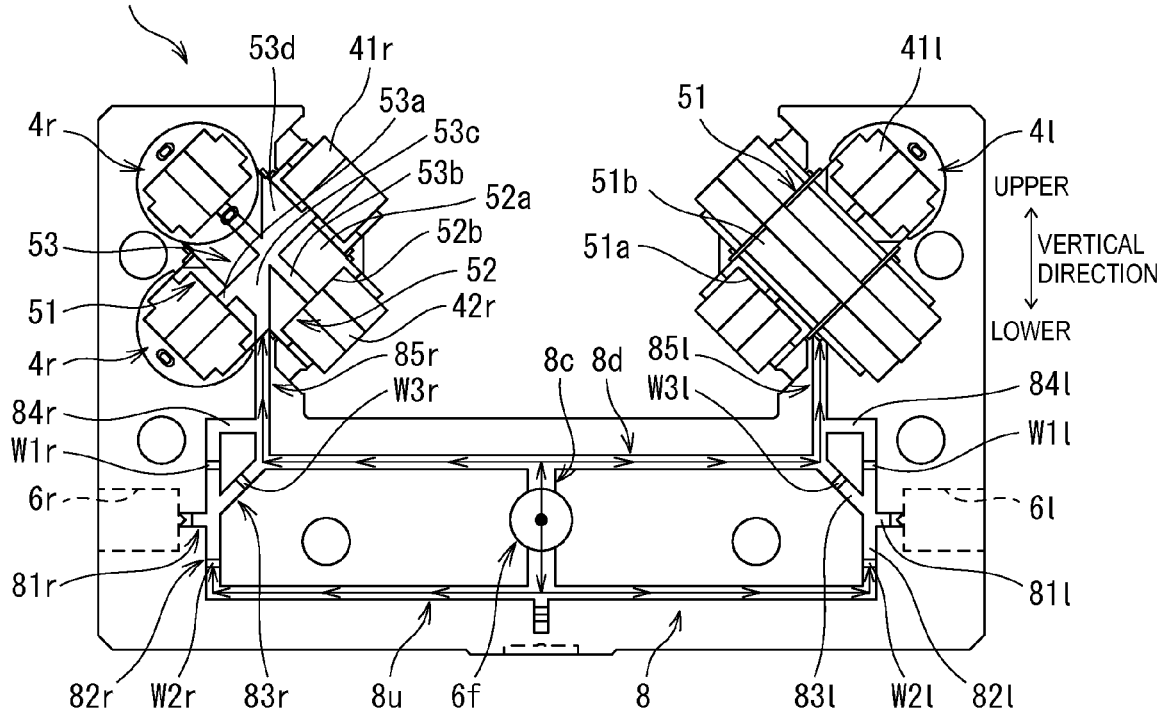
FIG. 18 is a view illustrative of a configuration in a modification in the third embodiment of the present disclosure.

(3) In the present embodiment, the slanted angle of the guide rail arrangement face is configured to be 45 degrees with respect to the plane face used as a reference, and in addition, the lubricant is configured to be supplied into the oil passage 8 from the right side face oil supply opening 6*r*. However, the present embodiment is not limited to this. In other words, as illustrated in FIG. 18, the slanted angle of the guide rail arrangement face may be 180 degrees with respect to the plane face used as a reference, and in addition, the lubricant may be supplied into the oil passage 8 from the front face oil supply opening 6*f*. This is, for example, a case where the guide rail arrangement face is a ceiling face. It is to be noted that FIG. 18 is a view illustrative of a configuration in a modification in the present embodiment, and is a view illustrative of a joint face of the end cap 1, with the slider body. Also, in FIG. 18, a moving pathway of the lubricant is indicated by arrows.

In this case, all of the first oil passage obstruction wall member W1, the second oil passage obstruction wall member W2, and the third oil passage obstruction wall member W3 are provided without removal.

In the configuration illustrated in FIG. 18, as described above, the first oil passage obstruction wall member W1, the second oil passage obstruction wall member W2, and the third oil passage obstruction wall member W3 obstruct all of the corresponding locations in the oil passage 8. Therefore, the lubricant that has been supplied from the front face oil supply opening 6*f* into the oil passage 8 branches at the central oil passage formation portion 8*c* into two directions. In one of the two directions, the lubricant moves to the lower oil passage formation portion 8*d*, and branches into two directions.

In one of the two directions, the lubricant that has moved to the lower oil passage formation portion 8*d* and that has branched into two directions moves through the right side fifth oil passage formation portion 85*r* into the return guide side oil passage 53, and is reserved in the first branch reservoir portion 53*c* and the second branch reservoir portion 53*d*. Further, the lubricant, the reserved amounts of which have been increased in the first branch reservoir portion 53*c* and the second branch reservoir portion 53*d*, moves through the first branch groove portion 53*a* and the second branch groove portion 53*b*, respectively, into the right side direction change passage 4*r*. In addition, in the other of the two directions, the lubricant that has moved to the lower oil passage formation portion 8*d* and that has branched into two directions moves through the left side fifth oil passage formation portion 85*l* into the return guide side oil passage 53, and is reserved in the first branch reservoir portion 53*c* and the second branch reservoir portion 53*d*. Further, the lubricant, the reserved amounts of which have been increased in the first branch reservoir portion 53*c* and the second branch reservoir portion 53*d*, moves through the first branch groove portion 53*a* and the second branch groove portion 53*b* into the left side direction change passage 41.

It is to be noted that the other of the lubricant that has branched at the central oil passage formation portion 8*c* into two directions moves through the upper oil passage formation portion 8*u*. However, its movement is suppressed at the location of the left side second oil passage formation portion 82*l* where the left side second oil passage obstruction wall member W2*l* is provided and at the location of the right side second oil passage formation portion 82*r* where the right side second oil passage obstruction wall member W2*r* is provided. Therefore, the lubricant is reserved in the upper oil passage formation portion 8*u*, the left side second oil passage formation portion 82*l*, and the right side second oil passage formation portion 82*r*.

Figure 19:
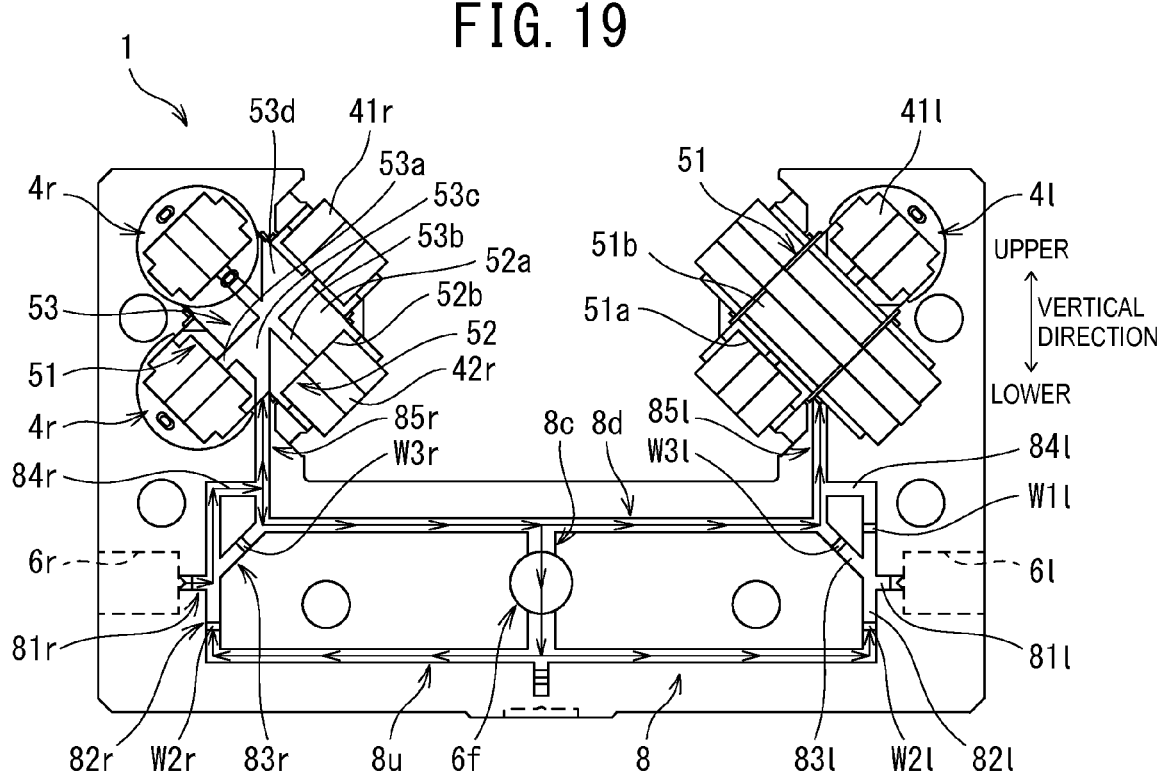
FIG. 19 is a view illustrative of a configuration in a modification in the third embodiment of the present disclosure.

In addition, as described above, when the slanted angle of the guide rail arrangement face is 180 degrees with respect to the plane face used as a reference, as illustrated in FIG. 19, for example, the lubricant may be supplied into the oil passage 8 from the right side face oil supply opening 6*r*. It is to be noted that FIG. 19 is a view illustrative of a configuration in a modification in the present embodiment, and is a view illustrative of a joint face of the end cap 1, with the slider body. Further, in FIG. 19, a moving pathway of the lubricant is indicated by arrows.

In this case, the right side first oil passage obstruction wall member W1*r* is removed to communicate the right side face oil supply opening 6*r* with the right side second oil passage formation portion 82*r*. Furthermore, except for the right side first oil passage obstruction wall member W1*r*, all of the first oil passage obstruction wall member W1, the second oil passage obstruction wall member W2, and the third oil passage obstruction wall member W3 are provided without removal.

As described above, in the configuration illustrated in FIG. 19, except for the right side first oil passage obstruction wall member W1*r*, the corresponding locations in the oil passage 8 are obstructed by the first oil passage obstruction wall member W1, the second oil passage obstruction wall member W2, and the third oil passage obstruction wall member W3. Therefore, the lubricant that has been supplied from the right side face oil supply opening 6r into the oil passage 8 moves through the right side second oil passage formation portion 82r to the right side fourth oil passage formation portion 84r.

The lubricant that has moved to the right side fourth oil passage formation portion 84r branches into two directions. In one of the two directions, the lubricant moves through the right side fifth oil passage formation portion 85r into the return guide side oil passage 53, and is reserved in the first branch reservoir portion 53c and the second branch reservoir portion 53d. Further, the lubricant, the reserved amounts of which have been increased in the first branch reservoir portion 53c and the second branch reservoir portion 53d, moves through the first branch groove portion 53a and the second branch groove portion 53b into the right side direction change passage 4r.

In the other of the two directions, the lubricant that has moved to the right side fourth oil passage formation portion 84r and that has branched into two directions moves to the lower oil passage formation portion 8d and branches into two directions.

In one of the two directions, the lubricant that has moved to the lower oil passage formation portion 8d and that has branched into two directions moves through the left side fifth oil passage formation portion 85l into the return guide side oil passage 53 on the return guide side, and is reserved in the second branch reservoir portion 53d and the second branch reservoir portion 53d. Further, the lubricant, the reserved amounts of which have been increased in the first branch reservoir portion 53c and the second branch reservoir portion 53d, moves through the first branch groove portion 53a and the second branch groove portion 53b into the left side direction change passage 41.

It is to be noted that in the other of the two directions, the lubricant that has moved to the lower oil passage formation portion 8d and that has branched into two directions moves through the central oil passage formation portion 8c and the upper oil passage formation portion 8u. However, its movement is suppressed at the location of the left side second oil passage formation portion 82l where the left side second oil passage obstruction wall member W2l is provided and at the location of the right side second oil passage formation portion 82r where the right side second oil passage obstruction wall member W2r is provided. Therefore, the lubricant is reserved in the central oil passage formation portion 8c, the upper oil passage formation portion 8u, the left side second oil passage formation portion 82l, and the right side second oil passage formation portion 82r.

Fourth Embodiment

Hereinafter, a fourth embodiment in the present disclosure (hereinafter, referred to as "the present embodiment") will be described with reference to the drawings.
(Configuration)
Firstly, by using FIG. 22 to FIG. 20, a configuration of the end cap included in the linear guide device in the present embodiment will be described. It is to be noted that, in the drawings and the following description, the same components and configurations as those of the first embodiment described above have the same reference numerals.

The end cap 1 included in the linear guide device 2 in the present embodiment is different in the configurations of the oil passage formation portion and the oil passage obstruction wall member W from the end cap 1 in the above-described first embodiment.

Firstly, the configuration of the oil passage formation portion will be described.

Figure 20:
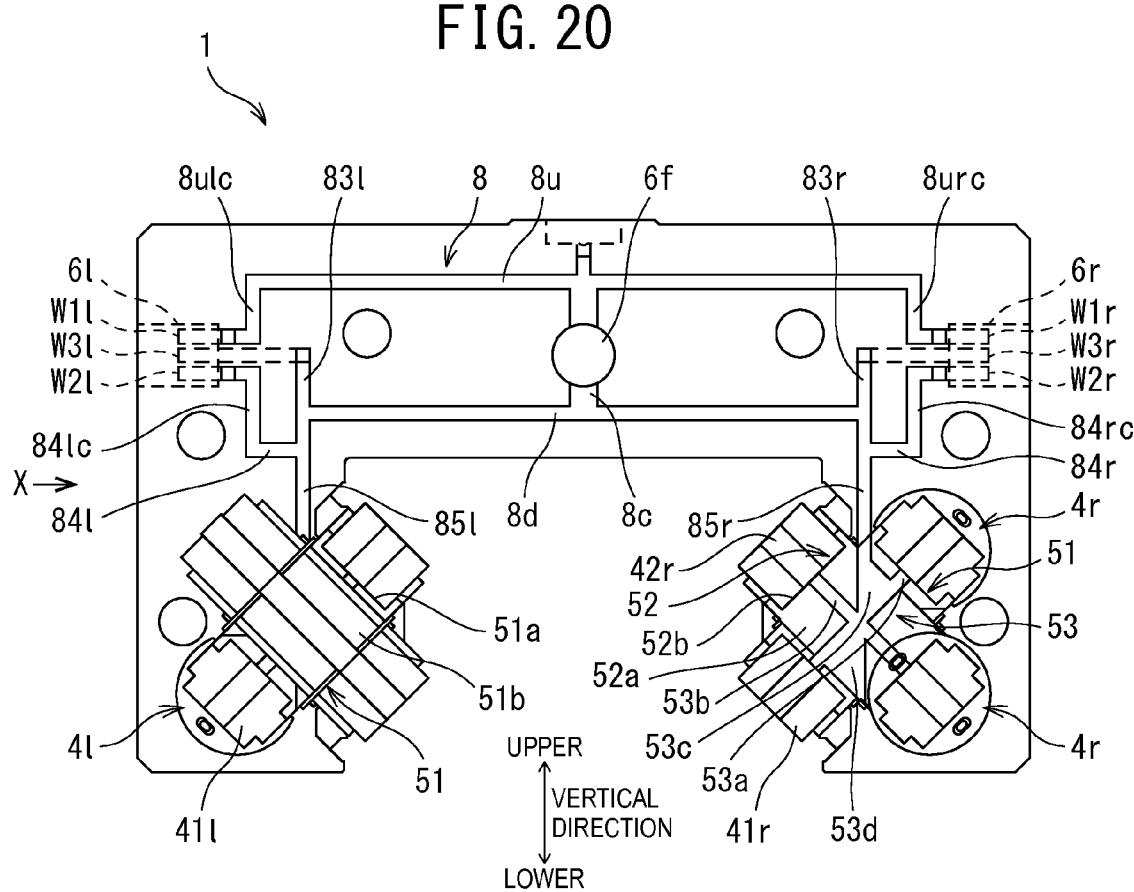
FIG. 20 is a view illustrative of a configuration of the end cap in a fourth embodiment of the present disclosure.
Figure 21:
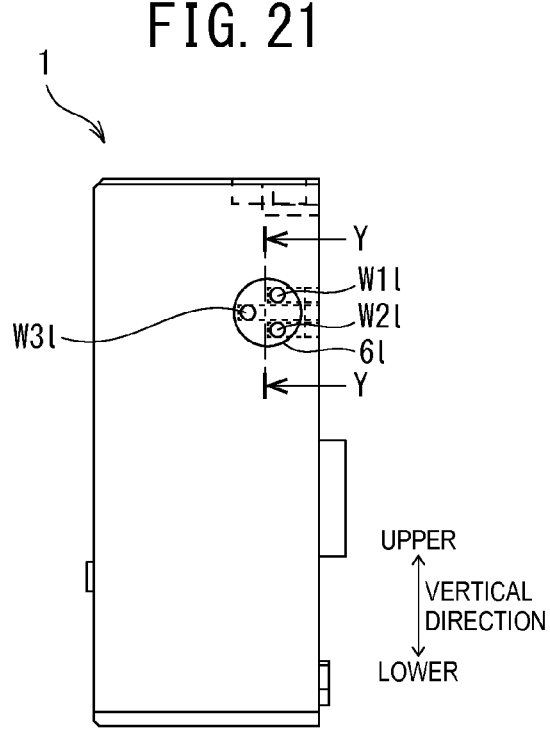
FIG. 21 is a view seen from an arrow X in FIG. 20.
Figure 22:
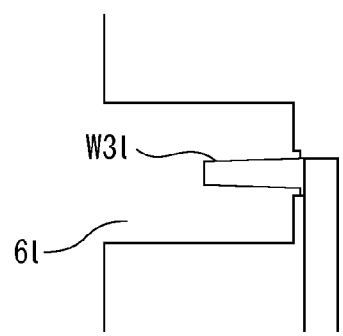
FIG. 22 is a view seen from arrows Y in FIG. 21.

The end cap 1 in the present embodiment does not include the left side first oil passage formation portion 81l, the right side first oil passage formation portion 81r, the left side second oil passage formation portion 82l, or the right side second oil passage formation portion 82r, out of the oil passage formation portion included in the end cap 1 in the above-described first embodiment, as illustrated in FIG. 20 to FIG. 22.

It is to be noted that FIG. 20 is a view illustrative of a configuration of the end cap 1 included in the linear guide device 2 in the present embodiment. Specifically, FIG. 20 is a view illustrative of a joint face of the end cap 1, with the slider body 16, like FIG. 4. Also, FIG. 21 is a view seen from an arrow X in FIG. 20, and FIG. 22 is a view seen from arrows Y in FIG. 21.

In addition, an upper side left face coupling oil passage formation portion 8ulc configured to communicate one end (an end on the left side in FIG. 20) of the upper oil passage formation portion 8u with the left side face oil supply opening 61 is provided between the upper oil passage formation portion 8u and the left side face oil supply opening 61. Furthermore, an upper side right face coupling oil passage formation portion 8urc configured to communicate the other end (an end on the right side in FIG. 20) of the upper oil passage formation portion 8u with the left side face oil supply opening 61 is provided between the upper oil passage formation portion 8u and the right side face oil supply opening 6r.

Moreover, a left side fourth coupling oil passage formation portion 84lc configured to communicate the left side fourth oil passage formation portion 84l and the left side face oil supply opening 61 is provided between the left side fourth oil passage formation portion 84l and the left side face oil supply opening 61. Furthermore, a right side fourth coupling oil passage formation portion 84rc configured to communicate the right side fourth oil passage formation portion 84r and the right side face oil supply opening 6r is provided between the right side fourth oil passage formation portion 84r and the right side face oil supply opening 6r.

Also, one end (an end on the left side in FIG. 20) of the left side third oil passage formation portion 83l is configured to communicate with the left side face oil supply opening 61, and the other end (an end on the right side in FIG. 20) of the right side third oil passage formation portion 83r is configured to communicate with the right side face oil supply opening 6r.

Next, a configuration of the oil passage obstruction wall member W will be described.

In the end cap 1 in the present embodiment, the left side first oil passage obstruction wall member W1l is arranged at the end of the left side face oil supply opening 61 side of the upper side left face coupling oil passage formation portion 8ulc. In addition, the left side first oil passage obstruction wall member W1l protrudes on the outer side of the oil passage 8. Similarly, the right side first oil passage obstruction wall member W1r is arranged at the end of the right side face oil supply opening 6r side of the upper side right face coupling oil passage formation portion 8urc. In addition, the right side first oil passage obstruction wall member W1r protrudes on the outer side of the oil passage 8.

Also, the left side second oil passage obstruction wall member W21 is arranged at the end of the left side face oil supply opening 61 side of the left side fourth coupling oil passage formation portion 84lc. In addition, the left side second oil passage obstruction wall member W21 protrudes on the outer side of the oil passage 8. Similarly, the right side second oil passage obstruction wall member W2r is arranged at the end of the right side face oil supply opening 6r side of the right side fourth coupling oil passage formation portion 84rc. In addition, the right side second oil passage obstruction wall member W2r protrudes on the outer side of the oil passage 8.

Further, the left side third oil passage obstruction wall member W3l is arranged at the end of the left side face oil supply opening 61 side of the left side third oil passage formation portion 83l. In addition, the left side third oil passage obstruction wall member W3l protrudes on the outer side of the oil passage 8. Similarly, the right side third oil passage obstruction wall member W3r is arranged at the end of the right side face oil supply opening 6r side of the right side third oil passage formation portion 83r. In addition, the right side third oil passage obstruction wall member W3r protrudes on the outer side of the oil passage 8.

As described heretofore, in the end cap 1 included in the linear guide device 2 in the present embodiment, the oil passage obstruction wall member W is arranged at the ends of the oil supply opening 6 side of the oil passage 8, and protrudes on the outer side of the oil passage 8.

(Operations, Functions, and the Like)

Next, referring to FIG. 3, FIG. 5, and FIG. 20 to FIG. 22, operations, functions, and the like of the linear guide device 2 having the above-described configuration will be described. It is to be noted that operations, the same operations, functions, and the like as those of the first embodiment described above will be omitted from the description in some cases.

In the operation (use) of the linear guide device 2, when the linear guide device 2 is operated (used), in newly supplying the lubricant (supplying oil) to the rolling element circulation passage, the lubricant is supplied into the oil passage 8 from the right side face oil supply opening 6r by use of a member with which the lubricant can be supplied (such as a grease gun).

The end cap 1 included in the linear guide device 2 in the present embodiment is arranged at the end of the oil supply opening 6 side in the oil passage 8 depending on the positional situation of the linear guide device 2 when in use, and the oil passage obstruction wall member W protruding on the outer side of the oil passage 8 is removed in an operation to be carried out by the operator or the like.

Specifically, like the first embodiment as described above, when the positional situation of the linear guide device 2 when in use is horizontal and it is easier to supply the lubricant from the right side face oil supply opening 6r than from the left side face oil supply opening 61. The right side first oil passage obstruction wall member W1r arranged at the end of the right side face oil supply opening 6r side of the upper side right face coupling oil passage formation portion 8urc is removed in the operation to be carried out by the operator or the like.

Hence, the supplying pathway of the lubricant is formed such that the lubricant that has been supplied from the right side face oil supply opening 6r into the oil passage 8 moves to the left side direction change passage 4l and the right side direction change passage 4r and is supplied into the rolling element circulation passage (see FIG. 5).

(Advantageous Effects in the Fourth Embodiment)

Advantageous effects in the present embodiment will be described as follows.

In addition to the advantageous effects (1) and (2) in the above-described first embodiment, the following advantageous effects are achievable.

(1) In the end cap 1 included in the linear guide device 2 in the present embodiment, the oil passage obstruction wall member W is arranged at the end of the oil supply opening 6 side of the oil passage 8, and protrudes on the outer side of the oil passage 8.

Therefore, even in the state where the end cap 1 is jointed with the slider body 16, the operation of removing the oil passage obstruction wall member W from the oil passage 8 is enabled.

As a result, even when a factor of setting the lubricant supply state such as an arrangement situation or the like of the linear guide device 2 is made clear after the linear guide device 2 is assembled, the lubricant can be supplied into the rolling element circulation passage depending on the positional situation of the linear guide device 2 when in use without removing the end cap 1 from the slider body 16.

(2) In the end cap 1 included in the linear guide device 2 in the present embodiment, the upper side left face coupling oil passage formation portion 8ulc configured to communicate one end of the upper oil passage formation portion 8u with the left side face oil supply opening 61 is provided between the upper oil passage formation portion 8u and the left side face oil supply opening 61. In addition to this, the upper side right face coupling oil passage formation portion 8urc configured to communicate the other end of the upper oil passage formation portion 8u with the right side face oil supply opening 6r is provided between the upper oil passage formation portion 8u and the right side face oil supply opening 6r.

Accordingly, regardless of the slanted angle of the arrangement face on which the linear guide device 2 is arranged, that is regardless of the positional situation of the linear guide device 2 when in use, the lubricant can be supplied from the left side face oil supply opening 61 through the upper side left face coupling oil passage formation portion 8ulc to the upper oil passage formation portion 8u. Similarly, the lubricant can be supplied from the right side face oil supply opening 6r through the upper side right face coupling oil passage formation portion 8urc to the upper oil passage formation portion 8u.

As a result, it is possible to improve the stability in supplying the lubricant into the upper oil passage formation portion 8u from the left side face oil supply opening 61 or the right side face oil supply opening 6r.

Fifth Embodiment

Hereinafter, a fifth embodiment in the present disclosure (hereinafter, referred to as "the present embodiment") will be described with reference to the drawings.

(Configuration)

Firstly, referring to FIG. 45, FIG. 46, FIG. 1 to FIG. 22, by using FIG. 23 and FIG. 24, a configuration of the end cap included in the linear guide device in the present embodiment will be described.

Figure 23:
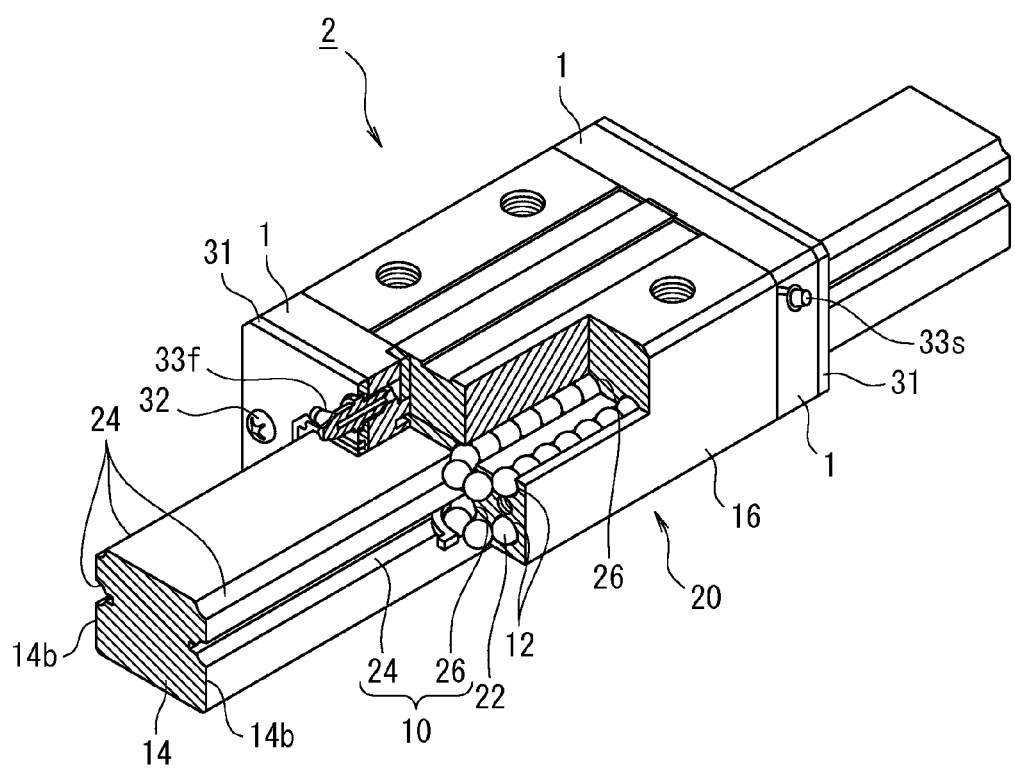
FIG. 23 is a view illustrative of a configuration of the linear guide device including the end cap in a fifth embodiment of the present disclosure.

FIG. 23 is a perspective view of the linear guide device 2 having the end cap 1 in the present embodiment. In addition, FIG. 24A is a front view of the end cap 1 in the present embodiment, and FIG. 24B is a side view of the end cap 1 in the present embodiment.

As illustrated in FIG. 23, the linear guide device 2 includes the guide rail 14 formed into a linear shape, and the slider 20 having a substantially reversed letter C shaped cross section that straddles the guide rail 14.

The guide rail 14 has, for example, two lines of the rail side rolling element rolling grooves 24 as pathways, respectively, on a left side portion 14b and a right side portion 14b, that is totally four lines of the rail side rolling element rolling grooves.

The slider 20 has, for example, totally four slider side rolling element rolling grooves 26 on its inner face to respectively oppose the rail side rolling element rolling grooves 24 of the guide rail 14. Then, plural rolling elements 22 are loaded in the rolling element rolling passages 10 configured with the rail side rolling element rolling grooves 24 and the slider side rolling element rolling grooves 26, which are opposed with each other.

The plural rolling elements 22 are, for example, plural balls (steel balls, ceramic balls, or the like).

Furthermore, the slider 20 includes the slider body 16 and a pair of end caps 1.

The rolling element return passages 12 penetrating through the slider body 16 is formed in parallel with the rolling element rolling passages 10 in the slider body 16.

The pair of the end caps 1 is attached onto both end face portions (ends in the linearly moving direction) of the slider body 16, respectively, have a substantially similar shape to the ends in the linearly moving direction of the slider body 16, and are formed to have a substantially reversed letter C shape having a substantially identical dimension.

In addition, a direction change passage formation third depression portion 43 (direction change passage formation depression portion 43) having a substantially letter U shape is formed in the inside of each end cap 1. It is to be noted that FIG. 24A illustrates totally four direction change passage formation third depression portions 43. Further, in the following drawings, the direction change passage formation third depression portion 43 arranged in the sleeve portion on the right side of the end cap 1 and the direction change passage formation third depression portion 43 arranged in the sleeve portion on the left side of the end cap 1 will be also distinguished from each other by adding a code "a" or a code "b", individually.

In the direction change passage formation third depression portion 43, a parallel return guide 72 is arranged at a return guide fitting depression portion 71, so as to form the direction change passage 4 together with the parallel return guide 72. It is to be noted that for the purpose of description, FIG. 24A illustrates a state where the parallel return guide 72 is provided only at the return guide fitting depression portion 71 formed on the right side of FIG. 24B. In addition, such an arrangement state will be also illustrated similarly in the following drawings.

The return guide fitting depression portion 71 is a groove formed between the two lines of the direction change passage formation third depression portion 43 in the joint face of the end cap 1, with the slider body 16, and extending in the top and bottom direction of the drawing.

The parallel return guide 72 is formed to have a shape that can be arranged in the return guide fitting depression portion 71, specifically, a semicircular column shaped cross section, and includes a return guide side oil passage 53 and a lubricant supply opening 73. It is to be noted that the description of the return guide side oil passage 53 and the lubricant supply opening 73 will be described later.

In addition, one end (an end located on the upper side in the drawing) of the parallel return guide 72 is continuous with an upper inner wall face of the direction change passage 4 on the upper side out of the two lines of the direction change passages 4, with the parallel return guide 72 being arranged in the return guide fitting depression portion 71. On the other hand, the other end (an end located on the lower side in the drawing) of the parallel return guide 72 is continuous with a lower inner wall face of the direction change passage 4 on the lower side out of the two lines of the direction change passages 4, with the parallel return guide 72 being arranged in the return guide fitting depression portion 71.

In addition, each of the direction change passages 4 is configured to communicate an end of the rolling element return passage 12 with an end of the rolling element rolling passage 10, so that the rolling element circulation passage that is an endless circulation passage of the rolling elements 22 is configured with the rolling element rolling passage 10, the rolling element return passage 12, and the direction change passages 4 on both sides.

Hence, the rolling elements 22 that have rolled through the rolling element rolling passage 10 in accordance with the relative movement of the slider 20, after having changed their directions at the direction change passage 4 in one of the end caps 1, are introduced into the rolling element return passage 12. Subsequently, while the rolling elements 22 are circulating and returning to the rolling element rolling passage 10 again from the direction change passage 4 on the opposite side, via the rolling of the plural rolling elements 22, the slider 20 is capable of relatively moving in a longitudinal direction of the guide rail 14.

It is to be noted that a pair of side seals 31 are respectively provided on an outer face of each end cap 1 that is an end face in the relatively moving direction of the slider 20.

Each side seal 31 has a substantially similar shape to the cross-sectional shape of the end cap 1, and is formed to have a substantially reversed letter C shape having a substantially identical dimension. The provision of the side seal 31 prevents foreign materials such as dusts from entering the inside of the slider 20 between the guide rail 14 and the end cap 1.

It is to be noted that, for example, the end cap 1 and the side seal 31 are attached to the slider body 16 by attachment screws 32.

A front face oil supply opening (not illustrated) is arranged at a center part in the width direction of the end cap 1 and the side seal 31. A front face nipple 33f is attached onto the front face oil supply opening.

An oil supply opening (hereinafter, also referred to as "side face oil supply opening"), to be described below, on the side face in the width direction of the end cap 1. A side face nipple 33s is attached onto a side face oil supply opening.

In addition, each end cap 1 includes the oil passage 8 for supplying the lubricant to the direction change passage 4 on a face opposed to the slider body 16.

Further, the configuration of the end cap 1 is symmetric to a center line CL illustrated in FIG. 24A. In other words, the shape and the arrangement location of the above-described oil passage 8 are symmetric to the center line CL. Moreover, the shape and the arrangement location of side face oil supply opening to be described below are also symmetric to the center line CL.

It is to be noted that the center line CL is perpendicular to the width direction (left and right direction in the drawing) of the end cap 1, when viewed from the linearly moving direction of the slider 20, and is a line virtually passing through the center in the width direction of the end cap 1.

The end cap 1 is, as illustrated in FIG. 24A, configured to include a trunk portion 1a located at the center of the end cap 1, and a pair of sleeve portions 1b arranged on both sides of the trunk portion 1a. Hence, the cross-sectional shape of the end cap 1 is a substantially reversed letter C shape.

The left side face oil supply opening 61 and the right side face oil supply opening 6r for supplying the lubricant from the outside are respectively arranged on left and right side faces in the end cap 1 (side faces in the width direction of the end cap 1).

The left side face oil supply opening 61 and the right side face oil supply opening 6r are formed to extend toward the center portion in the width direction of the end cap 1, respectively. Then, the oil passage obstruction wall member (hereinafter, also referred to as "first oil passage obstruction wall member") W1 for obstructing the upper oil passage formation portion 8u, to be described later, and the oil passage obstruction wall member (hereinafter, also referred to as "second oil passage obstruction wall member") W2 for obstructing the lower oil passage formation portion 8d, to be described later, are provided in each of the left side face oil supply opening 61 and the right side face oil supply opening 6r.

The first oil passage obstruction wall member W1 is arranged on the upper side of FIG. 24B, whereas the second oil passage obstruction wall member W2 is arranged on the lower side of FIG. 24B.

Then, when the linear guide device 2 is used, the W1 or the second oil passage obstruction wall member W2 are additionally processed (for example, removal processing by piercing) to remove the first oil passage obstruction wall member W1 or the second oil passage obstruction wall member W2. Hence, the left side face oil supply opening 61 or the right side face oil supply opening 6r is configured to be communicated with the oil passage 8.

It is to be noted that, in the present embodiment, the left side face oil supply opening 61 or the right side face oil supply opening 6r can be selectively used. In addition, the shape of the left side face oil supply opening 61 and the right side face oil supply opening 6r is circular in a side face view. Further, the shape of the first oil passage obstruction wall member W1 and the second oil passage obstruction wall member W2 is also circular in a side face view.

Next, the oil passage 8 will be described below.

The oil passage 8 includes the upper oil passage formation portion 8u, the central oil passage formation portion 8c, the lower oil passage formation portion 8d, and the return guide side oil passage 53.

The upper oil passage formation portion 8u is a part that is formed to communicate the left side face oil supply opening 61 with the right side face oil supply opening 6r in the oil passage 8.

Additionally, the upper oil passage formation portion 8u includes a flow pathway 8ua, a flow pathway 8ub, a flow pathway 8uc, and a flow pathway 8ud.

The flow pathway 8ua is a flow pathway extending from the left side face oil supply opening 61 or the right side face oil supply opening 6r toward the center part side of the trunk portion 1a.

The flow pathway 8ub is a flow pathway configured to communicate with the flow pathway 8ua and extending from the far side in the drawing toward the near side in the drawing.

The flow pathway 8uc is a flow pathway configured to communicate with the flow pathway 8ub and extending from the lower side in the drawing to the upper side in the drawing.

The flow pathway 8ud communicates with the flow pathway 8uc, and is a flow pathway extending from the left side face oil supply opening 61 or the right side face oil supply opening 6r toward the center part side of the trunk portion 1a.

The first oil passage obstruction wall member W1 is arranged on the location where the left side face oil supply opening 61 or the right side face oil supply opening 6r is communicated with the flow pathway 8ua.

Further, the first oil passage obstruction wall member W1 obstructs the upper oil passage formation portion 8u.

The lower oil passage formation portion 8d is arranged on the lower side than the upper oil passage formation portion 8u in the drawing. In other words, the lower oil passage formation portion 8d is arranged on the guide rail 14 side as compared to the upper oil passage formation portion 8u.

Furthermore, like the upper oil passage formation portion 8u, the lower oil passage formation portion 8d is a part configured to communicate the left side face oil supply opening 61 with the right side face oil supply opening 6r in the oil passage 8.

The lower oil passage formation portion 8d includes a flow pathway 8da, a flow pathway 8db, a flow pathway 8dc, a flow pathway 8dd, a flow pathway 8de, and a flow pathway 8df.

The flow pathway 8da is a flow pathway extending from the left side face oil supply opening 61 or the right side face oil supply opening 6r toward the center part side of the trunk portion 1a.

The flow pathway 8db is a flow pathway configured to communicate with the flow pathway 8da and extending from the far side in the drawing toward the near side in the drawing.

The flow pathway 8dc is a flow pathway configured to communicate with the flow pathway 8db and extending from the lower side in the drawing to the upper side in the drawing.

The flow pathway 8dd is a flow pathway configured to communicate with the flow pathway 8dc and extending from the left side face oil supply opening 61 side or the right side face oil supply opening 6r side toward the center part side of the trunk portion 1a.

The flow pathway 8de is a flow pathway configured to communicate with the flow pathway 8dd and extending from the lower side in the drawing to the upper side in the drawing.

The flow pathway 8df is a flow pathway configured to communicate with the flow pathway 8de and extending from the left side face oil supply opening 61 side or the right side face oil supply opening 6r side toward the center part side of the trunk portion 1a.

The second oil passage obstruction wall member W2 is provided at a location where the left side face oil supply opening 61 or the right side face oil supply opening 6r is communicated with the flow pathway 8da.

In addition, the second W2 obstructs the lower oil passage formation portion 8d.

The central oil passage formation portion 8c is formed at a center part in the width direction of the end cap 1, in the oil passage 8, and is formed in the top and bottom direction of the drawing so as to communicate the upper oil passage formation portion 8u (flow pathway 8ud) with the lower oil passage formation portion 8d (flow pathway 8df).

The central oil passage formation portion 8c and the front face oil supply opening 6f arranged at the center part in the width direction of the end cap 1 overlap each other, when viewed from the linearly moving direction of the slider body 16. It is to be noted that, for example, the cross-sectional shape of the front face oil supply opening 6f is substantially circular.

The return guide side oil passage 53 is formed at a plane portion of the parallel return guide 72 having a semicircular column shape, and is a groove extending the whole parallel return guide 72 in the axial direction.

Also, the return guide side oil passage 53 extends in the top and bottom direction of the drawing so that one end thereof is communicated with the flow pathway 8*de* along the left and right sleeve portions 1*b*, with the parallel return guide 72 being arranged in the return guide fitting depression portion 71. In other words, the return guide side oil passage 53 is a part that branches at the lower oil passage formation portion 8*d* and communicates with each of the direction change passage formation depression portions 43.

The lubricant supply opening 73 is an opening that opens at the bottom face of the return guide side oil passage 53, and communicates the return guide side oil passage 53 with the direction change passage formation third depression portion 43.

In other words, the return guide side oil passage 53 and the lubricant supply opening 73 configure a lubricant introduction passage of communicating the lower oil passage formation portion 8*d* with the direction change passage formation third depression portion 43.

In the present embodiment, as an example, a description will be given of a case where the lubricant supply opening 73 is arranged at a location of the return guide side oil passage 53, which overlaps the center of the direction change passage 4, when viewed from the linearly moving direction of the slider body 16.

It is to be noted that, for example, in the present embodiment, the cross section of the above-described oil passage 8 entirely has the same shape.

(Operations, Functions, and the Like)

Next, referring to FIG. 45, FIG. 46, and FIG. 1 to FIG. 24, by using FIG. 25 and FIG. 26, operations, functions, and the like of the linear guide device 2 having the above configuration will be described. It is to be noted that in the following description, a description will be given of a case where the lubricant is supplied to one of the pair of end caps 1 (the end cap on the right side in the drawing of FIG. 23), with the first oil passage obstruction wall member W1 or the second oil passage obstruction wall member W2 included in the right side face oil supply opening 6*r* being removed.

(Oil Supply in the Positional Situation that is Horizontal)

Firstly, by using FIG. 25, when the end cap 1 in the present embodiment is used in the positional situation that is horizontal, the oil supply will be described.

Figure 25:
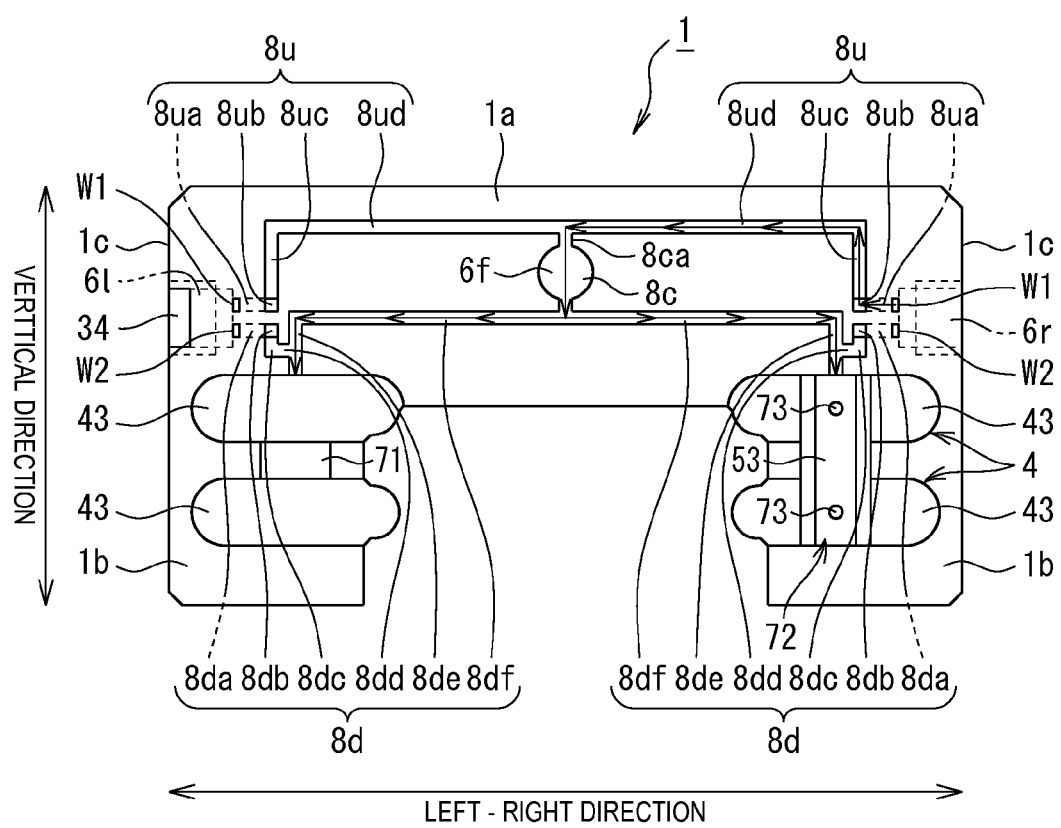
FIG. 25 is a view illustrative of a lubricant flow when the lubricant is supplied to the end cap used in the positional situation that is horizontal.

FIG. 25 is a view illustrative of a flow of the lubricant when the oil is supplied to the end cap 1 to be used in the positional situation that is horizontal. It is to be noted that arrows in the oil passage 8 illustrated in drawing indicates the flow of the lubricant.

When the oil is supplied to the end cap 1 used in the positional situation that is horizontal, the first oil passage obstruction wall member W1 arranged at the right side face oil supply opening 6*r* is firstly removed. Thus, the right side face oil supply opening 6*r* is communicated with the upper oil passage formation portion 8*u* (the flow pathway 8*ua*).

Then, the lubricant that has been supplied from the right side face oil supply opening 6*r* is firstly supplied through the flow pathways 8*ua*, 8*ub*, and 8*uc* to the flow pathway 8*ud* from the right side face oil supply opening 6*r*. Subsequently, the lubricant that has been supplied to the flow pathway 8*ud* is supplied to a branch point 8*ca* of the upper oil passage formation portion 8*u* (the flow pathway 8*ud*) and the central oil passage formation portion 8*c*.

The lubricant that has been supplied to the branch point 8*ca* of the flow pathway 8*ud* and the central oil passage formation portion 8*c* is then influenced by gravity, and is supplied toward the central oil passage formation portion 8*c* side. Then, the lubricant is supplied to the lower oil passage formation portion 8*d* (the flow pathway 8*df*) configured to communicate with the central oil passage formation portion 8*c*. The lubricant that has been supplied to the flow pathway 8*df* is supplied through each flow pathway 8*de* to each return guide side oil passage 53. Further, the lubricant is supplied to each direction change passage 4 from the lubricant supply opening 73 arranged in each return guide side oil passage 53.

(Oil Supply in the Positional Situation that is Wall Hanging)

Next, by using FIG. 26, the oil supply when the linear guide device 2 is used in the positional situation that is wall hanging (90 degrees is an angle with respect to the plane face) will be described.

Figure 26:
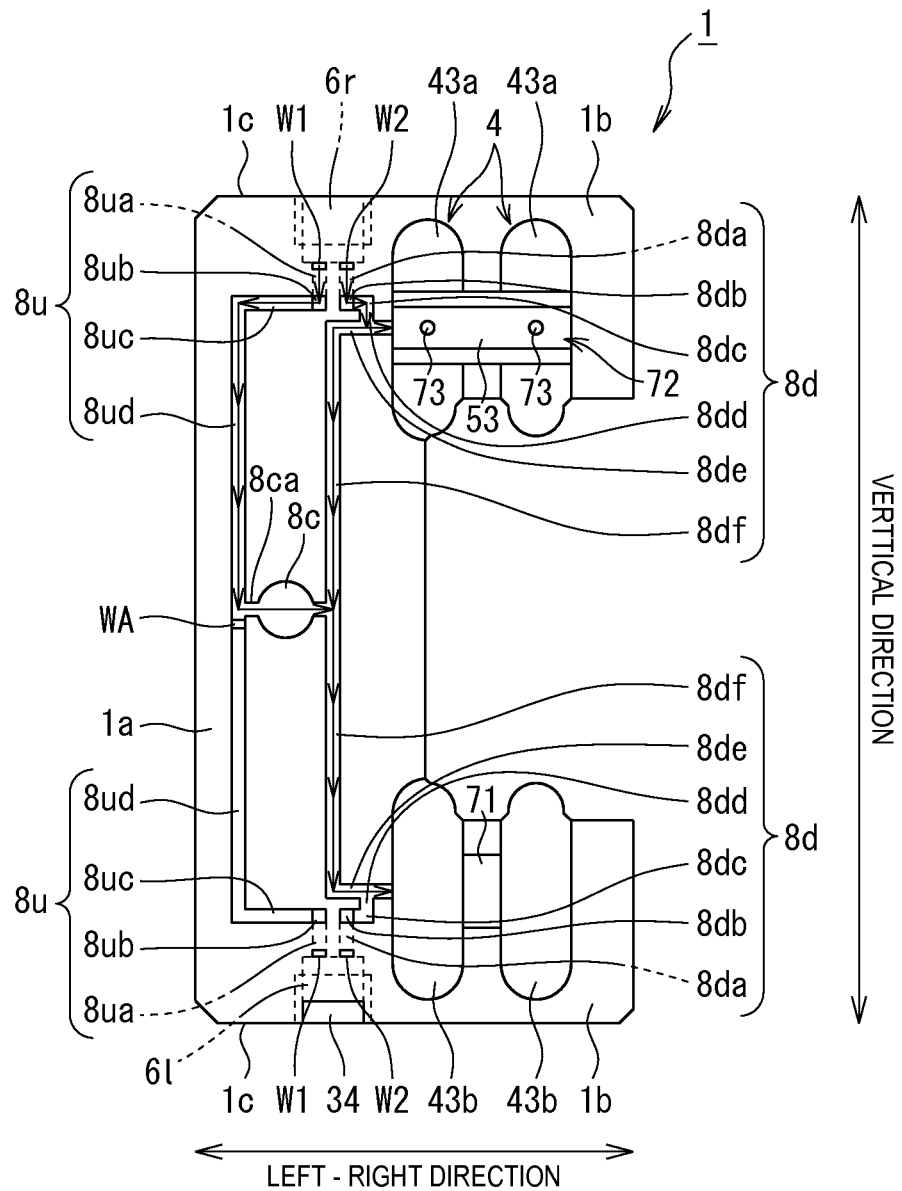
FIG. 26 is a view illustrative of a lubricant flow when the lubricant is supplied to the end cap used in the positional situation that is wall hanging.

FIG. 26 is a view illustrative of a flow of the lubricant when the oil is supplied to the end cap 1 to be used in the positional situation that is wall hanging. It is to be noted that arrows in the oil passage 8 illustrated in the drawing indicate the flow of the lubricant.

When the oil is supplied to the end cap 1 used in the positional situation that is wall hanging, the second oil passage obstruction wall member W2 arranged at the right side face oil supply opening 6*r* is firstly removed. Thus, the right side face oil supply opening 6*r* is communicated with the lower oil passage formation portion 8*d* (the flow pathway 8*da*). In addition to this, the additional oil passage obstruction wall member WA is provided at a location in the upper oil passage formation portion 8*u* on the lower side of the branch point 8*ca* in the vertical direction with the linear guide device 2 being arranged in the positional situation that is wall hanging.

The lubricant that has been supplied from the right side face oil supply opening 6*r* is firstly supplied through the flow pathways 8*da*, 8*db*, and 8*dc* to the flow pathway 8*dd*. Subsequently, the lubricant that has been supplied to the flow pathway 8*dd* is partially supplied to the return guide side oil passage 53 on the upper side in the drawing. Then, the lubricant that has been supplied to the return guide side oil passage 53 on the upper side in the drawing is supplied into the direction change passage 4 on the upper side in the drawing from the lubricant supply opening 73 arranged at the return guide side oil passage 53.

Also, the lubricant that has been supplied to the flow pathway 8*dd* is partially supplied through the flow pathway 8*de* to the flow pathway 8*df*. Further, the lubricant that has been supplied to the flow pathway 8*df* is influenced by gravity, and is supplied to the flow pathway 8*de* configured to communicate with the return guide side oil passage 53 on the lower side in the drawing.

Then, the lubricant that has been supplied to the flow pathway 8*de* configured to communicate with the return guide side oil passage 53 on the lower side in the drawing is supplied to the return guide side oil passage 53 on the lower side in the drawing. Subsequently, the lubricant that has been supplied to the return guide side oil passage 53 on the lower side in the drawing is supplied into the direction change passage 4 on the lower side in the drawing from the lubricant supply opening 73 arranged at the return guide side oil passage 53.

Furthermore, the lubricant that has been supplied into the upper oil passage formation portion 8*u* from the right side face oil supply opening 6*r* is supplied through the flow pathway 8*ud* to the central oil passage formation portion 8*c*, since the additional oil passage obstruction wall member WA obstructs the location in the upper oil passage formation portion 8*u* on the lower side than the branch point 8*ca* in the vertical direction, with the linear guide device 2 being used in the positional situation that is wall hanging. Then, the lubricant that has been supplied to the central oil passage formation portion 8c is supplied through the flow pathway 8df, the flow pathway 8de, the flow pathway 8dd to the return guide side oil passage 53 on the lower side in the drawing, and is supplied into the direction change passage 4 on the lower side in the drawing from the lubricant supply opening 73 arranged at the return guide side oil passage 53.

It is to be noted that as illustrated in FIG. 25 and FIG. 26, the left side face oil supply opening 61, including the first oil passage obstruction wall member W1 and the second oil passage obstruction wall member W2, on which additional processing has not been carried out, is embedded with a plug 34.

(Advantageous Effects in the Fifth Embodiment)

Advantageous effects in the present embodiment will be described as follows.

(1) In the end cap 1 in the present embodiment, even when the linear guide device 2 is used in the positional situation that is horizontal, the lubricant can be supplied to all of the direction change passages 4 included in the end cap 1.

As a result, even when the linear guide device 2 is used in the positional situation that is horizontal, the lubricant can be supplied into the entire rolling element circulation passage. It is thus possible to suppress a degradation in the operation performance and in the durability of the linear guide device 2.

(2) In the end cap 1 in the present embodiment, even when the linear guide device 2 is used in the positional situation that is wall hanging, the lubricant can be supplied to all of the direction change passages 4 included in the end cap 1.

As a result, even when the linear guide device 2 is used in the positional situation that is wall hanging, the lubricant can be supplied into the entire rolling element circulation passage. It is thus possible to suppress a degradation in the operation performance and in the durability of the linear guide device 2.

(3) In the present embodiment, plural oil passage obstruction wall members W are additionally processed arbitrarily, so that the moving pathway of the lubricant is selectable depending on the various conditions for use. Also, after the additional processing is made on the oil passage obstruction wall member W, it is possible to confirm the location where the additional processing has been carried out by removing the plug 34 or the like.

(4) In the present embodiment, since the lubricant supply opening 73 is arranged at the location of the return guide side oil passage 53, which overlaps the center of the direction change passage 4, when viewed from the linearly moving direction of the slider body 16, it is made possible to suppress a difference in the supply amounts of the lubricant between both sides of the direction change passage 4 with the lubricant supply opening 73 being set as the center.

Accordingly, the lubricant can be supplied for the entire direction change passage 4 equally.

(Modifications)

(1) In the present embodiment, the description has been given to the case where the left side face oil supply opening 61 or the right side face oil supply opening 6r is communicated with the flow pathway 8ud by plural flow pathways, in the upper oil passage formation portion 8u. However, the present embodiment is not limited to this.

In other words, for example, the left side face oil supply opening 61 or the right side face oil supply opening 6r may be communicated with the flow pathway 8ud by a single flow pathway.

Similarly, the description has been given to the case where the left side face oil supply opening 61 or the right side face oil supply opening 6r is communicated with the flow pathway 8df by plural flow pathways, in the lower oil passage formation portion 8d. However, the present embodiment is not limited to this.

In other words, for example, the left side face oil supply opening 61 or the right side face oil supply opening 6r may be communicated with the flow pathway 8df by a single flow pathway.

(2) In the present embodiment, the description has been given to the case where the first oil passage obstruction wall member W1 and the second oil passage obstruction wall member W2 are arranged in the left side face oil supply opening 61 and the right side face oil supply opening 6r. However, the present embodiment is not limited to this.

In other words, the first oil passage obstruction wall member W1 and the second oil passage obstruction wall member W2 may be arranged at any locations as far as the additional processing is possible for each oil passage obstruction wall member W. Thus, the first oil passage obstruction wall member W1 and the second oil passage obstruction wall member W2 may be arranged, for example, in the oil passage 8.

(3) In the present embodiment, the description has been given to the case where the oil passage obstruction wall member W is provided at the left side face oil supply opening 61 and the right side face oil supply opening 6r. However, the present embodiment is not limited to this.

In other words, any method is applicable, as far as the oil supply opening 6 can be communicated with the oil passage 8 by removing the oil passage obstruction wall member W.

(4) In the present embodiment, the description has been given to the case where the oil passage obstruction wall member W is removed by piercing, for example, to communicate the oil supply opening with the oil passage 8. However, the present embodiment is not limited to this.

In other words, for example, the oil passage obstruction wall member W may not be provided at the oil supply opening 6. That is, any oil supply opening of communicating the upper oil passage formation portion 8u or the lower oil passage formation portion 8d may be provided beforehand. In this case, the similar operations and functions as described above are achievable by obstructing the oil supply opening that is not used with, for example, the plug 34 or the like.

Figure 27:
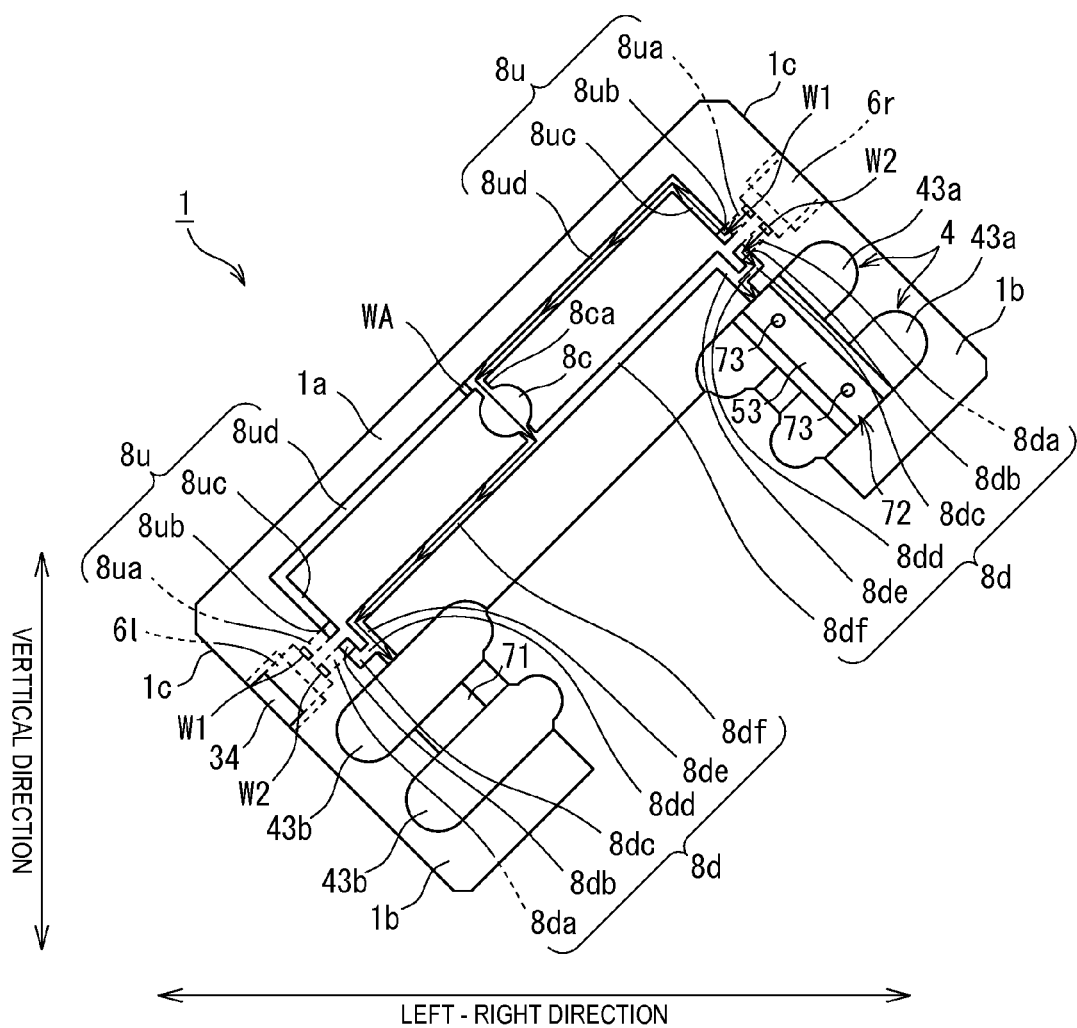
FIG. 27 is a view illustrative of a configuration of the end cap in the fifth embodiment of the present disclosure.

(5) In the present embodiment, the description has been given to the case where the linear guide device 2 is used in the positional situation that is wall hanging. However, the positional situation of the linear guide device 2 when in use is not limited to this. In other words, as illustrated in FIG. 27, the linear guide device 2 may be used in the positional situation that is slanted (the positional situation that is in between horizontal and wall hanging). It is to be noted that FIG. 27 is a view illustrative of a configuration in a modification in the present embodiment, and is a view illustrative of a joint face of the end cap 1, with the slider body. Also, in FIG. 27, a moving pathway of the lubricant is indicated by arrows.

Herein, the "positional situation that is slanted" denotes the positional situation that is in between the above-described positional situation that is horizontal and the above-described positional situation that is wall hanging (a virtual axis virtually provided to extend in the width direction of the end cap 1 that is the left-right direction in FIG. 27A is slanted at 45 degrees with respect to the horizontal direction), and also denotes the state (the positional situation)

where the end cap 1 is slanted to the rolling direction. It is to be noted that the slanted angle of the virtual axis in the positional situation that is slanted is not limited to 45 degrees.

In this case, the additional passage obstruction wall member WA is provided at a location in the upper oil passage formation portion 8u on the lower side than the branch point 8ca in the vertical direction with the linear guide device 2 being arranged in the positional situation that is slanted. In addition to this, the first oil passage obstruction wall member W1 and the second oil passage obstruction wall member W2 arranged at the right side face oil supply opening 6r are both removed. Thus, the right side face oil supply opening 6r is communicated with the upper oil passage formation portion 8u (the flow pathway 8ua) and the lower oil passage formation portion 8d (the flow pathway 8da).

In such a configuration, the lubricant that has been supplied from the right side face oil supply opening 6r into the lower oil passage formation portion 8d is supplied through the flow pathways 8da, 8db, and 8dc to the flow pathway 8dd. Then, the lubricant that has been supplied to the flow pathway 8dd is supplied to the return guide side oil passage 53 on the upper side in the drawing, and is supplied into the direction change passage 4 on the upper side in the drawing from the lubricant supply opening 73 arranged at the return guide side oil passage 53 on the upper side in the drawing.

In addition, the lubricant that has been supplied from the right side face oil supply opening 6r and that has moved into the upper oil passage formation portion 8u is supplied through the flow pathway 8ud to the central oil passage formation portion 8c, since the additional passage obstruction wall member WA obstructs the location in the upper oil passage formation portion 8u on the lower side than the branch point 8ca in the vertical direction with the linear guide device 2 being in the positional situation that is slanted. Then, the lubricant that has been supplied to the central oil passage formation portion 8c is supplied through the flow pathway 8df, the flow pathway 8de, and the flow pathway 8dd is supplied to the return guide side oil passage 53 on the lower side in the drawing, and is supplied from the lubricant supply opening 73 arranged at the return guide side oil passage 53 into the direction change passage 4 on the lower side in the drawing.

Figure 28:
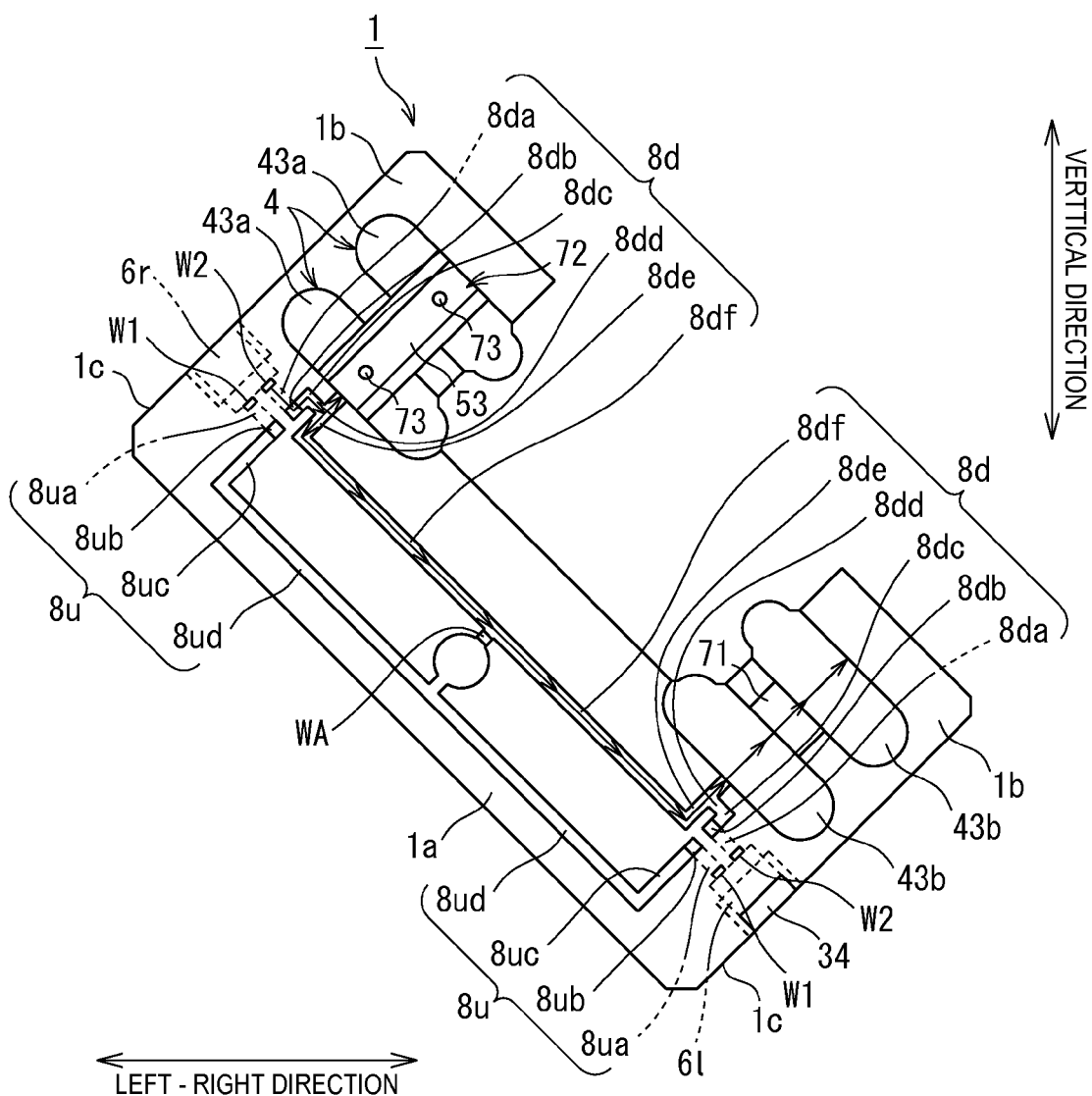
FIG. 28 is a view illustrative of a configuration of the end cap in the fifth embodiment of the present disclosure.

In addition, as illustrated in FIG. 28, the slanted angle of the virtual axis in the positional situation that is slanted may be 135 degrees. It is to be noted that FIG. 28 is a view illustrative of a configuration in a modification in the present embodiment, and is a view illustrative of a joint face of the end cap 1, with the slider body. Further, in FIG. 28, a moving pathway of the lubricant is indicated by arrows.

In this case, the lubricant that has been supplied from the right side face oil supply opening 6r is supplied through the flow pathways 8da, 8db, and 8dc to the flow pathway 8dd. Then, the lubricant that has been supplied to the flow pathway 8dd is partially supplied to the return guide side oil passage 53 on the upper side in the drawing. Then, the lubricant that has been supplied to the return guide side oil passage 53 is supplied into the direction change passage 4 on the upper side in the drawing from the lubricant supply opening 73 arranged at the return guide side oil passage 53.

Furthermore, the lubricant that has been supplied to the flow pathway 8dd is partially supplied through the flow pathway 8de to the flow pathway 8df. Moreover, the lubricant that has been supplied to the flow pathway 8df is influenced by the gravity, and is supplied to the flow pathway 8de configured to communicate with the return guide side oil passage 53 on the lower side in the drawing.

Then, the lubricant that has been supplied to the flow pathway 8de configured to communicate with the return guide side oil passage 53 on the lower side in the drawing is supplied to the return guide side oil passage 53. The lubricant that has been supplied to the return guide side oil passage 53 is supplied into the direction change passage 4 on the lower side in the drawing from the lubricant supply opening 73 arranged at the return guide side oil passage 53.

Figure 29:
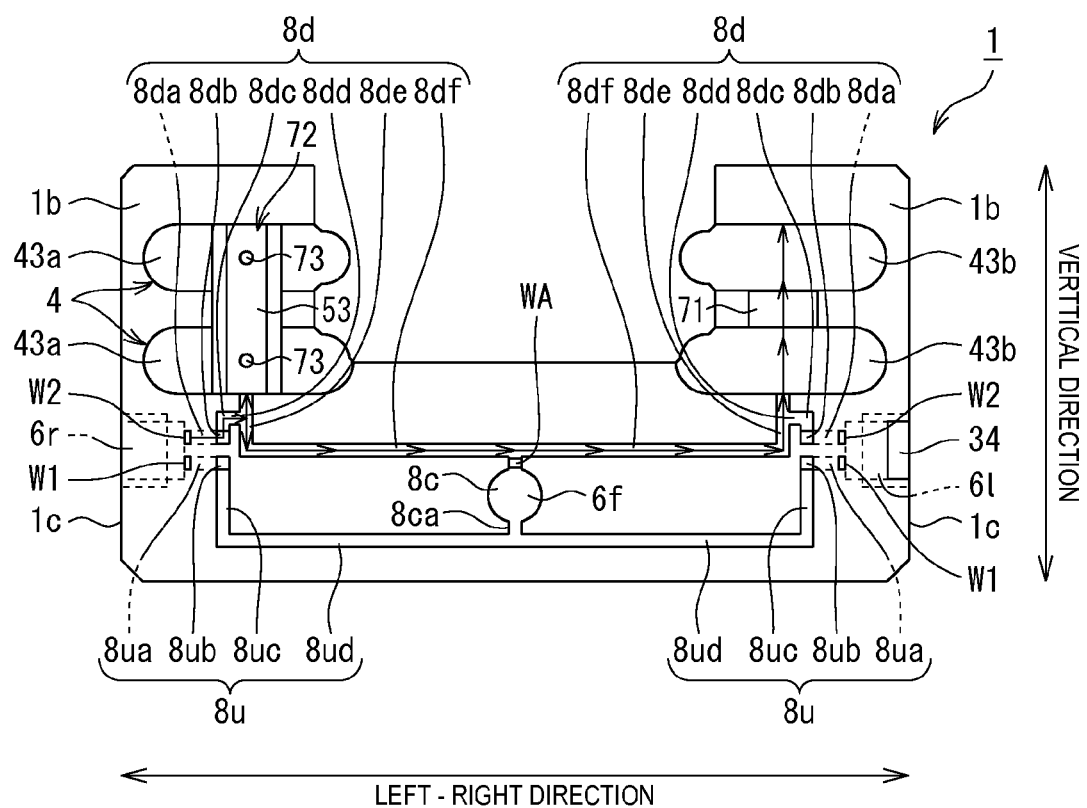
FIG. 29 is a view illustrative of a configuration of the end cap in the fifth embodiment of the present disclosure.

Additionally, as illustrated in FIG. 29, the slanted angle of the virtual axis in the positional situation that is slanted may be 180 degrees. It is to be noted that FIG. 29 is a view illustrative of a configuration in a modification in the present embodiment, and is a view illustrative of a joint face of the end cap 1, with the slider body. Further, in FIG. 29, a moving pathway of the lubricant is indicated by arrows.

In this case, the additional passage obstruction wall member WA is provided at a location in the central oil passage formation portion 8c between the front face oil supply opening 6f and the flow pathway 8df.

In such a configuration, the lubricant that has been supplied from the right side face oil supply opening 6r is supplied through the flow pathways 8da, 8db, and 8dc to the flow pathway 8dd. Subsequently, the lubricant that has been supplied to the flow pathway 8dd is partially supplied to the return guide side oil passage 53 on the left side in the drawing. Then, the lubricant that has been supplied to the return guide side oil passage 53 is supplied into the direction change passage 4 on the left side in the drawing from the lubricant supply opening 73 arranged at the return guide side oil passage 53.

Furthermore, the lubricant that has been supplied to the flow pathway 8dd is partially supplied through the flow pathway 8de to the flow pathway 8df. Moreover, the lubricant that has been supplied to the flow pathway 8df is supplied to the flow pathway 8de configured to communicate with the return guide side oil passage 53 on the right side in the drawing.

Then, the lubricant that has been supplied to the flow pathway 8de configured to communicate with the return guide side oil passage 53 on the right side in the drawing is supplied to the return guide side oil passage 53. The lubricant that has been supplied to the return guide side oil passage 53 is supplied into the direction change passage 4 on the right side in the drawing from the lubricant supply opening 73 arranged at the return guide side oil passage 53.

Sixth Embodiment

Hereinafter, a sixth embodiment in the present disclosure (hereinafter, referred to as "the present embodiment") will be described with reference to the drawings.
(Configuration)

Firstly, referring to FIG. 45, FIG. 46, and FIG. 1 to FIG. 29, by using FIG. 30, a configuration of the end cap included in the linear guide device in the present embodiment will be described.

The configuration of the end cap 1 in the present embodiment is almost same as that of the fifth embodiment, but a relative positional relationship between the first oil passage obstruction wall member W1 and the second oil passage obstruction wall member W2 is different from that in the end cap 1 in the fifth embodiment.

Thus, in the following description, only the relative positional relationship between the first oil passage obstruction wall member W1 and the second oil passage obstruction wall member W2 will be described. As other configurations are same as those in the fifth embodiment, the descriptions thereof will be omitted. It is to be noted that, in FIG. 30A to FIG. 30C, the same components and configurations as those of the fifth embodiment described above have the same reference numerals.

Figure 30A:
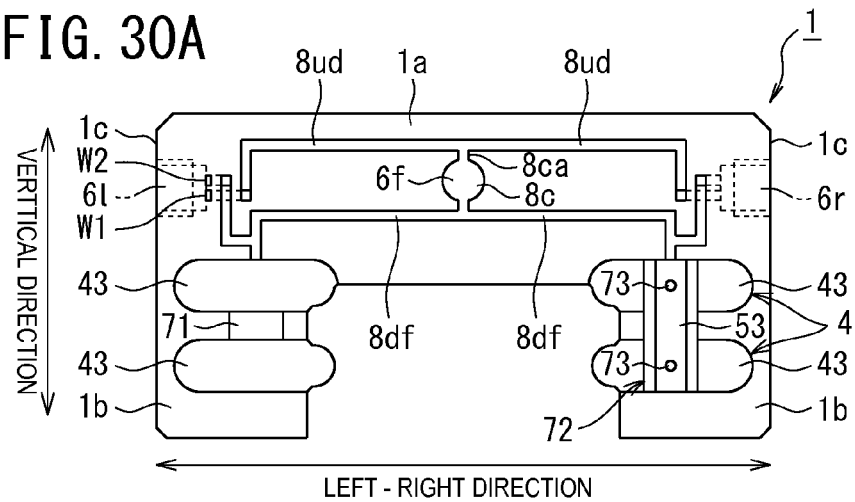
FIG. 30A to FIG. 30C are front views of the end cap in a sixth embodiment of the present disclosure.
Figure 30B:
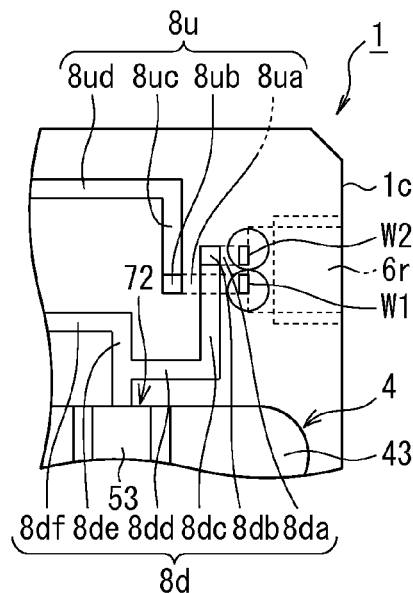
Figure 30C:
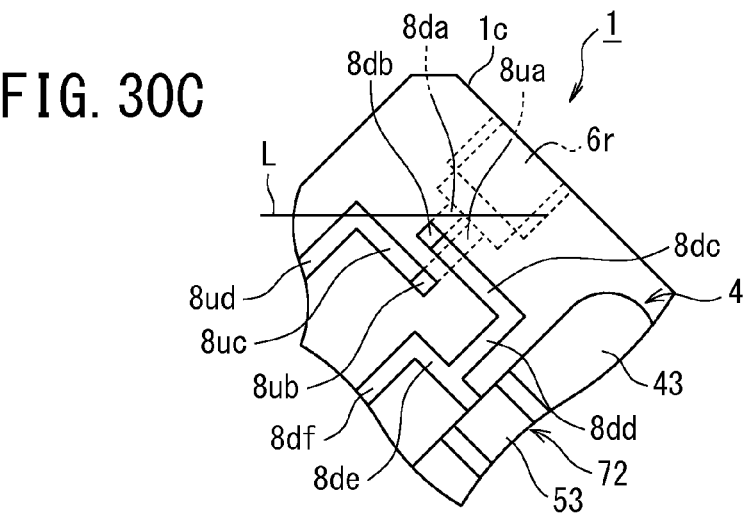

FIG. 30A is a front view illustrative of the whole end cap 1 in the sixth embodiment. FIG. 30B is a view of enlarging the periphery of a part surrounded with a circle in FIG. 30A, and is an enlarged view of the periphery of the right side face oil supply opening 6r. In addition, FIG. 30C is a view illustrative of a height of the lubricant surface L in a case where the end cap 1 in the sixth embodiment is used in the positional situation that is slanted. It is to be noted that in the present embodiment, the case where the slanted angle of the virtual axis in the positional situation that is slanted is 45 degrees will be described.

As described above, in the fifth embodiment, the first oil passage obstruction wall member W1 is arranged on the upper side than the second oil passage obstruction wall member W2 in the drawing (see FIG. 25). In contrast, in the present embodiment, the first oil passage obstruction wall member W1 is arranged on the lower side than the second oil passage obstruction wall member W2 in the drawing, as illustrated in FIG. 30A and FIG. 30B.

In other words, in the present embodiment, the first oil passage obstruction wall member W1 is arranged on the direction change passage 4 side, as compared to the second oil passage obstruction wall member W2.

(Operations, Functions, and the Like)

When the end cap 1 in the present embodiment is used in the positional situation that is horizontal or wall hanging, the oil is supplied in a similar manner to that in the fifth embodiment, the description thereof will be omitted.

Even when the end cap 1 in the present embodiment is used in the positional situation that is slanted, the lubricant can be supplied to both of the direction change passages 4.

Hereinafter, when the end cap 1 is used in the positional situation that is slanted, the oil supply will be described with reference to FIG. 30C.

When the oil is supplied to the end cap 1 used in the positional situation that is slanted, Firstly, additional processing (for example, removal processing by piercing) is carried out on both of the first oil passage obstruction wall member W1 and the second oil passage obstruction wall member W2 arranged at the right side face oil supply opening 6r. Hence, both of the first oil passage obstruction wall member W1 and the second oil passage obstruction wall member W2 are removed to communicate the right side face oil supply opening 6r with the upper oil passage formation portion 8u (the flow pathway 8ua) and to communicate the right side face oil supply opening 6r with the lower oil passage formation portion 8d (the flow pathway 8da).

(Advantageous Effects in the Sixth Embodiment)

Advantageous effects in the present embodiment will be described as follows.

(1) In the present embodiment, the first oil passage obstruction wall member W1 is located on the lower side than the second oil passage obstruction wall member W2 in the drawing.

For this reason, when the oil is supplied to the end cap 1 used in the positional situation that is slanted, as illustrated in FIG. 30C, the highest location of the lubricant surface L in the oil passage 8 can be made almost the same by use of an opening formed by removing the first oil passage obstruction wall member W1 and an opening formed by removing the second oil passage obstruction wall member W2. Accordingly, the lubricant that has been supplied from the right side face oil supply opening 6r can be supplied to both of the upper oil passage formation portion 8u and the lower oil passage formation portion 8d.

Thus, in the end cap 1 in the present embodiment, even when the end cap 1 is used in the positional situation that is slanted, the lubricant can be supplied to all of the direction change passages 4 included in the end cap 1.

(Modifications)

Figure 31:
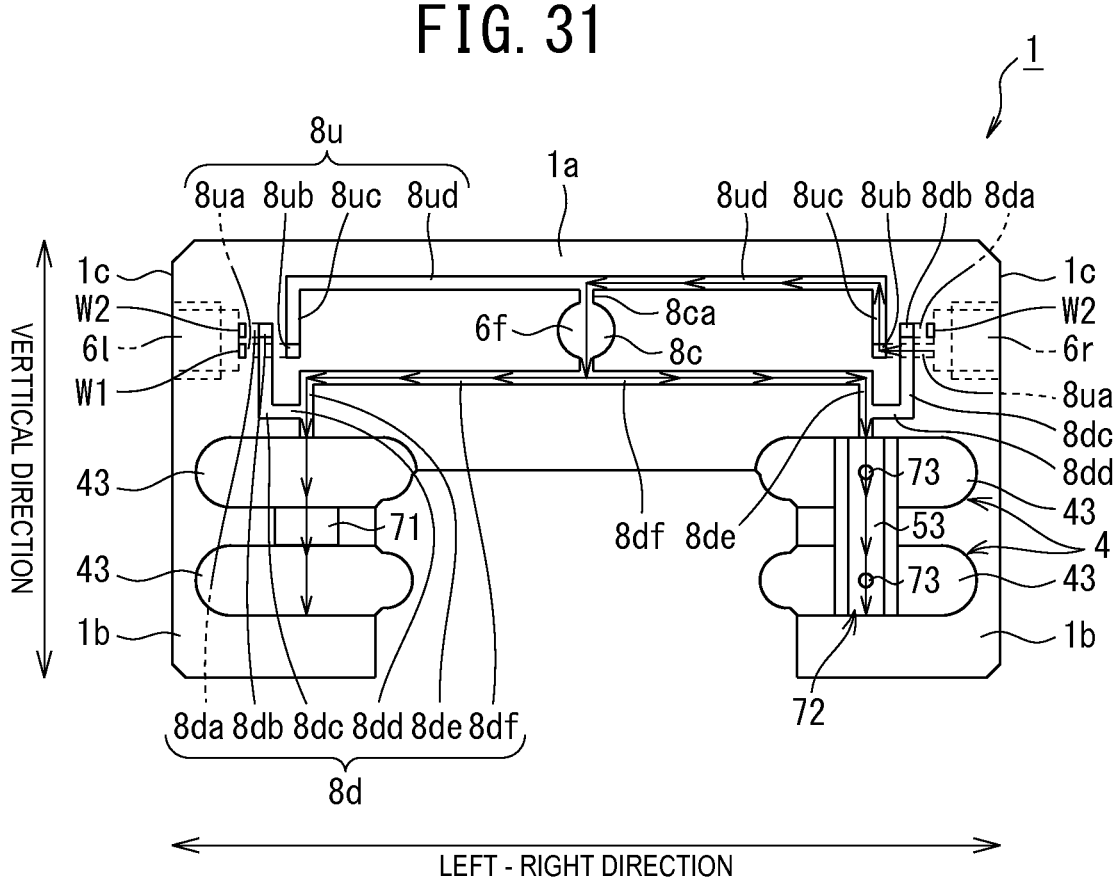
FIG. 31 is a view illustrative of a configuration of the end cap in the sixth embodiment of the present disclosure.

(1) In the present embodiment, the description has been given of the case where both of the first oil passage obstruction wall member W1 and the second oil passage obstruction wall member W2 arranged at the right side face oil supply opening 6r are removed and the linear guide device 2 is used in the positional situation that is slanted. However, the present embodiment is not limited to this. In other words, as illustrated in FIG. 31, the linear guide device 2 may be used in the positional situation that is horizontal. It is to be noted that FIG. 31 is a view illustrative of a configuration in a modification in the present embodiment, and FIG. 31 is a view illustrative of a joint face of the end cap 1, with the slider body. Also, in FIG. 31, a moving pathway of the lubricant is indicated by arrows.

In this case, out of the first oil passage obstruction wall member W1 and the second oil passage obstruction wall member W2 arranged at the right side face oil supply opening 6r, only the first oil passage obstruction wall member W1 is removed to communicate the right side face oil supply opening 6r with the upper oil passage formation portion 8u (the flow pathway 8ud).

In such a configuration, the lubricant that has been supplied from the right side face oil supply opening 6r is supplied through the flow pathway 8ud to the central oil passage formation portion 8c. Then, the lubricant that has been supplied to the central oil passage formation portion 8c is partially supplied to the return guide side oil passage 53 on the right side in the drawing, and is supplied from the lubricant supply opening 73 arranged at the return guide side oil passage 53 into the direction change passage 4 on the right side in the drawing.

Also, the lubricant that has been supplied to the central oil passage formation portion 8c is partially supplied to the return guide side oil passage 53 on the left side in the drawing, and is supplied from the lubricant supply opening 73 arranged at the return guide side oil passage 53 into the direction change passage 4 on the left side in the drawing.

Figure 32:
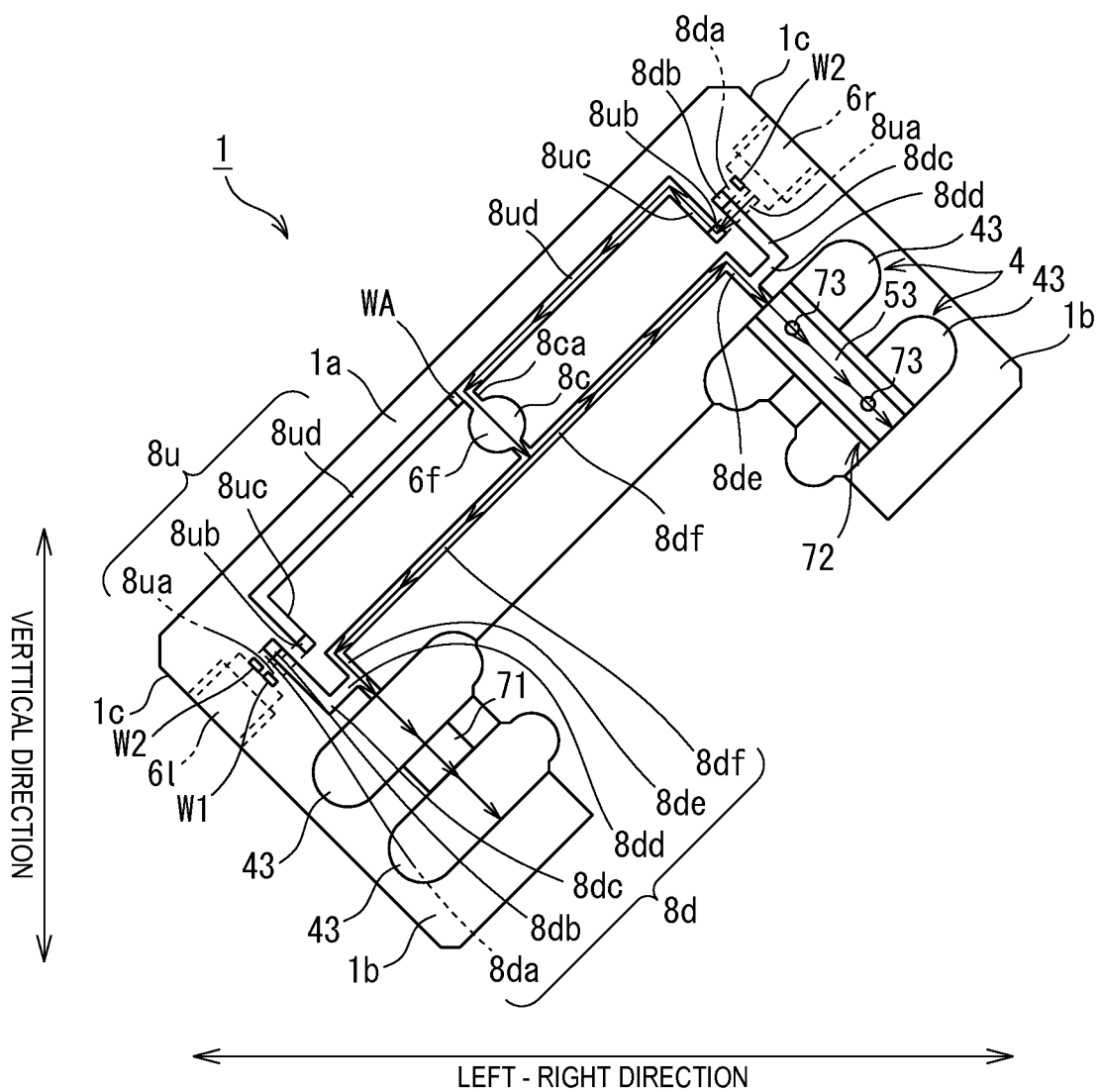
FIG. 32 is a view illustrative of a configuration of the end cap in the sixth embodiment of the present disclosure.

In addition, when, out of the first oil passage obstruction wall member W1 and the second oil passage obstruction wall member W2 arranged at the right side face oil supply opening 6r, only the first oil passage obstruction wall member W1 is removed and the linear guide device 2 is used in the positional situation that is slanted, the lubricant is supplied as illustrated in FIG. 32. It is to be noted that FIG. 32 is a view illustrative of a configuration in a modification in the present embodiment, and FIG. 32 is a view illustrative of a joint face of the end cap 1, with the slider body. Further, in FIG. 32, a moving pathway of the lubricant is indicated by arrows.

In this case, the additional oil passage obstruction wall member WA is provided at a location in the upper oil passage formation portion 8u on the lower side than the branch point 8ca in the vertical direction, with the linear guide device 2 being used in the positional situation that is slanted.

In such a configuration, since the additional oil passage obstruction wall member WA obstructs the location in the upper oil passage formation portion 8u on the lower side than the branch point 8ca in the vertical direction, with the linear guide device 2 being used in the positional situation that is slanted, the lubricant that has been supplied from the right side face oil supply opening 6r is supplied through the flow pathway 8ud to the central oil passage formation portion 8c. Then, the lubricant that has been supplied to the central oil passage formation portion 8c is partially supplied to the return guide side oil passage 53 on the right side in the drawing, and is supplied from the lubricant supply opening 73 arranged at the return guide side oil passage 53 into the direction change passage 4 on the right side in the drawing.

In addition, the lubricant that has been supplied to the central oil passage formation portion 8c is partially supplied to the return guide side oil passage 53 on the left side in the drawing, and is supplied from the lubricant supply opening 73 arranged at the return guide side oil passage 53 into the direction change passage 4 on the left side in the drawing.

Figure 33:
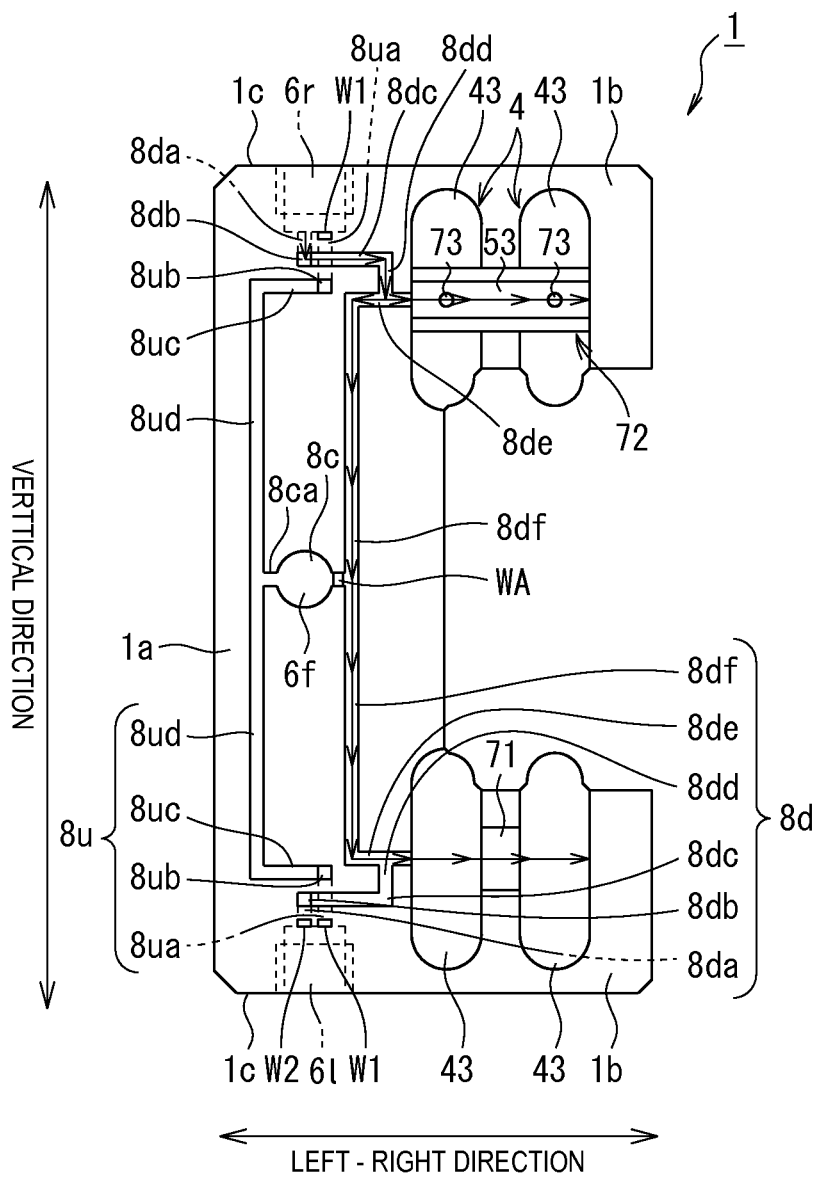
FIG. 33 is a view illustrative of a configuration of the end cap in the sixth embodiment of the present disclosure.

(2) In the present embodiment, the description has been given of the case where both of the first oil passage obstruction wall member W1 and the second oil passage obstruction wall member W2 arranged at the right side face oil supply opening 6r are removed and the linear guide device 2 is used in the positional situation that is slanted. However, the present embodiment is not limited to this. In other words, as illustrated in FIG. 33, the linear guide device 2 may be used in the positional situation that is wall hanging. It is to be noted that FIG. 33 is a view illustrative of a configuration in a modification in the present embodiment, and FIG. 33 is a view illustrative of a joint face of the end cap 1, with the slider body. Also, in FIG. 33, a moving pathway of the lubricant is indicated by arrows.

In this case, out of the first oil passage obstruction wall member W1 and the second oil passage obstruction wall member W2 arranged at the right side face oil supply opening 6r, only the second oil passage obstruction wall member W2 is removed to communicate the right side face oil supply opening 6r with the lower oil passage formation portion 8d (the flow pathway 8df). In addition to this, the additional oil passage obstruction wall member WA is provided at a location in the central oil passage formation portion 8c between the front face oil supply opening 6f and the flow pathway 8df.

In such a configuration, the lubricant that has been supplied from the right side face oil supply opening 6r is supplied through the flow pathways 8da, 8db, and 8dc to the flow pathway 8dd. Subsequently, the lubricant that has been supplied to the lower oil passage formation portion 8dd is partially supplied to the return guide side oil passage 53 on the upper side in the drawing. Then, the lubricant that has been supplied to the return guide side oil passage 53 is supplied from the lubricant supply opening 73 arranged at the return guide side oil passage 53 into the direction change passage 4 on the upper side in the drawing.

Also, the lubricant that has been supplied to the lower oil passage formation portion 8dd is partially supplied through the flow pathway 8de to the flow pathway 8df. Further, the lubricant that has been supplied to the flow pathway 8df is influenced by the gravity, and is supplied to the flow pathway 8de configured to communicate with the return guide side oil passage 53 on the lower side in the drawing.

Then, the lubricant that has been supplied to the flow pathway 8de configured to communicate with the return guide side oil passage 53 on the lower side in the drawing is supplied to the return guide side oil passage 53, and the lubricant that has been supplied to the return guide side oil passage 53 is supplied into the direction change passage 4 on the lower side in the drawing from the lubricant supply opening 73 arranged at the return guide side oil passage 53.

Figure 34:
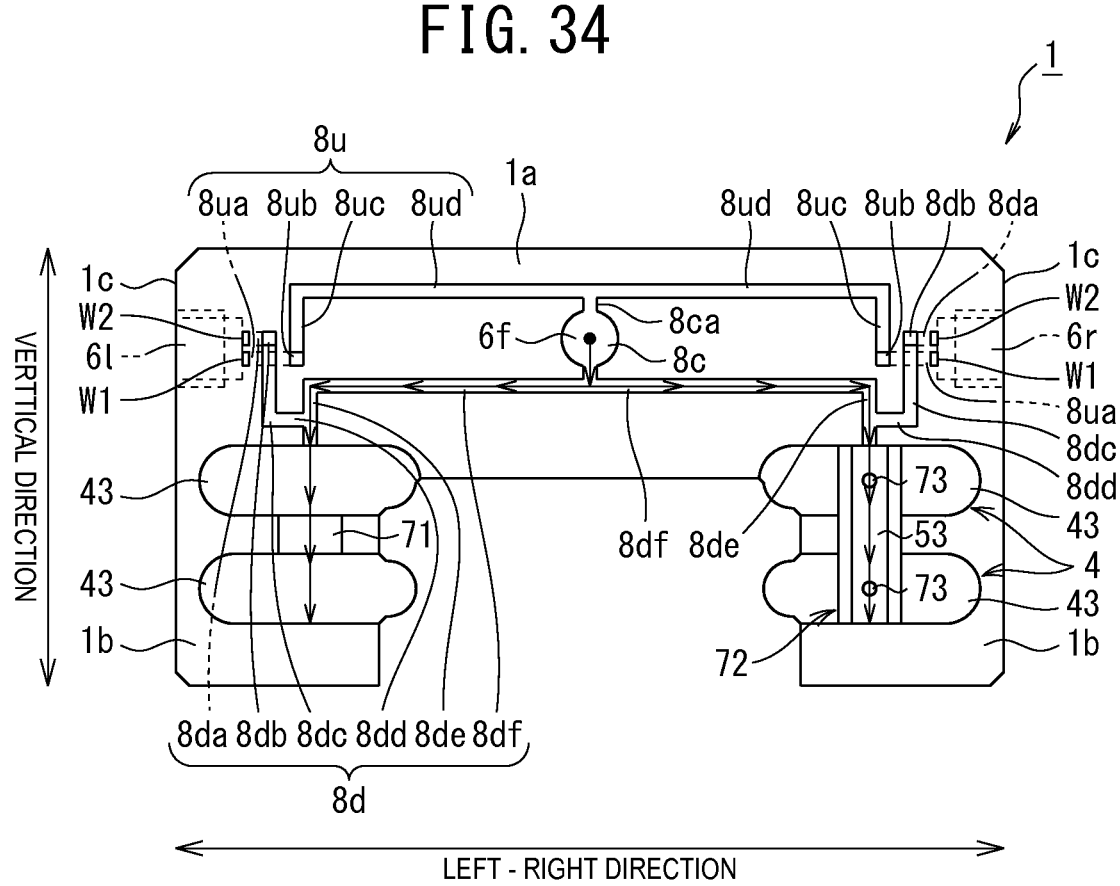
FIG. 34 is a view illustrative of a configuration of the end cap in the sixth embodiment of the present disclosure.

(3) In the present embodiment, the description has been given of the case where both of the first oil passage obstruction wall member W1 and the second oil passage obstruction wall member W2 arranged at the right side face oil supply opening 6r are removed, so that the lubricant is supplied from the right side face oil supply opening 6r into the oil passage 8. However, the present embodiment is not limited to this. In other words, as illustrated in FIG. 34, the lubricant may be supplied from the right side face oil supply opening 6r into the oil passage 8 without removing the first oil passage obstruction wall member W1 and the second oil passage obstruction wall member W2 arranged at the right side face oil supply opening 6r. It is to be noted that FIG. 34 is a view illustrative of a configuration in the modification in the present embodiment, and is a view illustrative of a joint face of the end cap 1, with the slider body. Also, in FIG. 34, a moving pathway of the lubricant is indicated by arrows.

In such a configuration, the lubricant that has been supplied from the right side face oil supply opening 6r is supplied to the central oil passage formation portion 8c, is partially supplied to the return guide side oil passage 53 on the right side in the drawing, and is supplied from the parallel return guide 72 arranged at the return guide side oil passage 53 into the direction change passage 4 on the right side in the drawing.

In addition, the lubricant that has been supplied to the central oil passage formation portion 8c is partially supplied to the return guide side oil passage 53 on the left side in the drawing, and is supplied from the lubricant supply opening 73 arranged at the return guide side oil passage 53 into the direction change passage 4 on the left side in the drawing.

Figure 35:
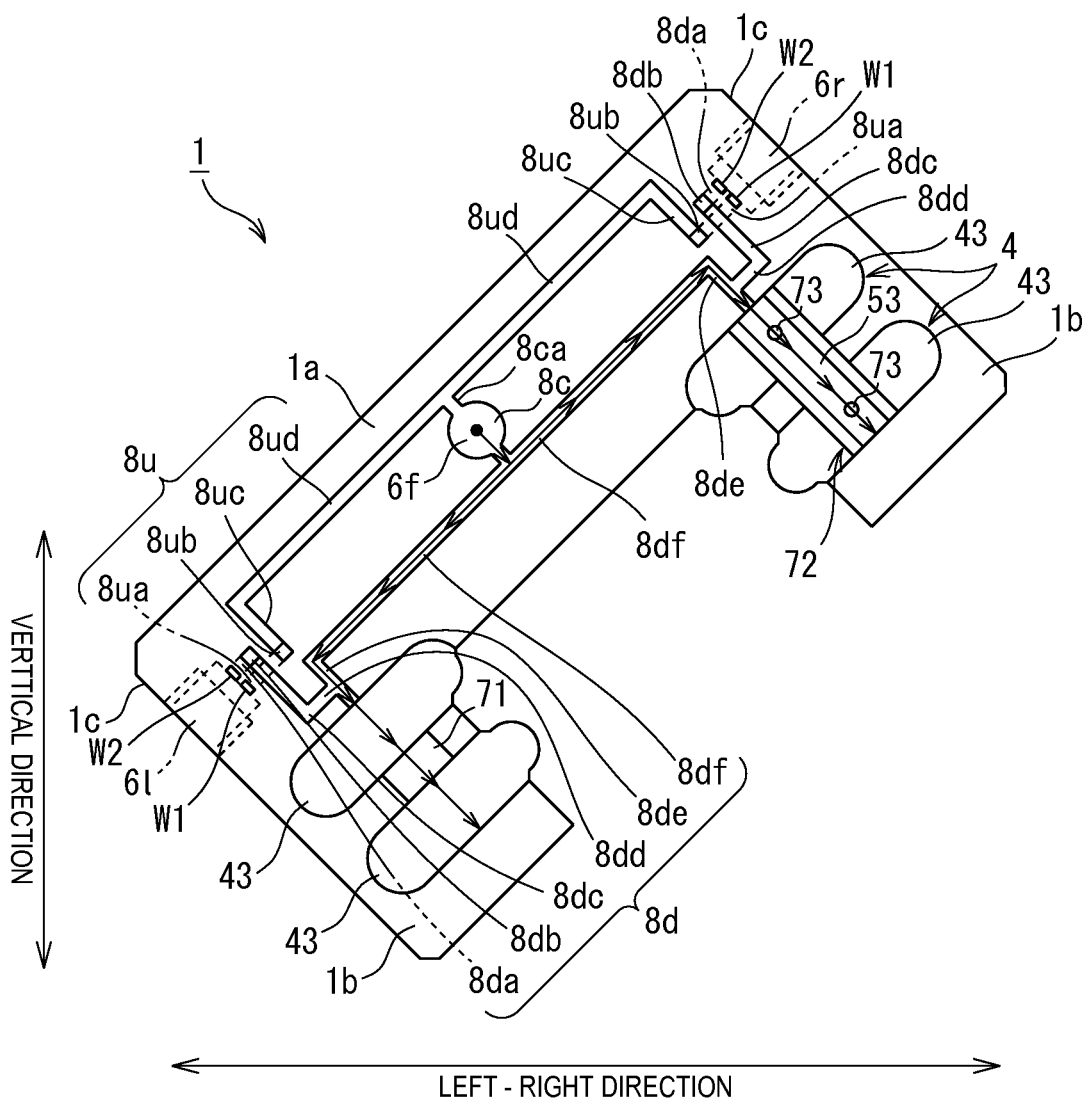
FIG. 35 is a view illustrative of a configuration of the end cap in the sixth embodiment of the present disclosure.

Further, when the lubricant is supplied from the right side face oil supply opening 6r into the oil passage 8 without removing the first oil passage obstruction wall member W1 or the second oil passage obstruction wall member W2 arranged at the right side face oil supply opening 6r, and the linear guide device 2 is used in the positional situation that is slanted, the lubricant is supplied as illustrated in FIG. 35. It is to be noted that FIG. 35 is a view illustrative of a configuration in a modification in the present embodiment, and is a view illustrative of a joint face of the end cap 1, with the slider body. Also, in FIG. 35, a moving pathway of the lubricant is indicated by arrows.

In such a configuration, the lubricant that has been supplied from the right side face oil supply opening 6r is supplied to the central oil passage formation portion 8c, is partially supplied to the return guide side oil passage 53 on the right side in the drawing, and is supplied from the lubricant supply opening 73 arranged at the return guide side oil passage 53 into the direction change passage 4 on the right side in the drawing.

Moreover, the lubricant that has been supplied to the central oil passage formation portion 8c is partially supplied to the return guide side oil passage 53 on the left side in the drawing, and is supplied from the lubricant supply opening 73 arranged at the return guide side oil passage 53 into the direction change passage 4 on the left side in the drawing.

Figure 36:
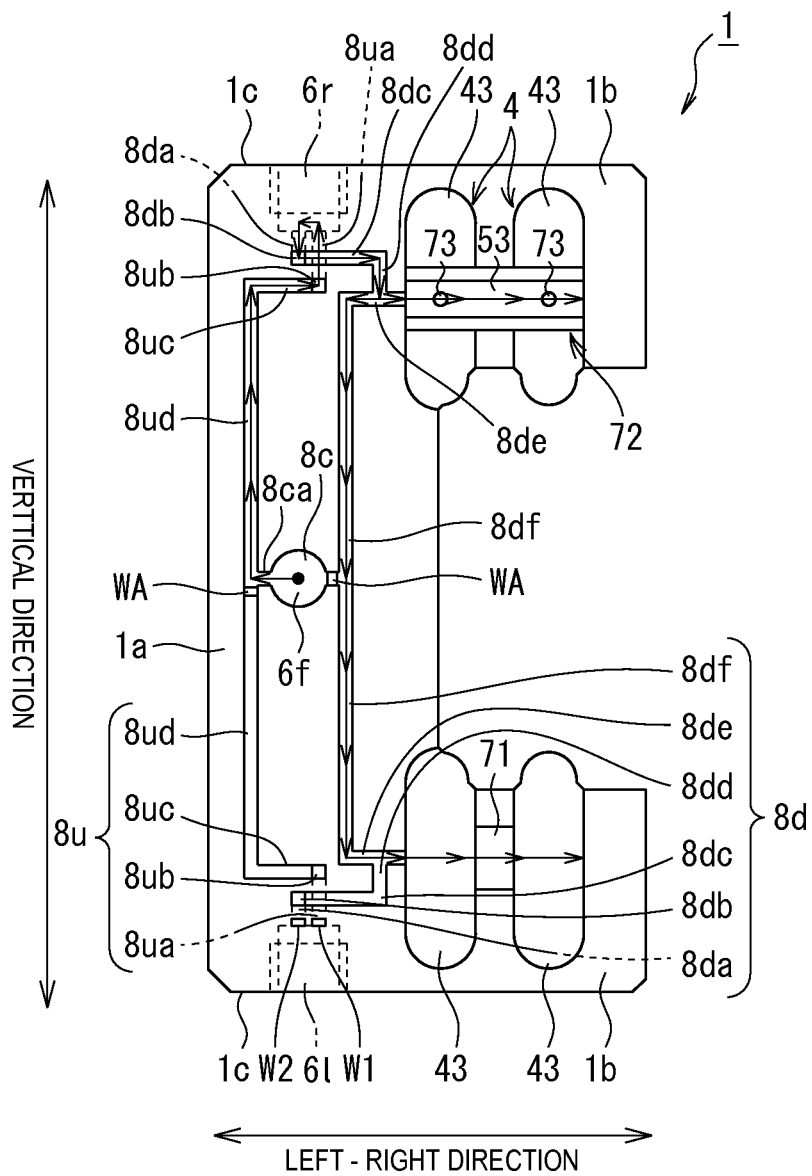
FIG. 36 is a view illustrative of a configuration of the end cap in the sixth embodiment of the present disclosure.

(4) In the present embodiment, the description has been given of the case where the linear guide device 2 is used in the positional situation that is slanted, both of the first oil passage obstruction wall member W1 and the second oil passage obstruction wall member W2 arranged at the right side face oil supply opening 6r are removed, so that the lubricant is supplied from the right side face oil supply opening 6r into the oil passage 8. However, the present embodiment is not limited to this. In other words, as illustrated in FIG. 36, in the linear guide device 2 used in the positional situation that is wall hanging, both of the first oil passage obstruction wall member W1 and the second oil passage obstruction wall member W2 arranged at the right side face oil supply opening 6r may be removed, so that the lubricant is supplied from the right side face oil supply opening 6r into the oil passage 8. It is to be noted that FIG. 36 is a view illustrative of a configuration in a modification of the present embodiment, and is a view illustrative of a joint face of the end cap 1, with the slider body. Also, in FIG. 36, a moving pathway of the lubricant is indicated by arrows.

In this case, for example, in the linear guide device 2 used in the positional situation that is wall hanging, the additional oil passage obstruction wall member WA is provided at a location in the upper oil passage formation portion 8u on the lower side than the central oil passage formation portion 8c in the vertical direction. In addition to this, the additional oil passage obstruction wall member WA is provided at a location in the central oil passage formation portion 8c between the front face oil supply opening 6f and the lower oil passage formation portion 8d (the flow pathway 8df).

In such a configuration, the lubricant that has been supplied from the right side face oil supply opening 6r is supplied from the central oil passage formation portion 8c into the upper oil passage formation portion 8u, moves upward in the upper oil passage formation portion 8u, sequentially moves through the flow pathway 8ud, the flow pathway 8uc, the flow pathway 8ub, and the flow pathway 8ua, and moves into the right side face oil supply opening 6r from a gap portion formed by removing the first oil passage obstruction wall member W1. Then, the lubricant that has been moved into the right side face oil supply opening 6r moves into the lower oil passage formation portion 8d from a gap portion formed by removing the second oil passage obstruction wall member W2, and is supplied through the flow pathways 8da, 8db, and 8dc to the flow pathway 8dd. Subsequently, the lubricant that has been supplied to the flow pathway 8dd is partially supplied to the return guide side oil passage 53 on the upper side in the drawing. Then, the lubricant that has been supplied to the return guide side oil passage 53 is supplied into the direction change passage 4 on the upper side in the drawing from the lubricant supply opening 73 arranged at the return guide side oil passage 53.

In addition, the lubricant that has been supplied to the flow pathway 8dd is partially supplied through the flow pathway 8de to the flow pathway 8df. Further, the lubricant that has been supplied to the flow pathway 8df is influenced by the gravity, and is supplied to the flow pathway 8de configured to communicate with the return guide side oil passage 53 on the lower side in the drawing.

Then, the lubricant that has been supplied to the flow pathway 8de configured to communicate with the return guide side oil passage 53 on the lower side in the drawing is supplied to the return guide side oil passage 53. The lubricant that has been supplied to the return guide side oil passage 53 is supplied into the direction change passage 4 on the lower side in the drawing from the lubricant supply opening 73 arranged at the return guide side oil passage 53.

Figure 37:
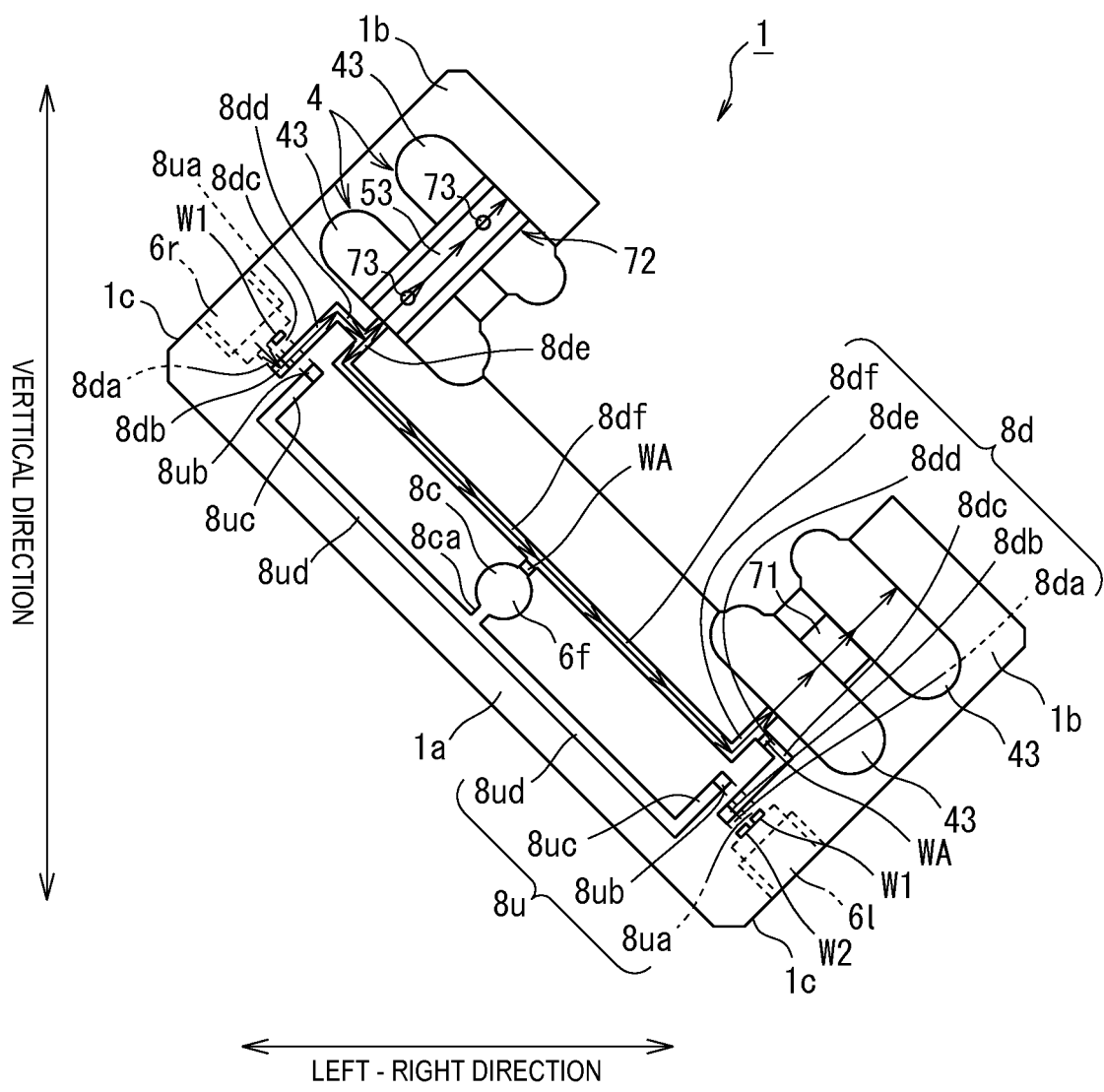
FIG. 37 is a view illustrative of a configuration of the end cap in the sixth embodiment of the present disclosure.

(5) In the present embodiment, the description has been given of the case where the slanted angle of the virtual axis in the positional situation that is slanted is 45 degrees, and both of the first oil passage obstruction wall member W1 and the second oil passage obstruction wall member W2 arranged in the right side face oil supply opening 6r is removed, so that the lubricant is supplied from the right side face oil supply opening 6r into the oil passage 8. However, the present embodiment is not limited to this. In other words, as illustrated in FIG. 37, the slanted angle of the virtual axis in the positional situation that is slanted may be 135 degrees, and only the second oil passage obstruction wall member W2, out of the first oil passage obstruction wall member W1 and the second oil passage obstruction wall member W2 arranged at the right side face oil supply opening 6r, may be removed. It is to be noted that FIG. 37 is a view illustrative of a configuration in a modification in the present embodiment, and is a view illustrative of a joint face of the end cap 1, with the slider body. Also, in FIG. 37, a moving pathway of the lubricant is indicated by arrows.

In this case, for example, the additional oil passage obstruction wall member WA is arranged at a location in the central oil passage formation portion 8c between the front face oil supply opening 6f and the lower oil passage formation portion 8d (the flow pathway 8df).

In such a configuration, the lubricant that has been supplied from the right side face oil supply opening 6r moves from the gap portion formed by removing the second oil passage obstruction wall member W2 into the lower oil passage formation portion 8d, and is supplied through the flow pathway 8da, 8db, and 8dc to the flow pathway 8dd. Subsequently, the lubricant that has been supplied to the flow pathway 8dd is partially supplied to the return guide side oil passage 53 on the upper side in the drawing. Then, the lubricant that has been supplied to the return guide side oil passage 53 is supplied into the direction change passage 4 on the upper side in the drawing from the lubricant supply opening 73 arranged at the return guide side oil passage 53.

In addition, the lubricant that has been supplied to the flow pathway 8dd is partially supplied through the flow pathway 8de to the flow pathway 8df. Further, the lubricant that has been supplied to the flow pathway 8df is influenced by the gravity, and is supplied to the flow pathway 8de configured to communicate with the return guide side oil passage 53 on the lower side in the drawing.

Then, the lubricant that has been supplied to the flow pathway 8de configured to communicate with the return guide side oil passage 53 on the lower side in the drawing is supplied to the return guide side oil passage 53. The lubricant that has been supplied to the return guide side oil passage 53 is supplied into the direction change passage 4 on the lower side in the drawing from the lubricant supply opening 73 arranged at the return guide side oil passage 53.

Figure 38:
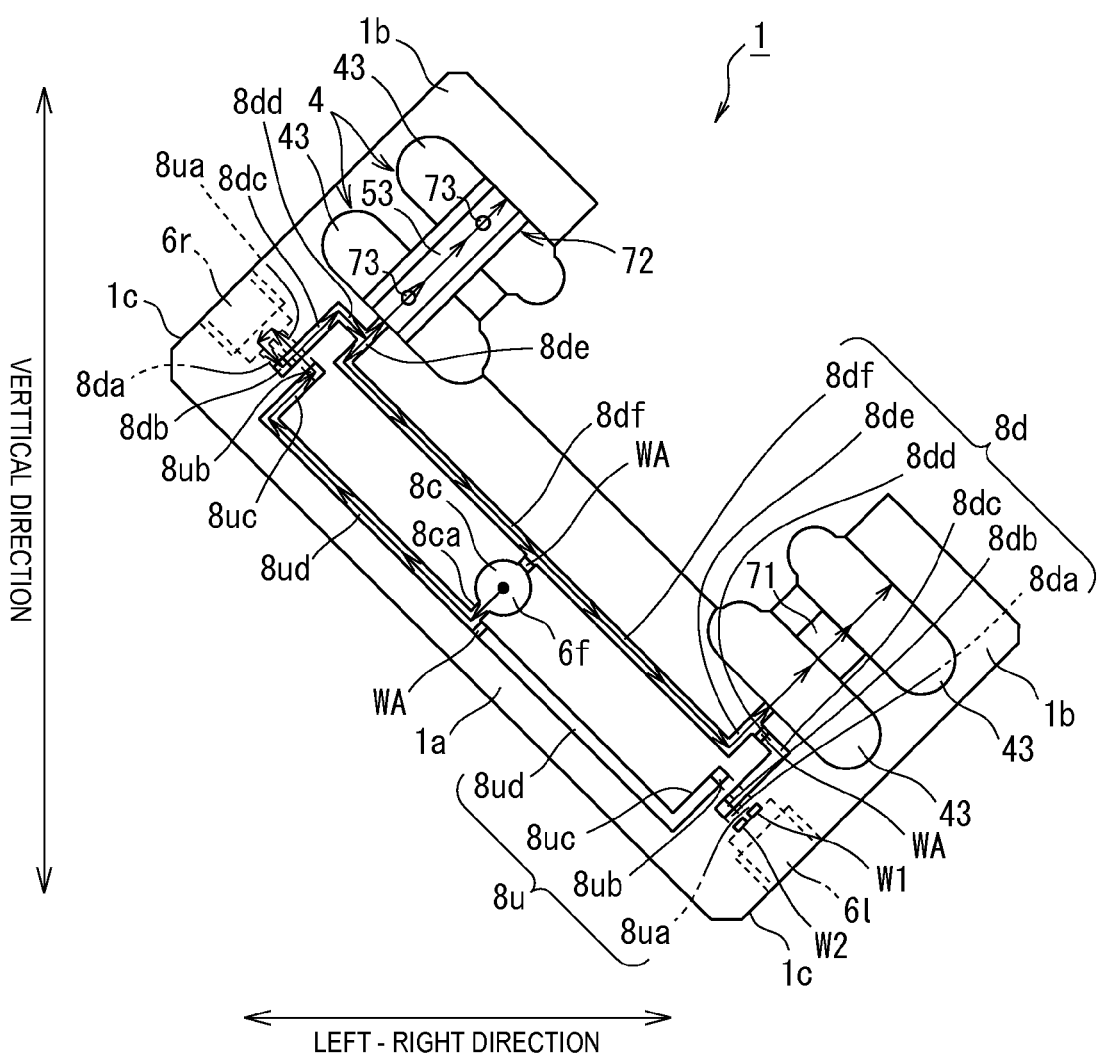
FIG. 38 is a view illustrative of a configuration of the end cap in the sixth embodiment of the present disclosure.

(6) In the present embodiment, the description has been given of the case where the slanted angle of the virtual axis in the positional situation that is slanted is 45 degrees, and both of the first oil passage obstruction wall member W1 and the second oil passage obstruction wall member W2 arranged at the right side face oil supply opening 6r are removed, so that the lubricant is supplied into the oil passage 8 from the right side face oil supply opening 6r. However, the present embodiment is not limited to this. In other words, as illustrated in FIG. 38, the slanted angle of the virtual axis in the positional situation that is slanted may be 135 degrees, and both of the first oil passage obstruction wall member W1 and the second oil passage obstruction wall member W2 arranged at the right side face oil supply opening 6r may be removed, so that the lubricant may be supplied from the front face oil supply opening 6f into the oil passage 8. It is to be noted that FIG. 38 is a view illustrative of a configuration in a modification in the present embodiment, and is a view illustrative of a joint face of the end cap 1, with the slider body. Also, in FIG. 38, a moving pathway of the lubricant is indicated by arrows.

In this case, for example, in the linear guide device 2 with the slanted angle of the virtual axis in the positional situation that is slanted being 135 degrees, the additional oil passage obstruction wall member WA is arranged at a location in the upper oil passage formation portion 8u on the lower side than the central oil passage formation portion 8c in the vertical direction. In addition to this, the additional oil passage obstruction wall member WA is provided at a location in the central oil passage formation portion 8c between the front face oil supply opening 6f and the lower oil passage formation portion 8d (the flow pathway 8df).

In such a configuration, the lubricant that has been supplied from the front face oil supply opening 6f is supplied into the upper oil passage formation portion 8u from the central oil passage formation portion 8c, moves upward in the upper oil passage formation portion 8u, sequentially moves through the flow pathway 8ud, the flow pathway 8uc, the flow pathway 8ub, and the flow pathway 8ua, and moves into the right side face oil supply opening 6r from the gap portion formed by removing the first oil passage obstruction wall member W1. Then, the lubricant that has been moved into the right side face oil supply opening 6r moves into the lower oil passage formation portion 8d from the gap portion formed by removing the second oil passage obstruction wall member W2, and is supplied through the flow pathways 8da, 8db, and 8dc to the flow pathway 8dd. Subsequently, the lubricant that has been supplied to the flow pathway 8dd is partially supplied to the return guide side oil passage 53 on the upper side in the drawing. Then, the lubricant that has been supplied to the return guide side oil passage 53 is supplied into the direction change passage 4 on the upper side in the drawing from the lubricant supply opening 73 arranged at the return guide side oil passage 53.

In addition, the lubricant that has been supplied to the flow pathway 8dd is partially supplied through the flow pathway 8de to the flow pathway 8df. Further, the lubricant that has been supplied to the flow pathway 8df is influenced by the gravity, and is supplied to the flow pathway 8de configured to communicate with the return guide side oil passage 53 on the lower side in the drawing.

Then, the lubricant that has been supplied to the flow pathway 8de configured to communicate with the return guide side oil passage 53 on the lower side in the drawing is supplied to the return guide side oil passage 53. The lubricant that has been supplied to the return guide side oil passage 53 is supplied into the direction change passage 4 on the lower side in the drawing from the lubricant supply opening 73 arranged at the return guide side oil passage 53.

Figure 39:
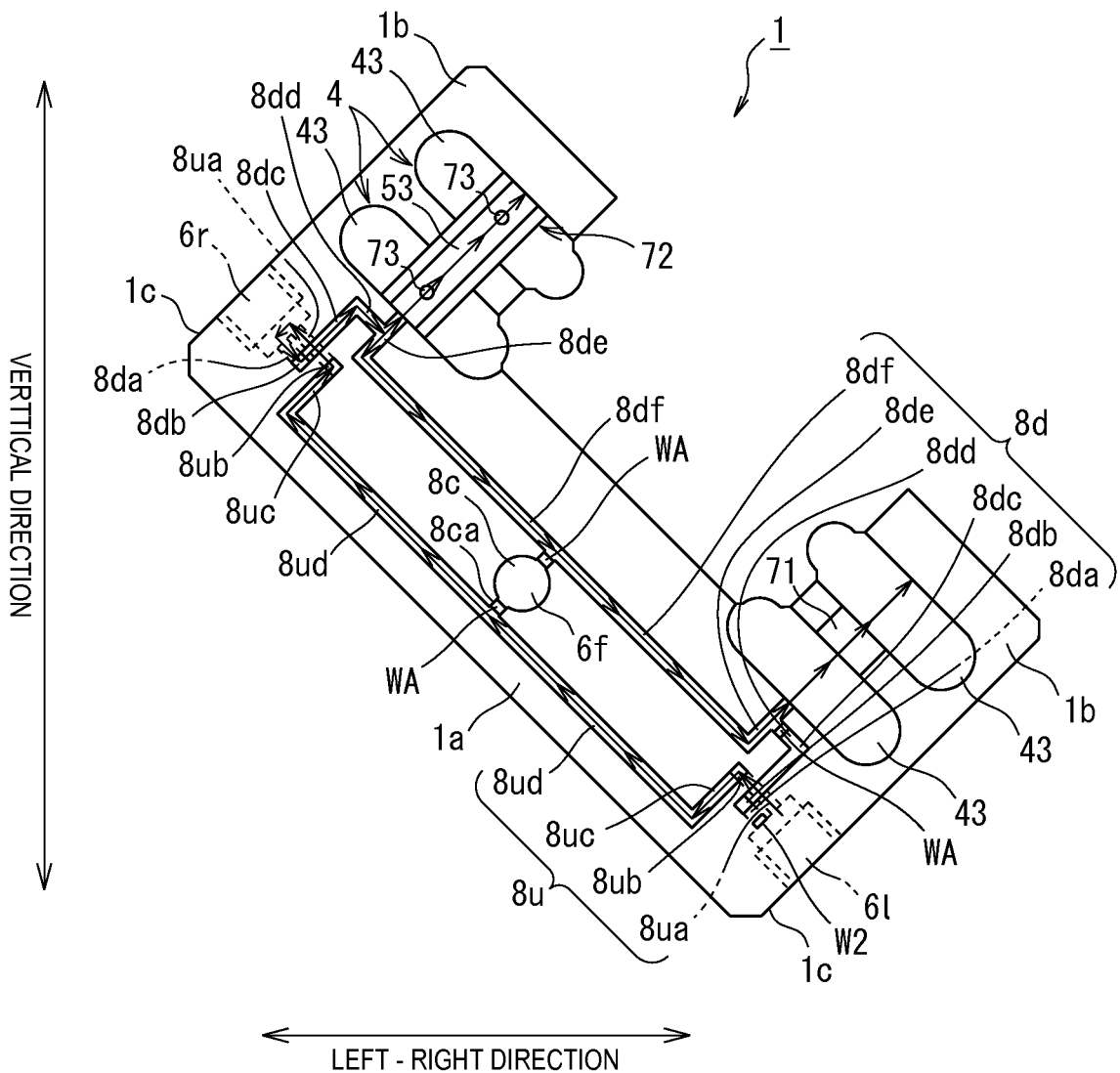
FIG. 39 is a view illustrative of a configuration of the end cap in the sixth embodiment of the present disclosure.

(7) In the present embodiment, the description has been given of the case where the slanted angle of the virtual axis in the positional situation that is slanted is 45 degrees, and both of the first oil passage obstruction wall member W1 and the second oil passage obstruction wall member W2 arranged at the right side face oil supply opening 6r are removed, so that the lubricant is supplied into the oil passage 8 from the right side face oil supply opening 6r. However, the present embodiment is not limited to this. In other words, as illustrated in FIG. 39, the slanted angle of the virtual axis in the positional situation that is slanted is may be 135 degrees, and both of the first oil passage obstruction wall member W1 and the second oil passage obstruction wall member W2 arranged at the right side face oil supply opening 6r may be removed, so that the lubricant may be supplied into the oil passage 8 from the right side face oil supply opening 6r. It is to be noted that FIG. 39 is a view illustrative of a configuration in a modification in the present embodiment, and is a view illustrative of a joint face of the end cap 1, with the slider body. Also, in FIG. 39, a moving pathway of the lubricant is indicated by arrows.

In this case, for example, the additional oil passage obstruction wall member WA is arranged at a location in the central oil passage formation portion 8c between the front face oil supply opening 6f and the lower oil passage formation portion 8d (the flow pathway 8df), and another location in the central oil passage formation portion 8c between the front face oil supply opening 6f and the upper oil passage formation portion 8u (the flow pathway 8ud). Further, the additional oil passage obstruction wall member WA is arranged at the flow pathway 8dd on the lower side in the drawing. In addition, out of the first oil passage obstruction wall member W1 and the second oil passage obstruction wall member W2 arranged at the right side face oil supply opening 6r, only the first oil passage obstruction wall member W1 is removed.

In such a configuration, the lubricant that has been supplied from the left side face oil supply opening 61 sequentially moves through the flow pathway 8ua, the flow pathway 8ub, the flow pathway 8uc, and the flow pathway 8ud on the lower side in the drawing into the upper oil passage formation portion 8u, and moves upward in the upper oil passage formation portion 8u. Then, the lubricant sequentially moves through the flow pathway 8ud, the flow pathway 8uc, the flow pathway 8ub, and the flow pathway 8ua on the upper side in the drawing, and moves into the right side face oil supply opening 6r from the gap portion formed by removing the first oil passage obstruction wall member W1.

The lubricant that has moved into the right side face oil supply opening 6r moves into the lower oil passage formation portion 8d from the gap portion formed by removing the second oil passage obstruction wall member W2, and is supplied through the flow pathways 8da, 8db, and 8dc to the flow pathway 8dd. Subsequently, the lubricant that has been supplied to the flow pathway 8dd is partially supplied to the return guide side oil passage 53 on the upper side in the drawing. Then, the lubricant that has been supplied to the return guide side oil passage 53 is supplied into the direction change passage 4 on the upper side in the drawing from the lubricant supply opening 73 arranged at the return guide side oil passage 53.

In addition, the lubricant that has been supplied to the flow pathway 8dd is partially supplied through the flow pathway 8de to the flow pathway 8df. Further, the lubricant that has been supplied to the flow pathway 8df is influenced by the gravity, and is supplied to the flow pathway 8de configured to communicate with the return guide side oil passage 53 on the lower side in the drawing.

Then, the lubricant that has been supplied to the flow pathway 8de configured to communicate with the return guide side oil passage 53 on the lower side in the drawing is supplied to the return guide side oil passage 53. The lubricant that has been supplied to the return guide side oil passage 53 is supplied into the direction change passage 4 on the lower side in the drawing from the lubricant supply opening 73 arranged at the return guide side oil passage 53.

Figure 40:
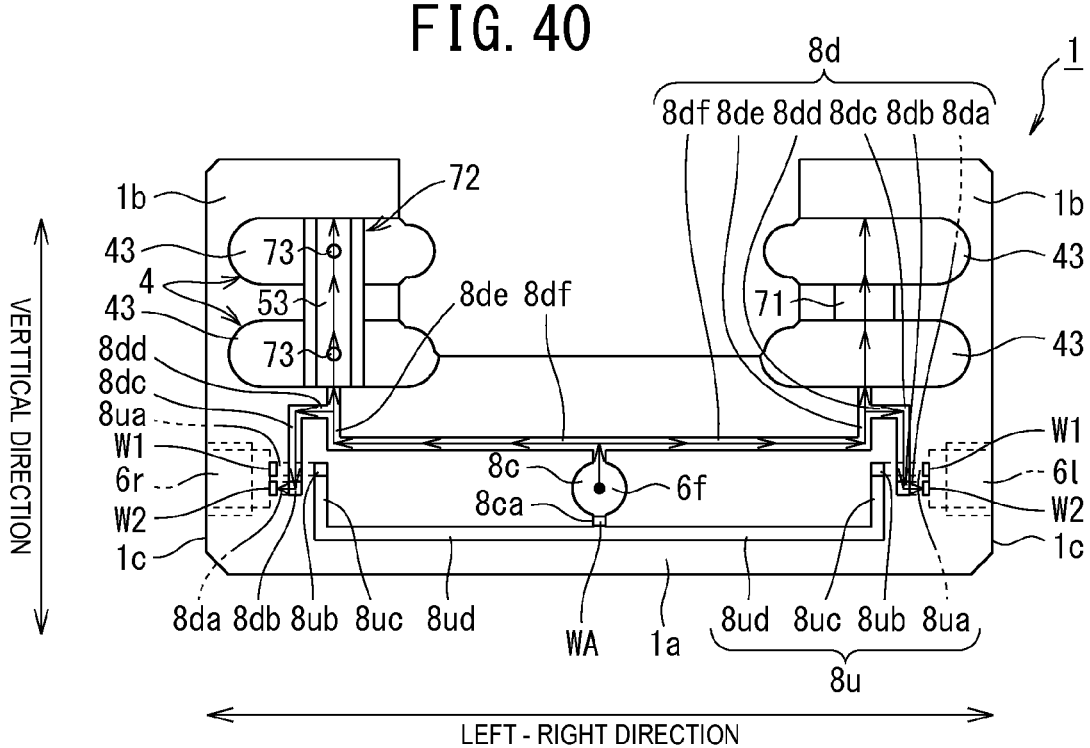
FIG. 40 is a view illustrative of a configuration of the end cap in the sixth embodiment of the present disclosure.

(9) In the present embodiment, the description has been given of the case where the slanted angle of the virtual axis in the positional situation that is slanted is 45 degrees, and the lubricant is supplied from the right side face oil supply opening 6r into the oil passage 8. However, the present embodiment is not limited to this. In other words, for example, the slanted angle of the guide rail arrangement face may be 180 degrees with respect to the plane face used as a reference, as illustrated in FIG. 40, so that the lubricant may be supplied from the front face oil supply opening 6f into the oil passage 8. This is, for example, a case where the guide rail arrangement face is a ceiling face. It is to be noted that FIG. 40 is a view illustrative of a configuration in a modification in the present embodiment, and is a view illustrative of a joint face of the end cap 1, with the slider body. Also, in FIG. 40, a moving pathway of the lubricant is indicated by arrows.

In this case, the additional oil passage obstruction wall member WA is arranged at a location in the central oil passage formation portion 8c between the front face oil supply opening 6f and the upper oil passage formation portion 8u (the flow pathway 8ud). In addition to this, neither the first oil passage obstruction wall member W1 nor the second oil passage obstruction wall member W2 is removed.

In such a configuration, the lubricant that has been supplied from the front face oil supply opening 6f moves into the lower oil passage formation portion 8d, and is supplied through the flow pathways 8df and 8de to the flow pathway 8dd. Subsequently, the lubricant that has been supplied to the flow pathway 8dd is partially supplied to the return guide side oil passages 53 on the left side and the right side in the drawing. Then, the lubricant that has been supplied to the return guide side oil passage 53 is supplied to the direction change passages 4 on the left side and the right side in the drawing from the lubricant supply opening 73 arranged at the return guide side oil passage 53.

In addition, the lubricant that has been supplied to the flow pathway 8dd partially moves through the flow pathway 8dc, 8db, and 8da, to the left side face oil supply opening 61 and the right side face oil supply opening 6r. However, its movement is prevented by the second oil passage obstruction wall members W2 arranged at the left side face oil supply opening 61 and the right side face oil supply opening 6r, respectively.

Figure 41:
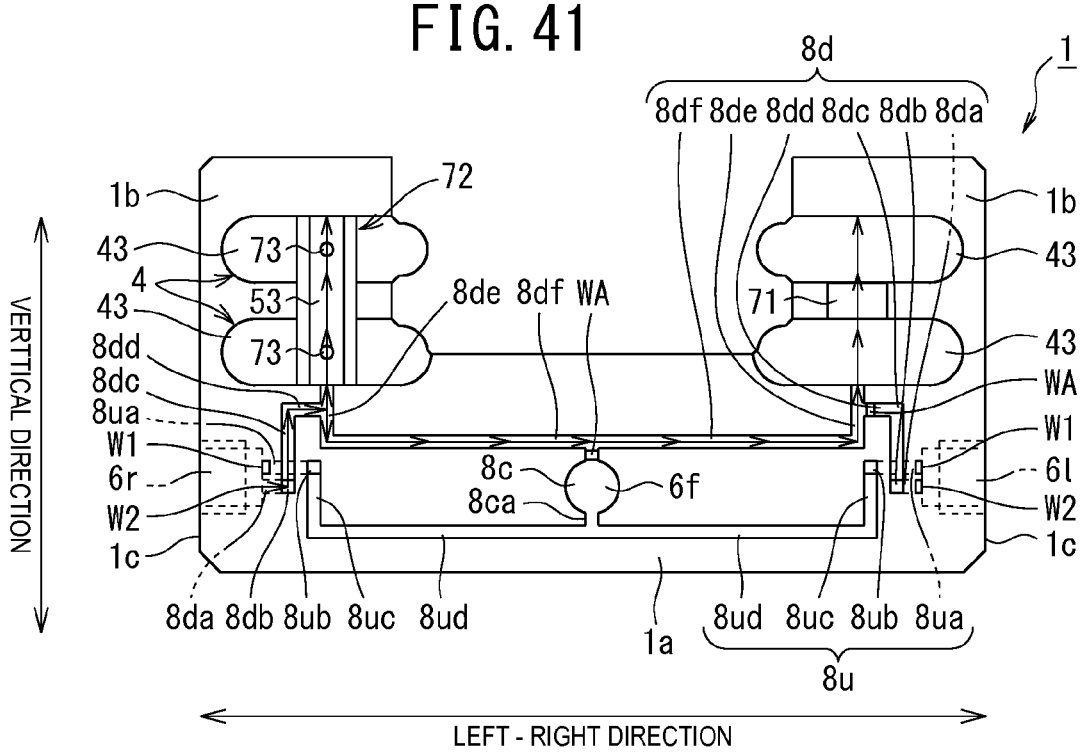
FIG. 41 is a view illustrative of a configuration of the end cap in the sixth embodiment of the present disclosure.

(10) In the present embodiment, the description has been given of the case where the slanted angle of the virtual axis in the positional situation that is slanted is 45 degrees, so that the lubricant is supplied from the right side face oil supply opening 6r into the oil passage 8. However, the present embodiment is not limited to this. In other words, for example, the slanted angle of the guide rail arrangement face may be 180 degrees with respect to the plane face used as a reference, as illustrated in FIG. 41. This is, for example, a case where the guide rail arrangement face is a ceiling face. It is to be noted that FIG. 41 is a view illustrative of a configuration in a modification in the present embodiment, and is a view illustrative of a joint face of the end cap 1, with the slider body. Also, in FIG. 41, a moving pathway of the lubricant is indicated by arrows.

In this case, for example, the additional oil passage obstruction wall member WA is arranged at a location in the central oil passage formation portion 8c between the front face oil supply opening 6f and the lower oil passage formation portion 8d (the flow pathway 8df). Further, the additional oil passage obstruction wall member WA is arranged in the flow pathway 8dd on the right side in the drawing. In addition to this, out of the first oil passage obstruction wall member W1 and the second oil passage obstruction wall member W2 arranged at the right side face oil supply opening 6r, only the second oil passage obstruction wall member W2 is removed.

In such a configuration, the lubricant that has been supplied from the right side face oil supply opening 6r is supplied through the flow pathways 8da, 8db, and 8dc to the flow pathway 8dd. Subsequently, the lubricant that has been supplied to the lower oil passage formation portion 8dd is partially supplied to the return guide side oil passage 53 on the left side in the drawing. Then, the lubricant that has been supplied to the return guide side oil passage 53 is supplied from the lubricant supply opening 73 arranged at the return guide side oil passage 53 to the direction change passage 4 on the left side in the drawing.

Also, the lubricant that has been supplied to the lower oil passage formation portion 8dd is partially supplied through the flow pathway 8de to the flow pathway 8df. Further, the lubricant that has been supplied to the flow pathway 8df is supplied to the flow pathway 8de configured to communicate with the return guide side oil passage 53 on the right side in the drawing.

Then, the lubricant that has been supplied to the flow pathway 8de configured to communicate with the return guide side oil passage 53 on the right side in the drawing is supplied to the return guide side oil passage 53, and the lubricant that has been supplied to the return guide side oil passage 53 is supplied to the direction change passage 4 on the right side in the drawing from the lubricant supply opening 73 arranged at the return guide side oil passage 53.

Seventh Embodiment

Hereinafter, a seventh embodiment in the present disclosure (hereinafter, referred to as "the present embodiment") will be described with reference to the drawings.

(Configuration)

Firstly, referring to FIG. 45, FIG. 46, FIG. 1 to FIG. 41, by using FIG. 42, a configuration of the end cap included in the linear guide device in the present embodiment will be described.

The configuration of the end cap 1 in the present embodiment is almost same as the configuration of the end cap 1 in the fifth embodiment, but is different from the end cap 1 in the fifth embodiment in that an intermediate oil passage formation portion 91 is provided.

Thus, in the following description, only the intermediate oil passage formation portion 91 will be described. The other configurations are same as those in the fifth embodiment, and the descriptions thereof will be omitted. It is to be noted that, in FIG. 42, the same components and configurations as those of the fifth embodiment described above have the same reference numerals.

Figure 42:
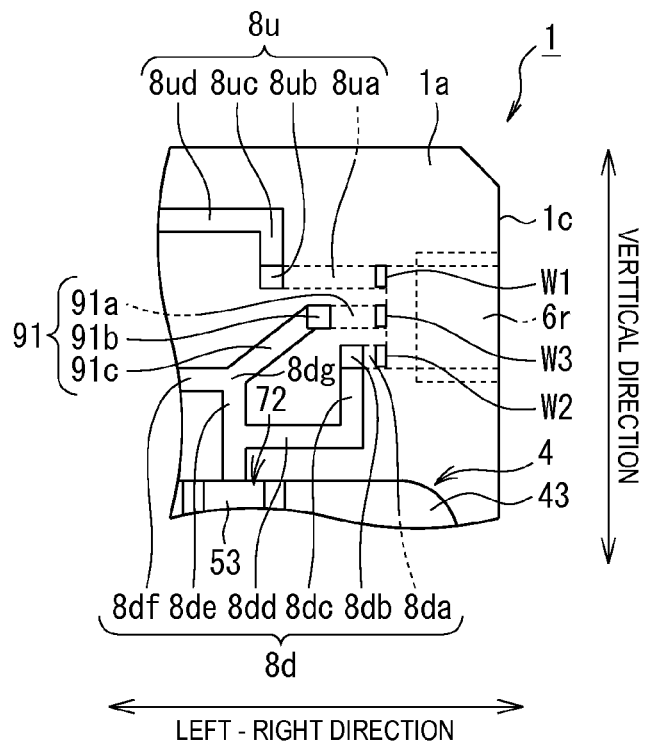
FIG. 42 is an enlarged view of the periphery of a right side face oil supply opening in the end cap 1 in a seventh embodiment of the present disclosure.

FIG. 42 is an enlarged view of the periphery of the right side face oil supply opening 6r in the end cap 1 in the seventh embodiment.

In the present embodiment, as illustrated in FIG. 42, the first oil passage obstruction wall member W1 for obstructing an end of the upper oil passage formation portion 8u (the flow pathway 8ua), the second oil passage obstruction wall member W2 for obstructing an end of the upper oil passage formation portion 8u (the flow pathway 8da), and a third oil passage obstruction wall member W3 for obstructing an end of the intermediate oil passage formation portion 91 are provided in the right side face oil supply opening 6r.

The first oil passage obstruction wall member W1, the second oil passage obstruction wall member W2, and the third oil passage obstruction wall member W3 are arranged from the upper side in the drawing to the lower side in the drawing, for example, in the order of the first oil passage obstruction wall member W1, the third oil passage obstruction wall member W3, and the second oil passage obstruction wall member W2.

The intermediate oil passage formation portion 91 includes a flow pathway 91a, a flow pathway 91b, and a flow pathway 91c.

The flow pathway 91a is a flow pathway extending from the left side face oil supply opening 61 or the right side face oil supply opening 6r toward the center part side of the trunk portion 1a.

The flow pathway 91b communicates with the flow pathway 91a, and is a flow pathway extending from the far side in the drawing to the near side in the drawing.

The flow pathway 91c communicates with the flow pathway 91b, and is a flow pathway configured to communicate with a connection portion 8dg with which the flow pathway 8de and the flow pathway 8df are communicated.

It is to be noted that the flow pathway 91c is formed to be slanted at 45 degrees with respect to the virtual axis virtually provided in the left-right direction (the width direction of the end cap 1) of FIG. 42. In addition, the third oil passage obstruction wall member W3 is arranged at a location where the left side face oil supply opening 61 or the right side face oil supply opening 6r is communicated with the flow pathway 91a.

As described above, the return guide side oil passage 53 and the lubricant supply opening 73 in the present embodiment are configured to form a lubricant introduction passage of communicating the upper oil passage formation portion 8u with the 43.

(Operations, Functions, and the Like)

When the end cap 1 in the present embodiment is used in the positional situation that is horizontal or wall hanging, the oil is supplied in a similar manner to that in the fifth embodiment, the description thereof will be omitted.

Hereinafter, when the end cap 1 is used in the positional situation that is slanted, the oil supply will be described below.

When the end cap 1 is used in the positional situation that is slanted, firstly, only the third oil passage obstruction wall member W3 arranged in the right side face oil supply opening 6r is removed by, for example, piercing, so that the right side face oil supply opening 6r is communicated with the intermediate oil passage formation portion 91 (the flow pathway 91a).

As described above, since the intermediate oil passage formation portion 91 is connected to the connection portion 8dg with which the flow pathway 8de and the flow pathway 8df are communicated, the lubricant that has been supplied from the right side face oil supply opening 6r is partially supplied through the flow pathway 8de to one of the direction change passages 4. In addition, the lubricant that has been supplied from the right side face oil supply opening 6r is partially supplied through the flow pathways 8df and 8de, not illustrated, to the other direction change passage 4.

(Advantageous Effects in the Seventh Embodiment)

Advantageous effects in the present embodiment will be described as follows.

(1) In the end cap 1 in the present embodiment, even when the end cap 1 is used in the positional situation that is slanted, it is possible to suppress the lubricant from being supplied only one of the direction change passages 4, and it is possible to supply the lubricant to both of the direction change passages 4.

Eighth Embodiment

Hereinafter, an eighth embodiment in the present disclosure (hereinafter, referred to as "the present embodiment") will be described with reference to the drawings.

(Configuration)

Firstly, referring to FIG. 45, FIG. 46, FIG. 1 to FIG. 42, by using FIG. 43 and FIG. 44, a configuration of the end cap included in the linear guide device in the present embodiment will be described.

The configuration of the end cap 1 in the present embodiment is almost same as the configuration of the end cap 1 in the fifth embodiment, but is different from the end cap 1 in the fifth embodiment in that the left side face oil supply opening 61 and the right side face oil supply opening 6r is communicated by only the upper oil passage formation portion 8u.

In addition to this, the configuration of the end cap 1 in the present embodiment is different from the end cap 1 in the fifth embodiment in that the return guide side oil passage 53 is communicated with the upper oil passage formation portion 8u. Further, the configuration of the end cap 1 in the present embodiment is different from the end cap 1 in the fifth embodiment in that a lower side communication passage 92 for communicating the left side face oil supply opening 61 and the right side face oil supply opening 6r with the upper oil passage formation portion 8u is provided.

In the following description, only the differences from the end cap 1 in the fifth embodiment will be described. The other configurations are same as those in the fifth embodiment, and the descriptions thereof will be omitted.

Figure 43:
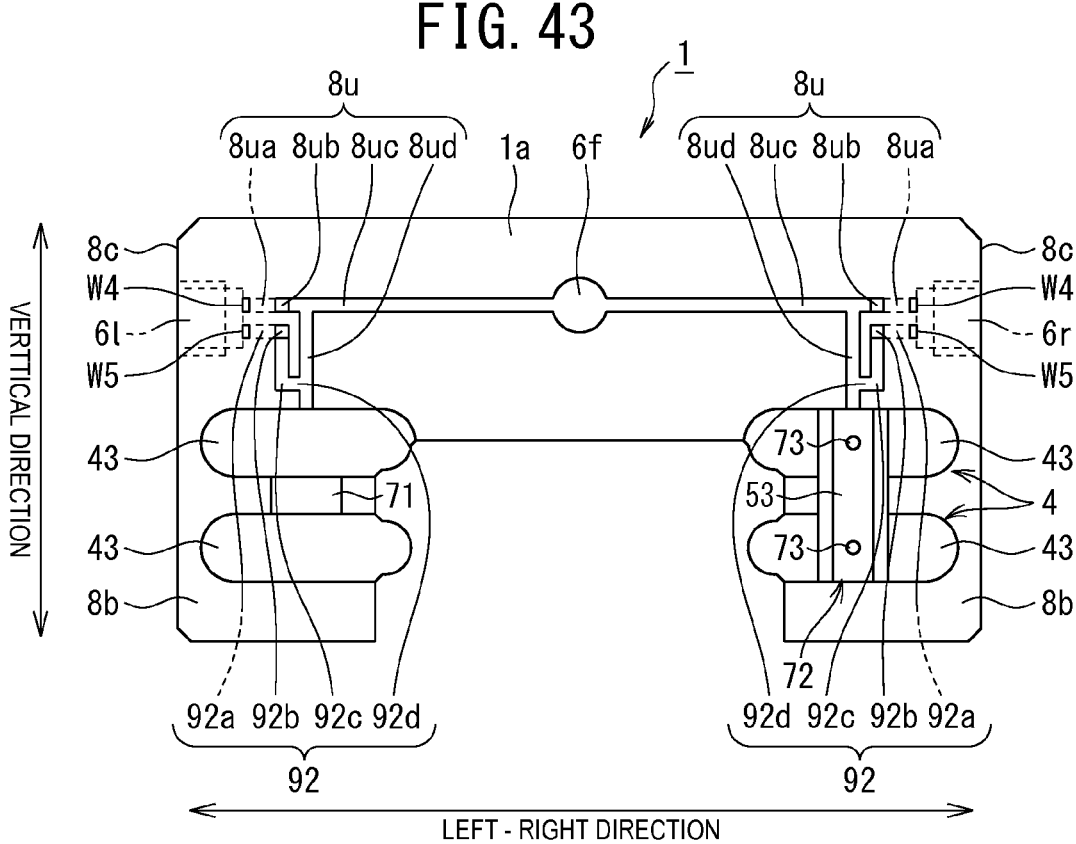
FIG. 43 is a front view illustrative of the end cap in an eighth embodiment of the present disclosure.
Figure 44:
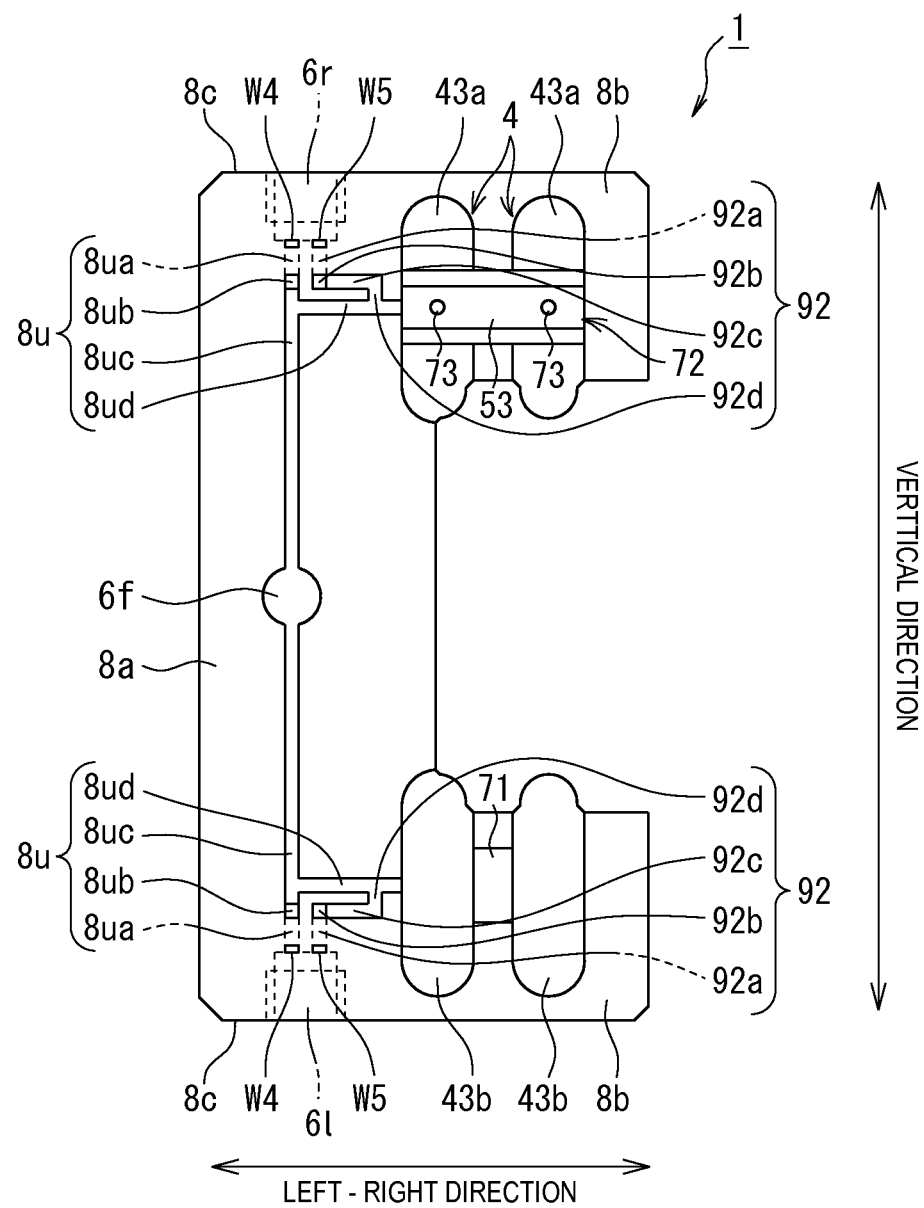
FIG. 44 is a front view illustrative of the end cap in the eighth embodiment of the present disclosure.

It is to be noted that, in FIG. 43 and FIG. 44, the same components and configurations as those of the fifth embodiment described above have the same reference numerals.

FIG. 43 and FIG. 44 are front views illustrative of the end cap 1 in the eighth embodiment.

The end cap 1 in the present embodiment includes the upper oil passage formation portion 8u for communicating the left side face oil supply opening 61 with the right side face oil supply opening 6r is provided as illustrated in FIG. 43 and FIG. 44.

The upper oil passage formation portion 8u includes the flow pathway 8ua, the flow pathway 8ub, the flow pathway 8uc, and the flow pathway 8ud.

The flow pathway 8ua is a flow pathway extending from the left side face oil supply opening 61 or the right side face oil supply opening 6r toward the center part side of the trunk portion 1a.

The flow pathway 8ub is a flow pathway configured to communicate with the flow pathway 8ua and extending from the far side in the drawing toward the near side in the drawing.

The flow pathway 8uc is a flow pathway configured to communicate with the flow pathway 8ub and extending from the left side face oil supply opening 61 or the right side face oil supply opening 6r toward the center part side of the trunk portion 1a.

The flow pathway 8ud is a flow pathway branching from the flow pathway 8uc and configured to communicate with the return guide side oil passage 53.

Then, a fourth oil passage obstruction wall member W4 is arranged at a location where the left side face oil supply opening 61 or the right side face oil supply opening 6r communicates with the flow pathway 8ua, and the fourth oil passage obstruction wall member W4 obstructs the upper oil passage formation portion 8u. It is to be noted that, in the upper oil passage formation portion 8u, the front face oil supply opening 6f is arranged on the center part side of the trunk portion 1a.

In addition, the end cap 1 includes a lower side communication passage 92 for communicating the left side face oil supply opening 61 or the right side face oil supply opening 6r with the upper oil passage formation portion 8u (the flow pathway 8ud).

The lower side communication passage 92 includes a flow pathway 92a, a flow pathway 92b, a flow pathway 92c, and a flow pathway 92d.

The flow pathway 92a is a flow pathway extending from the left side face oil supply opening 61 or the right side face oil supply opening 6r toward the center part side of the trunk portion 1a.

The flow pathway 92b is a flow pathway configured to communicate with the flow pathway 92a and extending from the far side in the drawing toward the near side in the drawing.

The flow pathway 92c is a flow pathway configured to communicate with the flow pathway 92b and extending from the upper side in the drawing toward the lower side in the drawing.

The flow pathway 92d is a flow pathway configured to communicate with the flow pathway 92c and extending from the left side face oil supply opening 61 or the right side face oil supply opening 6r toward the center part side of the trunk portion 1a. Further, the flow pathway 92d communicates with the flow pathway 8ud.

Then, a fifth oil passage obstruction wall member W5 is arranged at a location where the left side face oil supply opening 61 or the right side face oil supply opening 6r communicates with the flow pathway 92a, and the fifth oil passage obstruction wall member W5 obstructs the lower side communication passage 92.

(Operations, Functions, and the Like)

Next, referring to FIG. 43 and FIG. 44, operations, functions, and the like of the linear guide device 2 having the above configuration will be described.

(Oil Supply in the Positional Situation that is Horizontal)

Firstly, referring to FIG. 43, when the end cap 1 in the present embodiment is used in the positional situation that is horizontal, the oil supply will be described.

When the oil is supplied to the end cap 1 used in the positional situation that is horizontal, the fourth oil passage obstruction wall member W4 is removed by, for example, piercing, to communicate the right side face oil supply opening 6r with the upper oil passage formation portion 8u.

Then, the lubricant is supplied from the right side face oil supply opening 6r. Thus, the lubricant that has been supplied from the right side face oil supply opening 6r is supplied through the flow pathway 8ua, the flow pathway 8ub, and the flow pathway 8uc to the flow pathway 8ud. The lubricant that has been supplied to the flow pathway 8ud is partially supplied to the return guide side oil passage 53 on the right side in the drawing.

The lubricant that has been supplied to the return guide side oil passage 53 on the right side in the drawing is supplied into the direction change passage 4 on the right side in the drawing from the lubricant supply opening 73 arranged at the return guide side oil passage 53 on the right side in the drawing.

On the other hand, the lubricant that has been supplied from the right side face oil supply opening 6r is supplied through the flow pathway 8ua, the flow pathway 8ub, and the flow pathway 8uc to the flow pathway 8ud on the left side in the drawing, and is supplied to the return guide side oil passage 53 on the left side in the drawing.

The lubricant that has been supplied to the return guide side oil passage 53 on the left side in the drawing is supplied into the direction change passage 4 on the left side in the drawing from the lubricant supply opening 73 arranged at the return guide side oil passage 53 on the left side in the drawing.

(Oil Supply in the Positional Situation that is Wall Hanging)

Next, when the end cap 1 is used in the positional situation that is wall hanging will be described, with reference to FIG. 44.

When the oil is supplied for the end cap 1 used in the positional situation that is wall hanging, the fifth oil passage obstruction wall member W5 on the upper side in the drawing is removed by piercing, for example, to communicate the right side face oil supply opening 6r with the upper oil passage formation portion 8u (the flow pathway 8ud), and then the lubricant is supplied from the right side face oil supply opening 6r.

Thus, the lubricant that has been supplied from the right side face oil supply opening 6r is supplied through the flow pathways 92a, 92b, and 92c to the flow pathway 92d. Then, the lubricant that has been supplied to the flow pathway 92d is partially supplied to the flow pathway 8ud on the upper side in the drawing, and is then supplied to the return guide side oil passage 53a on the upper side in the drawing.

The lubricant that has been supplied to the return guide side oil passage 53a on the upper side in the drawing is supplied into the direction change passage 4 on the upper side in the drawing from a lubricant supply opening 73a arranged in the return guide side oil passage 53a on the upper side in the drawing.

On the other hand, the lubricant that has been supplied from the right side face oil supply opening 6r is partially supplied through the flow pathways 92a, 92b, 92c, and 92d toward the flow pathway 8ud on the lower side in the drawing. Subsequently, the lubricant is supplied toward the return guide side oil passage 53b on the lower side in the drawing.

Then, the lubricant that has been supplied to the return guide side oil passage 53b on the lower side in the drawing is supplied into the direction change passage 4 on the lower side in the drawing from a lubricant supply opening 73b arranged at the return guide side oil passage 53b on the lower side in the drawing.

(Advantageous Effects in the Eighth Embodiment)

Advantageous effects in the present embodiment will be described as follows.

(1) In the end cap 1 in the present embodiment, even when the linear guide device 2 is used in the positional situation that is horizontal, it is possible to supply the lubricant to each of the direction change passages 4 included in the end cap 1.

(2) In the end cap 1 in the present embodiment, even when the linear guide device 2 is used in the positional situation that is wall hanging, it is possible to supply the lubricant to each of the direction change passages 4 included in the end cap 1.

(First Aspect)

In order to address the above issues, according to a first aspect of the present disclosure, there is provided an end cap, wherein the end cap is configured to be included in a linear guide device in which a bottom face of a guide rail is arranged on a face having an angle ranging from 0 degrees to 180 degrees with respect to a plane face, and the end cap is configured to be jointed on an end face in a moving direction of a slider body that straddles the guide rail to be relatively movable, the end cap including: (a) a pair of sleeve portions arranged on both sides in a width direction of the guide rail and coupled by a trunk portion; (b) a pair of direction change passage formation depression portions provided on faces on slider body sides of the pair of sleeve portions, respectively, and configured to form a pair of direction change passages that communicate rolling element rolling passages formed between the guide rail and the slider body with rolling element return passages included in the slider body, respectively; (c) a plurality of oil supply openings at plurality of locations on an outer circumference of the end cap; (d) an oil passage having a plurality of pathways configured to communicate the plurality of oil supply openings with the pair of direction change passage formation depression portions, respectively; and (e) an oil passage obstruction wall member configured to obstruct each of the plurality of pathways of the oil passage, (f) wherein the pair of direction change passage formation depression portions are configured to be selectively communicated with the plurality of oil supply openings, by selectively opening the oil passage obstruction wall member configured to obstruct the each of the plurality of pathways of the oil passage depending on the angle of the face on which the bottom face of the guide rail is arranged.

In such a configuration, the oil passage obstruction wall member configured to obstruct each of the plurality of pathways of the oil passage is selectively opened depending on the angle of the face, on which the guide rail of the linear guide device is arranged, with respect to the plane face, so that the direction change passage is selectively communicated with the oil supply opening. Hence, regardless of the positional situation of the linear guide device when in use, the lubricant can be supplied to all of the direction change passages and supplied into the entire rolling element rolling passages. In addition, since the lubricant can be supplied into the entire rolling element rolling passages without adding a new part, complexity of the configuration and an increase in the number of the parts can be suppressed, and an increase in cost can be suppressed.

(Second Aspect)

According to a second aspect of the present disclosure, in the end cap according to the first aspect, the pair of direction change passage formation depression portions may include a left side direction change passage formation depression portion and a right side direction change passage formation depression portion respectively formed at the pair of sleeve portions, wherein when the bottom face of the guide rail is arranged on the face that is plane, a first pathway of the plurality of oil pathways of the oil passage may be configured to communicate one of the plurality of oil supply openings located on an upper side in a vertical direction with the left side direction change passage formation depression portion and the right side direction change passage formation depression portion, and wherein when viewed from the moving direction of the slider body, the first pathway may be a pathway configured to originate from the one of the plurality of oil supply openings located on the upper side in the vertical direction, to branch at apart between the left side direction change passage formation depression portion and the right side direction change passage formation depression portion, and to reach the left side direction change passage formation depression portion and the right side direction change passage formation depression portion.

In such a configuration, when the bottom face of the guide rail is arranged on the plane face (i.e., the face having the slanted angle 0 degrees is included and the face having the slanted angle 180 degrees is not included), in other words, when the linear guide device is used in the positional situation that is horizontal, it is possible to move the liquid lubricant that has been supplied into the oil passage by the gravity from the oil supply opening located on the upper side in the vertical direction than the direction change passage into the direction change passage.

(Third Aspect)

According to a third aspect of the present disclosure, in the end cap according to the first aspect, the pair of direction change passage formation depression portions may include a left side direction change passage formation depression portion and a right side direction change passage formation depression portion respectively formed at the pair of sleeve portions, wherein when the bottom face of the guide rail is arranged on the face having the angle of 90 degrees, a second pathway of the plurality of oil pathways of the oil passage may be configured to communicate one of the plurality of oil supply openings located on an upper side in a vertical direction with the left side direction change passage formation depression portion and the right side direction change passage formation depression portion, and wherein when viewed from the moving direction of the slider body, the second pathway may be a pathway configured to originate from the one of the plurality of oil supply openings located on the upper side in the vertical direction, to branch at a part in either one of the left side direction change passage formation depression portion or the right side direction change passage formation depression portion, which is closer to the one of the plurality of oil supply openings located on the upper side in the vertical direction, and to reach the left side direction change passage formation depression portion and the right side direction change passage formation depression portion.

In such a configuration, when the bottom face of the guide rail is arranged on the face slanted at an angle of 90 degrees with respect to the horizontal face, that is when the linear guide device is used in the positional situation that is vertical, it is possible to move the liquid lubricant that has been supplied into the oil passage by the gravity from the oil supply opening located on the upper side in the vertical direction than the direction change passage into the direction change passage.

(Fourth Aspect)

According to a fourth aspect of the present disclosure, in the end cap according to the first aspect, the pair of direction change passage formation depression portions may include a left side direction change passage formation depression portion and a right side direction change passage formation depression portion respectively formed at the pair of sleeve portions, wherein when the bottom face of the guide rail is arranged on the face that is slanted, a third pathway of the plurality of oil pathways of the oil passage may be configured to communicate one of the plurality of oil supply openings located on an upper side in a vertical direction with the left side direction change passage formation depression portion and the right side direction change passage formation depression portion, and wherein when viewed from the moving direction of the slider body, the third pathway may be a pathway configured to originate from the one of the plurality of oil supply openings located on the upper side in the vertical direction, to extend in the vertical direction along the face that is slanted, to branch at a part in either one of the left side direction change passage formation depression portion or the right side direction change passage formation depression portion, which is closer to the one of the plurality of oil supply openings located on the upper side in the vertical direction, and to reach the left side direction change passage formation depression portion and the right side direction change passage formation depression portion.

In such a configuration, when the bottom face of the guide rail is arranged on the slanted face (i.e., the faces having the slanted angles 0 degrees, 90 degrees, and 180 degrees are not included), in other words, when the linear guide device is used in the positional situation that is slanted, it is possible to move the liquid lubricant that has been supplied into the oil passage by the gravity from the oil supply opening located on the upper side in the vertical direction than the direction change passage into the direction change passage.

(Fifth Aspect)

According to a fifth aspect of the present disclosure, in the end cap according to the first aspect, the oil passage may include: an upper oil passage formation portion and a lower oil passage formation portion respectively obstructed by the oil passage obstruction wall member; a central oil passage formation portion configured to communicate the upper oil passage formation portion with the lower oil passage formation portion at a partway; and a lubricant introduction passage configured to communicate the lower oil passage formation portion with the pair of direction change passage formation depression portions, wherein the lubricant introduction passage may include: a return guide side oil passage arranged on a return guide configured to form each of the pair of direction change passages together with each of the pair of direction change passage formation depression portions; and a lubricant supply opening arranged in the return guide side oil passage, wherein the lower oil passage formation portion is provided closer to the guide rail than to the upper oil passage formation portion, and wherein when the end cap is jointed with the end face in the moving direction of the slider body, at least one of the upper oil passage formation portion or the lower oil passage formation portion is configured to be selectively communicated with one of the plurality of oil supply openings, by selectively opening the oil passage obstruction wall member configured to obstruct the each of the plurality of pathways of the oil passage.

In such a configuration, for example, when the end cap is used in the positional situation that is horizontal, the lubricant can be supplied to the upper oil passage formation portion by opening the oil passage obstruction wall member configured to obstruct the upper oil passage formation portion. The lubricant that has been supplied to the upper oil passage formation portion is supplied to the central oil passage formation portion, and is then supplied to the lower oil passage formation portion. Then, the lubricant that has been supplied to the lower oil passage formation portion is supplied to each lubricant introduction passage communicated with the lower oil passage formation portion. Since the lubricant introduction passage is communicated with the direction change passage formation depression portions, respectively, the lubricant can be supplied to all of the direction change passages.

In addition, for example, when the end cap is used in the positional situation that is wall hanging, the lubricant can be supplied to the lower oil passage formation portion by opening the oil passage obstruction wall member configured to obstruct the lower oil passage formation portion, without passing through the upper oil passage formation portion or the central oil passage formation portion. Then, the lubricant that has been supplied to the lower oil passage formation portion is supplied to each lubricant introduction passage communicated with the lower oil passage formation portion. Since the lubricant introduction passage is communicated with the direction change passage formation depression portions, respectively, the lubricant can be supplied to all of the direction change passages.

As described above, in the end cap according to the fifth aspect, even when the end cap is used in the positional situation that is horizontal or even when the end cap is used in the positional situation that is wall hanging, the supplied lubricant can be supplied to all of the direction change passages.

(Sixth Aspect)

According to a sixth aspect of the present disclosure, in the end cap according to the fifth aspect, the oil passage obstruction wall member configured to obstruct the upper oil passage formation portion may be arranged closer to the pair of direction change passage formation depression portions than to another oil passage obstruction wall member configured to obstruct the lower oil passage formation portion.

In such a configuration, for example, when the end cap is used in the positional situation that is slanted (i.e., the positional situation between horizontal and wall hanging), the lubricant can be supplied to the upper oil passage formation portion and the lower oil passage formation portion, by opening the oil passage obstruction wall member configured to obstruct the upper oil passage formation portion and the oil passage obstruction wall member configured to obstruct the lower oil passage formation portion. In this case, since the oil passage obstruction wall member configured to obstruct the upper oil passage formation portion is arranged closer to the change direction passage side than to the oil passage obstruction wall member configured to obstruct the lower oil passage formation portion, the location where the lubricant surface is the highest can be made similar.

As described above, in the end cap according to the sixth aspect, even when the end cap is used in the positional situation that is slanted, it is possible to suppress the lubricant from being easily supplied to the upper oil passage formation portion or the lower oil passage formation portion. Accordingly, the lubricant that has been supplied can be supplied to all of the direction change passages.

(Seventh Aspect)

According to a seventh aspect of the present disclosure, in the end cap according to the fifth or sixth aspect, the oil passage may be configured to couple the lower oil passage formation portion and one of the plurality of oil supply openings, and the oil passage may further include an intermediate oil passage formation portion having an end on an oil supply opening side obstructed by the oil passage obstruction member.

In such a configuration, for example, when the end cap is used in the positional situation that is slanted, the lubricant can be supplied to the lower oil passage formation portion and the return guide side oil passage, by opening the oil passage obstruction wall member configured to obstruct the intermediate oil passage formation portion.

As described above, in the end cap according to the seventh aspect, even when the end cap is used in the positional situation that is slanted, it is possible to suppress the lubricant from being supplied easily to one of the direction change passages. Accordingly, the lubricant that has been supplied from the oil supply opening can be supplied to all of the direction change passages.

(Eighth Aspect)

According to an eighth aspect of the present disclosure, there is provided an end cap, wherein the end cap is configured to be included in a linear guide device in which a bottom face of a guide rail is arranged on a face having an angle ranging from 0 degrees to 180 degrees with respect to a plane face, and the end cap is configured to be jointed on an end face in a moving direction of a slider body that straddles the guide rail to be relatively movable, the end cap including: (a) a pair of sleeve portions arranged on both sides in a width direction of the guide rail and coupled by a trunk portion; (b) a pair of direction change passage formation depression portions provided on faces on slider body sides of the pair of sleeve portions, respectively, and configured to form a pair of direction change passages that communicate rolling element rolling passages formed between the guide rail and the slider body with rolling element return passages included in the slider body, respectively; (c) a plurality of oil supply openings at plurality of locations on an outer circumference of the end cap; (d) an oil passage having a plurality of pathways configured to communicate the plurality of oil supply openings with the pair of direction change passage formation depression portions, respectively; and (e) an oil passage obstruction wall member configured to obstruct each of the plurality of pathways of the oil passage, (g) wherein two of the plurality of oil supply openings at the plurality of locations are two side face oil supply openings arranged on both of side faces in the width direction of the end cap, respectively, (h) wherein the oil passage may include: an upper oil passage formation portion configured to communicate the two side face oil supply openings, an end of the side face oil supply opening side being obstructed by the oil passage obstruction wall member; an intermediate oil passage formation portion configured to communicate the upper oil passage formation portion with the two side face oil supply openings, an end of the side face oil supply opening side being obstructed by the oil passage obstruction wall member; (i) a lubricant introduction passage configured to communicate the upper oil passage formation portion with the intermediate oil passage formation portion, (j) wherein the lubricant introduction passage may include: a return guide side oil passage arranged on a return guide configured to form each of the pair of direction change passages together with each of the pair of direction change passage formation depression portions; and a lubricant supply opening arranged in the return guide side oil passage, and wherein at least one of the upper oil passage formation portion or the intermediate oil passage formation portion is configured to be selectively communicated with one of the two side face oil supply openings, by selectively opening the oil passage obstruction wall member configured to obstruct the each of the plurality of pathways of the oil passage depending on the angle of the face on which the bottom face of the guide rail is arranged.

In such a configuration, for example, when the end cap is used in the positional situation that is horizontal, the lubricant can be supplied to the upper oil passage formation portion by opening the oil passage obstruction wall member configured to obstruct the upper oil passage formation portion. The lubricant that has been supplied to the upper oil passage formation portion is supplied to each return guide side oil passage communicated with the upper oil passage formation portion. Since each return guide side oil passage is communicated with one of the direction change passages, the lubricant can be supplied to all of the direction change passages.

In addition, for example, when the end cap is used in the positional situation that is wall hanging, the lubricant can be partially supplied to one of the return guide side oil passages, by opening the oil passage obstruction wall member configured to obstruct the intermediate oil passage formation portion. Further, it is possible to supply the lubricant partially to the upper oil passage formation portion communicated with the return guide side oil passage. Since the lubricant that has been supplied to the upper oil passage formation portion is supplied to another return guide side oil passage, the lubricant can be supplied to all of the direction change passages.

As described above, in the end cap according to the eighth aspect, even when the end cap is used in the positional situation that is horizontal or even when the end cap is used in the positional situation that is wall hanging, the lubricant that has been supplied from the side face oil supply opening can be supplied to all of the direction change passages.

(Ninth Aspect)

According to a ninth aspect of the present disclosure, in the end cap according to any one of the fifth to eighth aspects, the oil passage may include an upper coupling oil passage formation portion configured to communicate one end of the oil passage formation portion and one of the two side face oil supply openings between the upper oil passage formation portion and the one of the two side face oil supply openings.

In such a configuration, regardless of the slanted angle of the face on which the linear guide device is arranged (i.e., the angle with respect to the plane face on which the bottom face of the guide rail is arranged), in other words, regardless of the positional situation of the linear guide device when in use, the lubricant can be supplied from the side face oil supply opening through the upper coupling oil passage formation portion to the upper oil passage formation portion.

(Tenth Aspect)

According to a tenth aspect of the present disclosure, in the end cap according to any one of the fifth to ninth aspects, the lubricant supply opening may be arranged at a center part of the pair of direction change passage formation depression portions, in a partway of the return guide side oil passage, when viewed in a linearly moving direction of the slider body.

In such a configuration, since the lubricant supply opening is arranged at the center of the direction change passage in a partway in the return guide oil passage, when viewed in the linearly moving direction of the slider body, it is possible to suppress a difference in the lubricant supply amount between both sides of the direction change passage with the lubricant supply opening used as the center.

(Eleventh Aspect)

According to an eleventh aspect of the present disclosure, in the end cap according to any one of the first to tenth aspects, the oil passage obstruction wall member may be formed in a plate shape, and a slit may be formed in at least a part between the oil passage obstruction wall member and the oil passage.

In such a configuration, since the coupling force between the oil passage and the oil passage obstruction wall member can be reduced by the slit, the operations of removing the oil passage obstruction wall members are made easy, except for the oil passage obstruction wall member configured to obstruct the pathway that communicates the oil supply opening located on the upper side than the direction change passage in the vertical direction with the direction change passage such that the liquid can be moved by the gravity.

(Twelfth Aspect)

According to a twelfth aspect of the present disclosure, in the end cap according to any one of the first to eleventh aspects, the oil passage obstruction wall member configured to obstruct the each of the plurality of pathways of the oil passage may be selectively removed and opened to make a width of the opened oil pathway larger than other pathways.

In such a configuration, the supplied lubricant is reserved in a part in the oil passage that is opened by selectively removing the oil passage obstruction wall member, and in addition, the reserved lubricant can be supplied to the direction change passages.

(Thirteenth Aspect)

According to a thirteenth aspect of the present disclosure, in the end cap according to any one of the first to twelfth aspects, the oil passage obstruction wall member may be arranged at an end on the oil supply opening side in the oil passage, and protrudes on an outer side than the oil passage.

In such a configuration, since the oil passage obstruction wall member protrudes on the outer side of the oil passage from an end of the oil supply opening of the oil passage, even when the end cap is jointed with the slider body, it is possible to carry out the operation of removing the oil passage obstruction wall member from the oil passage.

(Fourteenth Aspect)

According to a fourteenth aspect of the present disclosure, there is provided a linear guide device including the end cap according to anyone of the first to thirteenth aspects.

In such a configuration, since the above-described end cap is provided, it is possible to suppress a lubrication failure when the linear guide device is used.

Advantageous Effects

In some embodiments of the present disclosure, it is possible to provide an end cap of a linear guide device capable of supplying the lubricant into all of rolling element circulation passages and capable of suppressing an increase in cost, regardless of the positional situation of the linear guide device when in use, and a linear guide device including the above-mentioned end cap.

The entire disclosure of Japanese Patent Application No. 2012-186884 (filed on Aug. 27, 2012) and Japanese Patent Application No. 2012-186885 (filed on Aug. 27, 2012) including specification, claims, drawings, and abstract is incorporated herein by reference in its entirety.

While a limited number of embodiments have been described and illustrated herein, the scope of claims are not limited to them. It should be apparent that modifications and adaptations to those embodiments may occur to one skilled in the art.

REFERENCE SIGNS LIST 1 end cap
2 linear guide device
31 side seal
32 attachment screw
33f front face nipple
33s side face nipple
34 plug
4 direction change passage
41 direction change passage formation first depression portion
42 direction change passage formation second depression portion
43 direction change passage formation third depression portion
51 first crossing return guide
51a first outer circumference side guide groove portion
51b first inner circumference side guide groove portion
52 second crossing return guide
52a flat portion
52b second inner circumference side crossing return guide
53 return guide side oil passage
53a first branch groove portion
53b second branch groove portion
53c first branch reservoir portion
53d second branch reservoir portion
6 oil supply opening
6f front face oil supply opening
6l left side face oil supply opening
6r right side face oil supply opening
71 return guide fitting depression portion
72 parallel return guide
73 lubricant supply opening
8 oil passage
81l left side first oil passage formation portion
81r right side first oil passage formation portion
82l left side second oil passage formation portion
82r right side second oil passage formation portion
83l left side third oil passage formation portion
83r right side third oil passage formation portion
84l left side fourth oil passage formation portion
84r right side fourth oil passage formation portion
85l left side fifth oil passage formation portion
85r right side fifth oil passage formation portion
8u upper oil passage formation portion
8d lower oil passage formation portion
8c central oil passage formation portion
8ulc upper side left face coupling oil passage formation portion
8urc upper side right face coupling oil passage formation portion
84lc left side fourth coupling oil passage formation portion
84rc right side fourth coupling oil passage formation portion
91 intermediate oil passage formation portion
92 lower side communication passage
10 rolling element rolling passage
12 rolling element return passage
14 guide rail
14a bottom face of guide rail
16 slider body
18 base
18a guide rail arrangement face
18b base side face
20 slider
22 rolling element
24 rail side rolling element rolling groove
26 slider side rolling element rolling groove
W oil passage obstruction wall member
W1l left side first oil passage obstruction wall member
W1r right side first oil passage obstruction wall member
W2l left side second oil passage obstruction wall member
W2r right side second oil passage obstruction wall member
W3l left side third oil passage obstruction wall member
W3r right side third oil passage obstruction wall member
S slit

The invention claimed is:

1. An end cap included in a linear guide device and attached on an end face in a moving direction of a slider body that straddles a guide rail of the linear guide device, the end cap comprising:
   a trunk portion; and
   a pair of sleeve portions arranged on both sides of the trunk portion in a width direction of the guide rail and coupled by the trunk portion, each of the pair of sleeve portions comprising:
      a direction change passage formation depression portion provided on a face facing the slider body and configured to form a direction change passage that communicates a rolling element rolling passage formed between the guide rail and the slider body with a rolling element return passage included in the slider body;
a plurality of oil supply openings at a plurality of locations on an outer periphery of the end cap;
an oil passage comprising a plurality of pathways configured to communicate the plurality of oil supply openings with the direction change passage formation depression portion; and
an oil passage obstruction wall member integrally formed with the end cap and configured to obstruct each of the plurality of pathways of the oil passage,
wherein the direction change passage formation depression portion is configured to be selectively communicated with the plurality of oil supply openings, by opening the oil passage obstruction wall member configured to obstruct each of the plurality of pathways of the oil passage depending on an angle of a face on which a bottom face of the guide rail is arranged, when the angle ranges from 0 degrees to 180 degrees.

2. The end cap according to claim 1,
wherein the direction change passage formation depression portion is one of a pair of direction change passage formation portions comprising a left side direction change passage formation depression portion and a right side direction change passage formation depression portion respectively formed at the pair of sleeve portions,
wherein when the bottom face of the guide rail is arranged on the face that is plane, a pathway of the plurality of oil pathways of the oil passage is configured to communicate one of the plurality of oil supply openings located on an upper side in a vertical direction of the end cap with the left side direction change passage formation depression portion and the right side direction change passage formation depression portion, and
wherein when viewed from the moving direction of the slider body, the pathway is configured to originate from the one of the plurality of oil supply openings located on the upper side in the vertical direction, to branch at a part between the left side direction change passage formation depression portion and the right side direction change passage formation depression portion, and to reach the left side direction change passage formation depression portion and the right side direction change passage formation depression portion.

3. The end cap according to claim 1,
wherein the direction change passage formation depression portion is one of a pair of direction change passage portions comprising a left side direction change passage formation depression portion and a right side direction change passage formation depression portion respectively formed at the pair of sleeve portions,
wherein when the bottom face of the guide rail is arranged on the face having the angle of 90 degrees, a pathway of the plurality of oil pathways of the oil passage is configured to communicate one of the plurality of oil supply openings located on an upper side in a vertical direction of the end cap with the left side direction change passage formation depression portion and the right side direction change passage formation depression portion, and
wherein when viewed from the moving direction of the slider body, the pathway is configured to originate from the one of the plurality of oil supply openings located on the upper side in the vertical direction, to branch at a part in either one of the left side direction change passage formation depression portion or the right side direction change passage formation depression portion, which is closer to the one of the plurality of oil supply openings located on the upper side in the vertical direction, and to reach the left side direction change passage formation depression portion and the right side direction change passage formation depression portion.

4. The end cap according to claim 1,
wherein the direction change passage formation depression portion is one of a pair of direction change passage formation portions comprising a left side direction change passage formation depression portion and a right side direction change passage formation depression portion respectively formed at the pair of sleeve portions,
wherein when the bottom face of the guide rail is arranged on the face that is slanted, a pathway of the plurality of oil pathways of the oil passage is configured to communicate one of the plurality of oil supply openings located on an upper side in a vertical direction of the end cap with the left side direction change passage formation depression portion and the right side direction change passage formation depression portion, and
wherein when viewed from the moving direction of the slider body, the pathway is configured to originate from the one of the plurality of oil supply openings located on the upper side in the vertical direction, to extend in the vertical direction along the face that is slanted, to branch at a part in either one of the left side direction change passage formation depression portion or the right side direction change passage formation depression portion, which is closer to the one of the plurality of oil supply openings located on the upper side in the vertical direction, and to reach the left side direction change passage formation depression portion and the right side direction change passage formation depression portion.

5. The end cap according to claim 1,
wherein the oil passage comprises:
an upper oil passage formation portion and a lower oil passage formation portion respectively obstructed by the oil passage obstruction wall member;
a central oil passage formation portion configured to communicate the upper oil passage formation portion with the lower oil passage formation portion at a partway; and
a lubricant introduction passage configured to communicate the lower oil passage formation portion with the direction change passage formation depression portion,
wherein the direction change passage is one of a pair of direction change passages and the direction change passage formation depression portion is one of a pair of direction change passage formation portions, and the lubricant introduction passage comprises:
a return guide side oil passage arranged on a return guide configured to form each of the pair of direction change passages together with each of the pair of direction change passage formation depression portions; and
a lubricant supply opening arranged in the return guide side oil passage,
wherein the lower oil passage formation portion is provided closer to the guide rail than to the upper oil passage formation portion, and wherein when the end cap is jointed with the end face in the moving direction of the slider body, at least one of the upper oil passage formation portion or the lower oil passage formation portion is configured to be selectively communicated with one of the plurality of oil supply openings, by selectively opening the oil passage obstruction wall member configured to obstruct the each of the plurality of pathways of the oil passage.

6. The end cap according to claim 5, wherein the lubricant supply opening is arranged at a center part of the pair of direction change passage formation depression portions, in a partway of the return guide side oil passage, when viewed in a linearly moving direction of the slider body.

7. The end cap according to claim 5, wherein the oil passage obstruction wall member configured to obstruct the upper oil passage formation portion is arranged closer to the pair of direction change passage formation depression portions than to another oil passage obstruction wall member configured to obstruct the lower oil passage formation portion.

8. The end cap according to claim 7,
wherein the oil passage is configured to couple the lower oil passage formation portion and one of the plurality of oil supply openings, and
wherein the oil passage further comprises an intermediate oil passage formation portion having an end on an oil supply opening side obstructed by the oil passage obstruction member.

9. The end cap according to claim 7, wherein the lubricant supply opening is arranged at a center part of the pair of direction change passage formation depression portions, in a partway of the return guide side oil passage, when viewed in a linearly moving direction of the slider body.

10. The end cap according to claim 5,
wherein the oil passage is configured to couple the lower oil passage formation portion and one of the plurality of oil supply openings, and
wherein the oil passage further comprises an intermediate oil passage formation portion having an end on an oil supply opening side obstructed by the oil passage obstruction member.

11. The end cap according to claim 1,
wherein the oil passage obstruction wall member is formed as a flat plate, and
wherein a slit is formed in at least a part between the oil passage obstruction wall member and the oil passage.

12. The end cap according to claim 1, wherein the oil passage obstruction wall member configured to obstruct the each of the plurality of pathways of the oil passage is selectively processed by machine processing to make a width of the opened oil pathway larger than other pathways.

13. The end cap according to claim 1, wherein the oil passage obstruction wall member is arranged at an end on the oil supply opening side of the oil passage, and protrudes on an outer side from the end of the oil passage.

14. A linear guide device comprising the end cap according to claim 1.

15. An end cap included in a linear guide device and attached on an end face in a moving direction of a slider body that straddles a guide rail of the linear guide device, the end cap comprising:
a trunk portion; and
a pair of sleeve portions arranged on both sides of the trunk portion in a width direction of the guide rail and coupled by the trunk portion, each of the pair of sleeve portions comprising:
a direction change passage formation depression portion provided on a face facing the slider body and configured to form a direction change passage that communicates a rolling element rolling passage formed between the guide rail and the slider body with a rolling element return passage included in the slider body;
a plurality of oil supply openings at a plurality of locations on an outer periphery of the end cap;
an oil passage comprising a plurality of pathways configured to communicate the plurality of oil supply openings with the direction change passage formation depression portion; and
an oil passage obstruction wall member configured to obstruct each of the plurality of pathways of the oil passage,
wherein two of the plurality of oil supply openings at the plurality of locations are two side face oil supply openings arranged on both side faces, in the width direction, of the end cap, respectively,
wherein the oil passage comprises:
an upper oil passage formation portion configured to communicate the two side face oil supply openings, an end of the side face oil supply opening side being obstructed by the oil passage obstruction wall member;
an intermediate oil passage formation portion configured to communicate the upper oil passage formation portion with the two side face oil supply openings; and
a lubricant introduction passage configured to communicate the upper oil passage formation portion with the intermediate oil passage formation portion,
wherein the lubricant introduction passage comprises:
a return guide side oil passage arranged on a return guide configured to form the direction change passage together with the direction change passage formation depression portion; and
a lubricant supply opening arranged in the return guide side oil passage, and
wherein at least one of the upper oil passage formation portion or the intermediate oil passage formation portion is configured to be selectively communicated with one of the two side face oil supply openings, by opening the oil passage obstruction wall member configured to obstruct each of the plurality of pathways of the oil passage depending on an angle of a face on which a bottom face of the guide rail is arranged, when the angle ranges from 0 degrees to 180 degrees.

16. The end cap according to claim 15,
wherein the oil passage comprises an upper coupling oil passage formation portion configured to communicate one end of the oil passage formation portion and one of the two side face oil supply openings between the upper oil passage formation portion and the one of the two side face oil supply openings.

17. The end cap according to claim 15,
wherein the oil passage obstruction wall member is formed as a flat plate, and
wherein a slit is formed in at least a part between the oil passage obstruction wall member and the oil passage.

18. The end cap according to claim 15, wherein the oil passage obstruction wall member configured to obstruct the each of the plurality of pathways of the oil passage is selectively processed by machine processing to make a width of the opened oil pathway larger than other pathways.

19. The end cap according to claim 15, wherein the oil passage obstruction wall member is arranged at an end on the oil supply opening side of the oil passage, and protrudes on an outer side from the end of the oil passage.

20. A linear guide device comprising the end cap according to claim 15.

* * * * *